(12) United States Patent
Matsuda et al.

(10) Patent No.: US 12,451,748 B2
(45) Date of Patent: Oct. 21, 2025

(54) ROTARY ELECTRIC MACHINE AND METHOD FOR CONTROLLING ROTARY ELECTRIC MACHINE

(71) Applicant: DENSO CORPORATION, Kariya (JP)

(72) Inventors: Masashi Matsuda, Kariya (JP); Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 238 days.

(21) Appl. No.: 18/458,629

(22) Filed: Aug. 30, 2023

(65) Prior Publication Data

US 2023/0412029 A1 Dec. 21, 2023

Related U.S. Application Data

(63) Continuation of application No. PCT/JP2022/007722, filed on Feb. 24, 2022.

(30) Foreign Application Priority Data

Mar. 1, 2021 (JP) ................................ 2021-032027

(51) Int. Cl.
*H02K 3/47* (2006.01)
(52) U.S. Cl.
CPC ...................................... *H02K 3/47* (2013.01)
(58) Field of Classification Search
CPC ............. H02K 3/28; H02K 3/47; H02P 25/22
See application file for complete search history.

(56) References Cited

U.S. PATENT DOCUMENTS

| 2003/0102840 | A1* | 6/2003 | Franco | H02K 39/00 318/727 |
|---|---|---|---|---|
| 2018/0019687 | A1* | 1/2018 | Taniguchi | H02P 27/06 |
| 2020/0161939 | A1* | 5/2020 | Takahashi | H02K 17/16 |
| 2020/0162003 | A1 | 5/2020 | Takahashi et al. | |
| 2022/0006356 | A1 | 1/2022 | Takahashi et al. | |
| 2022/0006357 | A1 | 1/2022 | Takahashi et al. | |
| 2022/0006358 | A1 | 1/2022 | Takahashi et al. | |
| 2022/0014074 | A1 | 1/2022 | Takahashi et al. | |
| 2022/0014075 | A1 | 1/2022 | Takahashi et al. | |
| 2022/0045578 | A1 | 2/2022 | Takahashi et al. | |
| 2023/0299625 | A1 | 9/2023 | Tsuchiya et al. | |

OTHER PUBLICATIONS

U.S. Appl. No. 18/309,742, filed Sep. 25, 2023 titled "Rotary Electric Machine"; 179 pages.
U.S. Appl. No. 18/458,611, filed Aug. 30, 2023 titled "Rotary Electric Machine"; 148 pages.
U.S. Appl. No. 18/458,611, filed Aug. 30, 2023, Kiba et al.

* cited by examiner

*Primary Examiner* — Naishadh N Desai
(74) *Attorney, Agent, or Firm* — Maschoff Brennan

(57) ABSTRACT

An armature winding of a rotary electric machine includes two systems of electrically independent windings. An armature winding of a first system is closer to the field element in the radial direction than an armature winding of a second system, A current control device is provided for controlling a current to the armature winding of the first system and the armature winding of the second system. In consideration of a difference in magnetic flux waveforms from the field element caused by a difference in the distance to the field element in the radial direction, the current control device differentiates a current waveform to the armature winding of the first system from a current waveform to the armature winding of the second system.

6 Claims, 44 Drawing Sheets

(a)

(b)

(a)

(b)

(a)

(b)

(a)

(b)

(a)

(b)

(a)

FIRST WINDING GROUP

MAGNETIC FLUX
WAVEFORM

ELECTRIC CURRENT
WAVEFORM

TORQUE WAVEFORM (b)

SECOND WINDING GROUP

MAGNETIC FLUX
WAVEFORM

ELECTRIC CURRENT
WAVEFORM

TORQUE WAVEFORM (a)

(b)

(a)

(b)

(a)

(b)

(a)

(b)

ROTARY ELECTRIC MACHINE AND METHOD FOR CONTROLLING ROTARY ELECTRIC MACHINE

CROSS REFERENCE TO RELATED APPLICATION

The present application is a continuation application of International Patent Application No. PCT/JP2022/007722 filed on Feb. 24, 2022, which designated the U.S. and claims the benefit of priority from Japanese Patent Application No. 2021-032027 filed on Mar. 1, 2021. The entire disclosures of all of the above applications are incorporated herein by reference.

TECHNICAL FIELD

The present disclosure relates to a rotary electric machine and a method for controlling the rotary electric machine.

BACKGROUND

Conventionally, a rotary electric machine using a toothless and slotless stator core has been known.

SUMMARY

According to an aspect of the present disclosure, a rotary electric machine comprises: a field element having a plurality of magnetic poles; and an armature including an armature winding.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
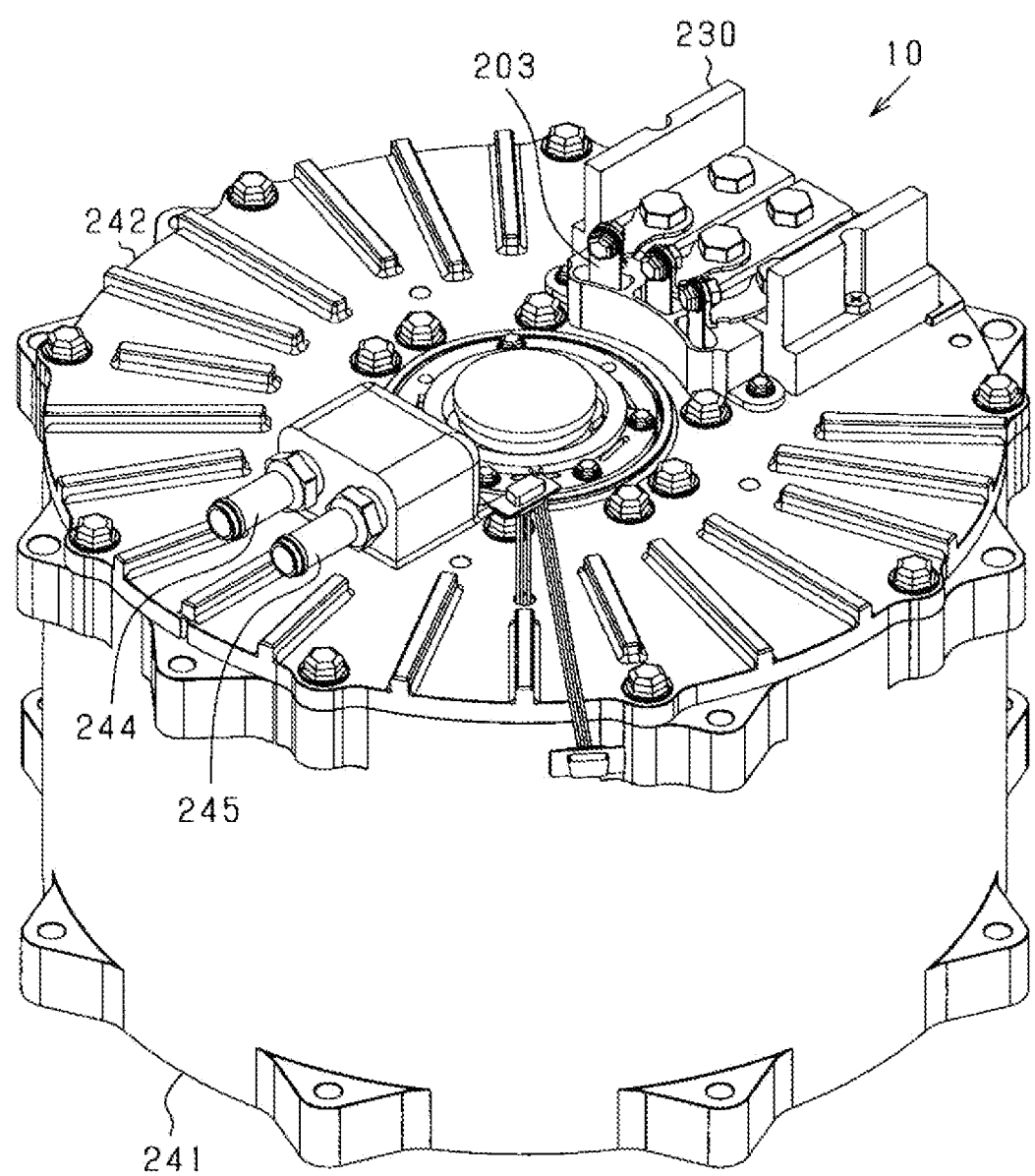
FIG. 1 is a perspective view illustrating an entire rotary electric machine according to a first embodiment.

Hereinafter, examples of the present disclosure will be described.

According to an example of the present disclosure, a rotary electric machine uses a toothless and slotless stator core. The toothless and slotless rotary electric machine enables to suppress a cogging torque and a torque ripple.

In a configuration where a toothless stator core is used, the magnetic flux of the magnet does not pass through the teeth. Therefore, the magnetic flux waveform of the magnet changes depending on the distance from the magnet. Assuming if the current waveform through the coil is made uniform inside and outside in the radial direction, even though the magnetic flux waveforms of the magnets differ greatly between the inside and the outside in the radial direction, the torque waveforms can be hardly formed into ideal sinusoidal shapes. Therefore, vibration and noise may increase.

According to a first example to address the above-mentioned issue, a rotary electric machine comprises: a field element having a plurality of magnetic poles; and an armature having a toothless configuration and including an armature winding including a plurality of winding segments and a support member provided on a radially inner side or on a radially outer side of the armature winding and provided on an opposite side of the armature winding from the field element. The support member supports the plurality of winding segments. Either the field element or the armature is a rotor. The armature winding includes windings of two systems, which are electrically independent, and in which an armature winding of a first system is closer to the field element in a radial direction than an armature winding of a second system. The rotary electric machine further comprises: a current control device configured to control a current of the armature winding of the first system and the armature winding of the second system. The current control device is configured to differentiate a current waveform of the armature winding of the first system and a current waveform of the armature winding of the second system from each other in consideration of a difference in a magnetic flux waveform of the field element caused by a difference in a distance from the field element in the radial direction.

In consideration of the difference in magnetic flux waveforms from the field element caused by a difference in the distance to the field element in the radial direction, the current control device differentiates a current waveform to the armature winding of the first system from a current waveform to the armature winding of the second system. Therefore, the torque waveforms can be approximated to a sinusoidal shape inside and outside in the radial direction. Therefore, the rotary electric machine can be driven with low vibration and low noise.

According to the second example, in the first example, the current control device is configured to reduce a peak value of the current waveform of the armature winding of the first system correspondingly to a magnetic flux waveform of the armature winding of the first system that becomes larger in a peak value compared to the magnetic flux waveform of the armature winding of the second system.

The configuration enables to suppress the peak value of the torque waveform from protruding, thereby to enable to suppress a torque ripple.

According to the third example, in the second example, the armature winding includes phase windings of three phases. The phase windings of the armature winding of the first system and the phase windings of the armature winding of the second system, which are same in a phase, are at a same position in a circumferential direction.

This configuration enables to facilitate manufacturing.

According to the fourth example, in the second example, the armature winding includes phase windings of six phases. The phase windings of the armature winding of the first system are shifted relative to the phase windings of the armature winding of the second system in a circumferential direction, such that respective electric angles are different from each other by a predetermined angle.

This configuration enables to suppress occurrence of a torque ripple as compared with the case of a three-phase configuration.

According to the fifth example, in any one of the first to third example, the current control device is configured to cause a current to flow through only the armature winding of the second system, when an operating point of the rotary electric machine is in a high rotation speed range.

This configuration enables, in a high rotation speed range, the windings are switched to cause the current to flow only through the armature winding of the second system. In this way, the configuration enables to reduce the number of turns and high speed rotation. At this time, the induced voltage can be effectively suppressed by passing the current through the armature winding of the second system, which is distant from the field element. In addition, compared to the armature winding of the first system, the magnetic flux waveform changes gently. Therefore, torque ripple can be easily suppressed. In the low rotation speed range, by switching the windings, a current is caused to flow through the armature windings of the first system and the second system. This configuration enables to increase the number of turns and to output a high torque.

According to the sixth example, a control method is for a rotary electric machine, in which either a field element or an armature is a rotor. The control method is to be implemented by a control device. The rotary electric machine includes the field element having a plurality of magnetic poles and the armature having a toothless configuration. The armature includes an armature winding including a plurality of winding segments and a support member provided on a radially inner side or a radially outer side of the armature winding and provided on an opposite side of the armature winding from the field element, the support member supporting the winding segments. The armature winding includes windings of two systems, which are electrically independent, in which an armature winding of a first system is closer to the field element in a radial direction than an armature winding of a second system. The control device haves a current control function to control a current of the armature winding of the first system and the armature winding of the second system. The method comprises: causing the control device to differentiate a current waveform of the armature winding of the first system and a current waveform of the armature winding of the second system from each other in consideration of a difference in a magnetic flux waveform of the field element caused by a difference in a distance from the field element in the radial direction.

In this way, the same effects as those of the first example can be obtained.

The embodiments will be described below with reference to the drawings. Parts of the embodiments functionally and/or structurally corresponding to each other and/or associated with each other will be denoted by the same reference numbers or by reference numbers which are different in the hundreds place from each other. The corresponding and/or associated parts may refer to the explanation in the other embodiments.

The rotary electric machine according to the embodiments is configured to be used, for example, as a power source for vehicles. The rotary electric machine may, however, be used widely for industrial, automotive, aerial, domestic, office automation, or game applications. In the following embodiments, the same or equivalent parts will be denoted by the same reference numbers in the drawings, and explanation thereof in detail will be omitted.

First Embodiment

Figure 2:
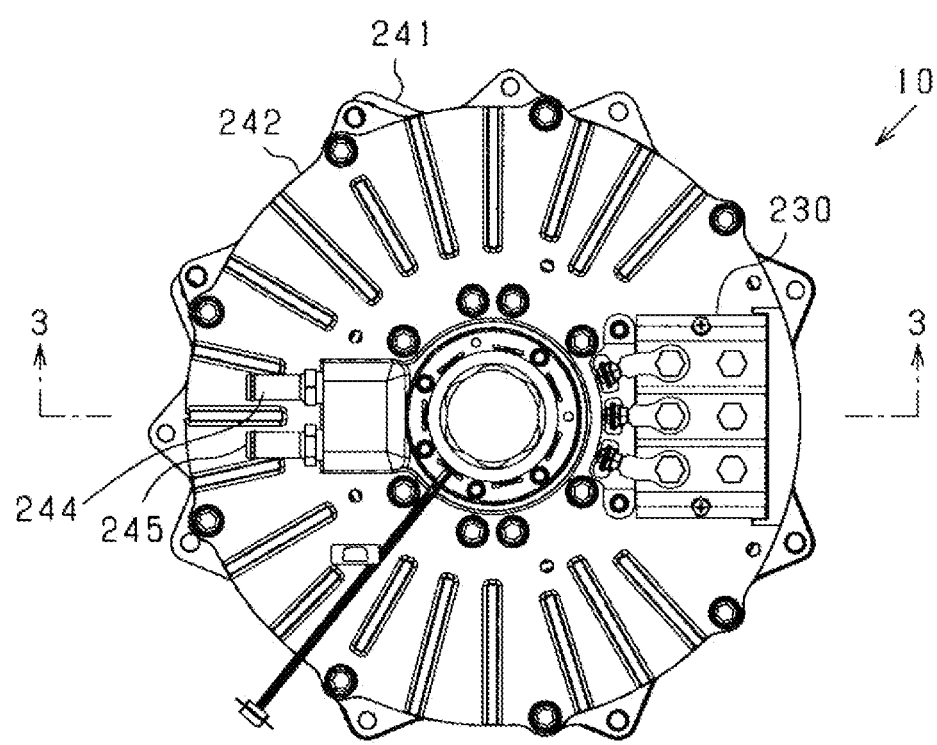
FIG. 2 is a plan view of the rotary electric machine.
Figure 3:
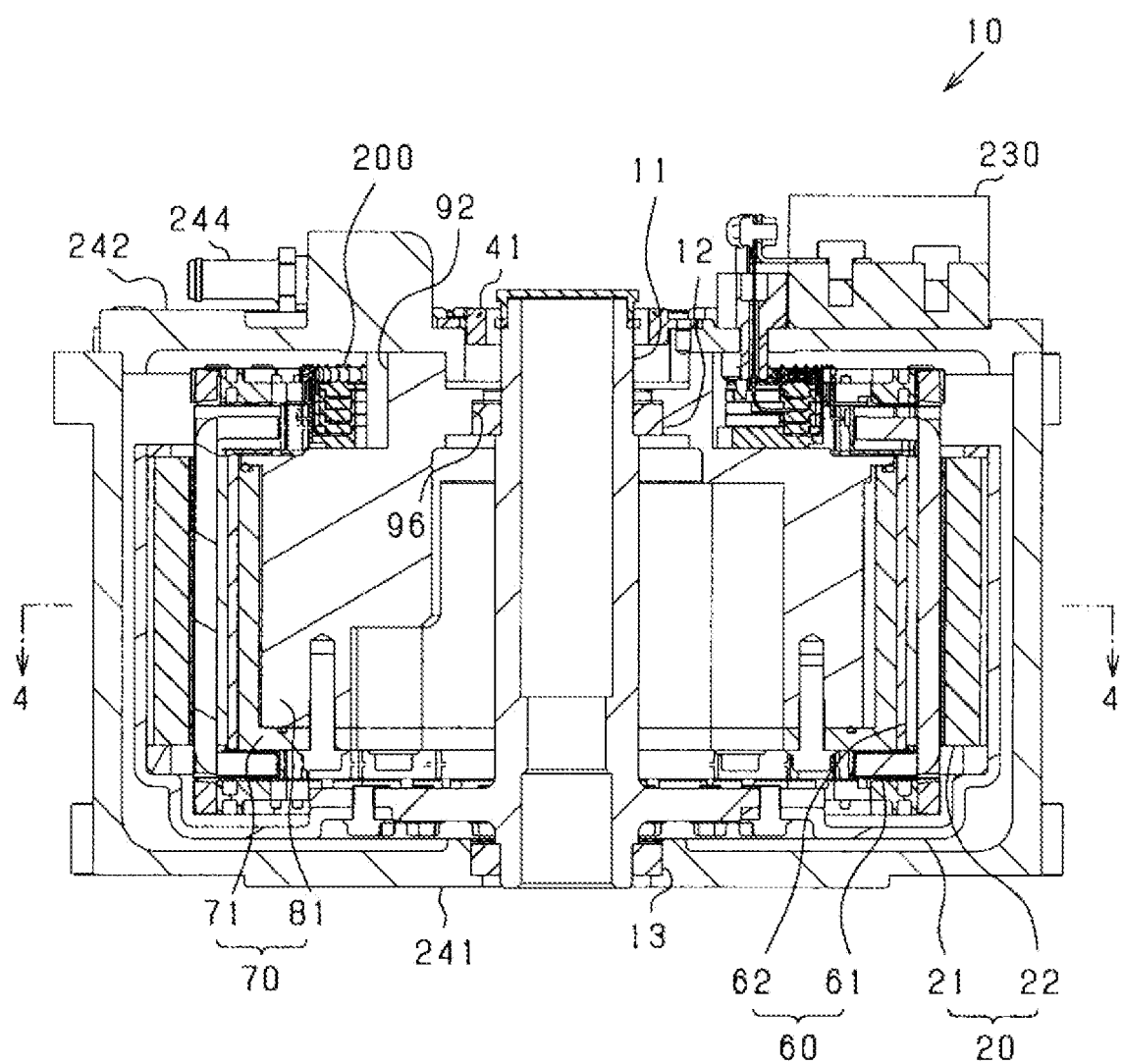
FIG. 3 is a longitudinal sectional view of the rotary electric machine.
Figure 4:
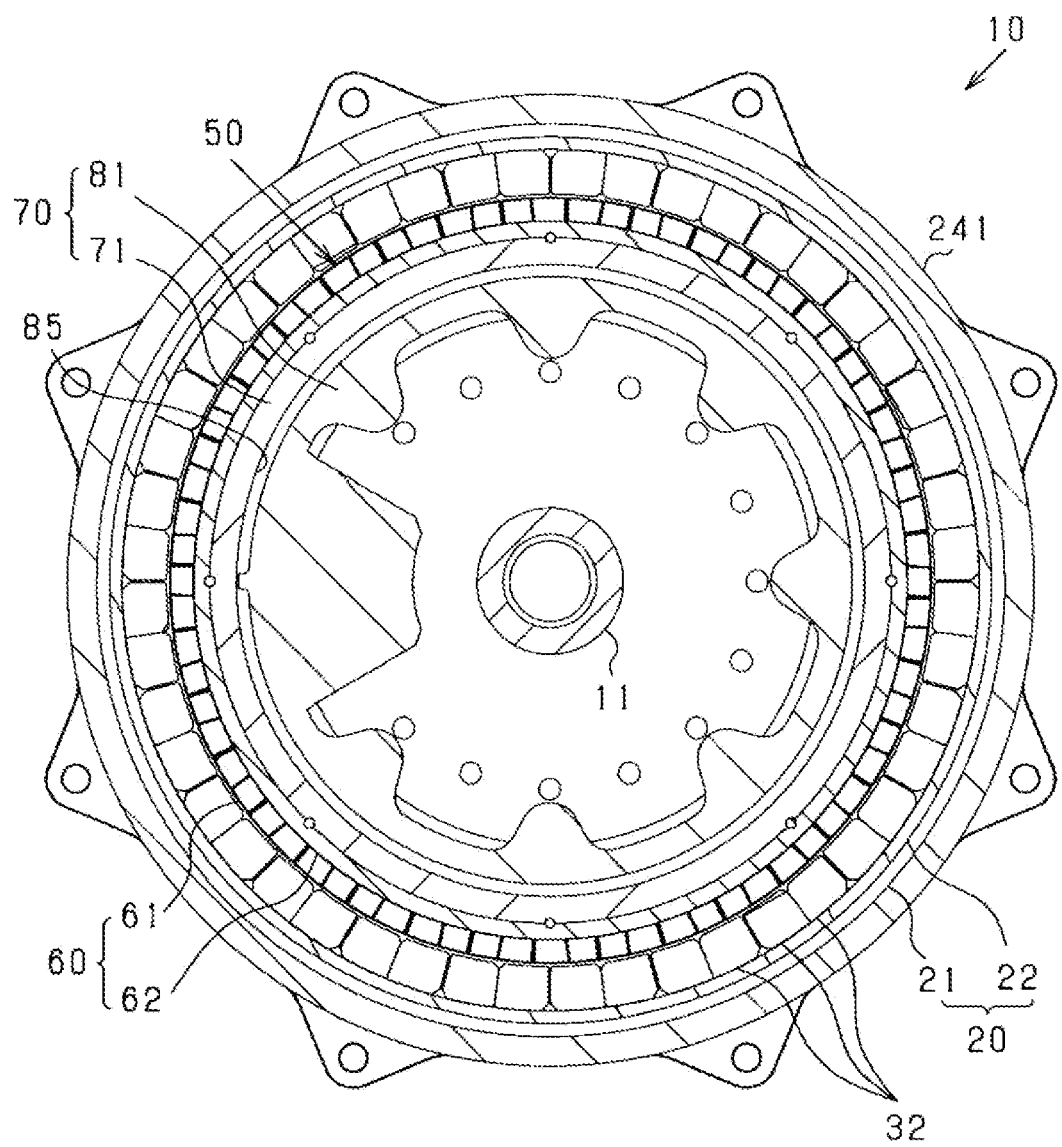
FIG. 4 is a transverse sectional view of the rotary electric machine.
Figure 5:
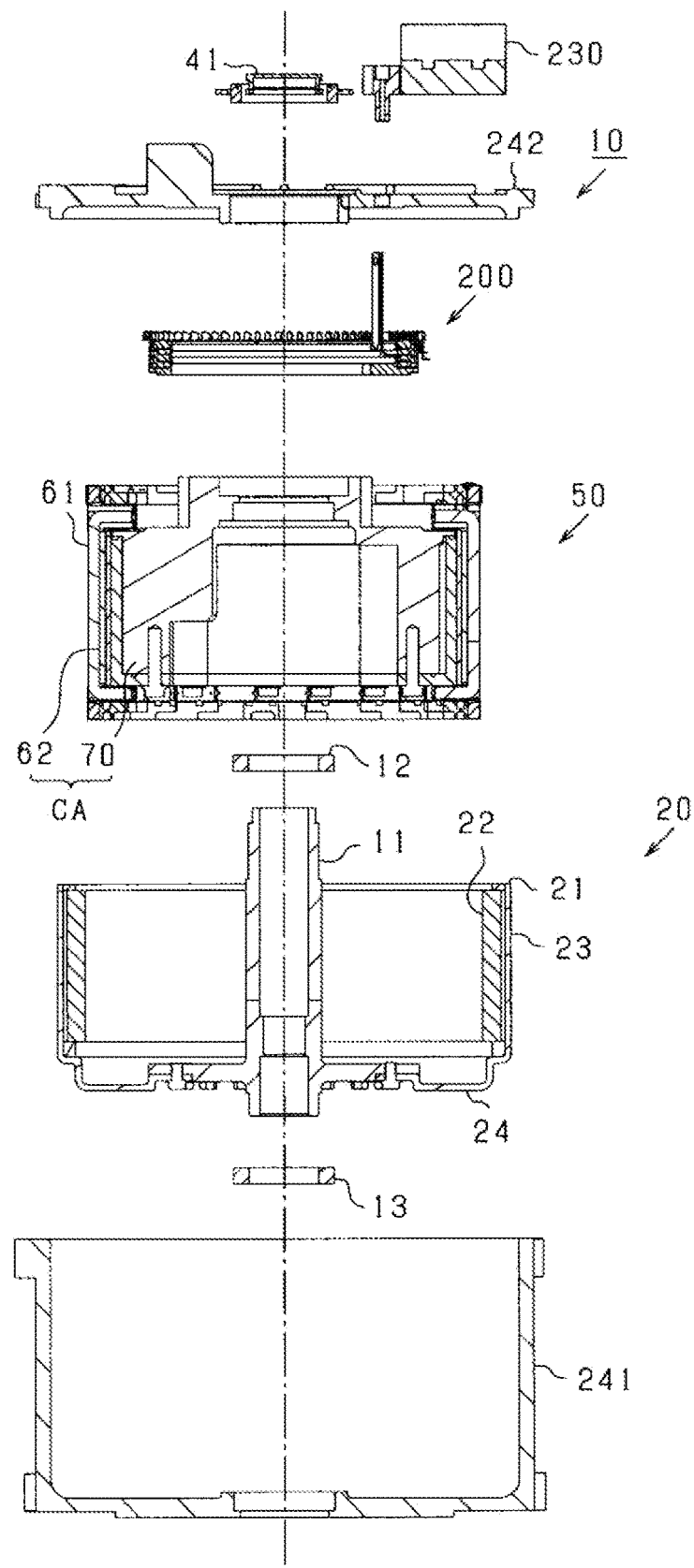
FIG. 5 is an exploded sectional view of the rotary electric machine.

A rotary electric machine 10 according to the present embodiment is a synchronous multi-phase alternating current (AC) motor and has an outer rotor structure (outer rotating structure). A schema of the rotary electric machine 10 is illustrated in FIGS. 1 to 5. FIG. 1 is a perspective view illustrating the entire rotary electric machine 10. FIG. 2 is a plan view of the rotary electric machine 10. FIG. 3 is a longitudinal sectional view of the rotary electric machine 10 (a sectional view taken along line 3-3 in FIG. 2). FIG. 4 is a transverse sectional view of the rotary electric machine 10 (a sectional view taken along line 4-4 in FIG. 3). FIG. 5 is an exploded sectional view illustrating components of the rotary electric machine 10 in an exploded manner. In the following description, in the rotary electric machine 10, a direction in which a rotating shaft 11 extends is defined as an axial direction, a direction radially extending from a center of the rotating shaft 11 is defined as a radial direction, and a direction circumferentially extending around the rotating shaft 11 is defined as a circumferential direction.

In a broad classification, the rotary electric machine 10 includes: a rotary electric machine body including a rotor 20, a stator unit 50, and a bus bar module 200; and a housing 241 and a housing cover 242 both of which are provided so as to surround the rotary electric machine body. Each of these members is disposed coaxially with the rotating shaft 11 integrally provided in the rotor 20, and is assembled in the axial direction in a predetermined order to form the rotary electric machine 10. The rotating shaft 11 is supported by a pair of bearings 12 and 13 provided in the stator unit 50 and the housing 241, respectively, and is rotatable in this state. The bearings 12 and 13 are, for example, radial ball bearings having an inner race, an outer race, and a plurality of balls disposed therebetween. The rotation of the rotating shaft 11 causes, for example, the axle of a vehicle to rotate. The rotary electric machine 10 can be mounted on a vehicle by fixing the housing 241 to a vehicle body frame or the like.

In the rotary electric machine 10, the stator unit 50 is provided so as to surround the rotating shaft 11, and the rotor 20 is disposed on the outer side of the stator unit 50 in the radial direction. The stator unit 50 includes a stator 60 and a stator holder 70 assembled to the inner side of the stator 60 in the radial direction. The rotor 20 and the stator 60 are disposed to face each other in the radial direction with an air gap interposed therebetween. The rotor 20 rotates integrally with the rotating shaft 11, so that the rotor 20 rotates on the outer side of the stator 60 in the radial direction. The rotor 20 corresponds to a "field element", and the stator 60 corresponds to an "armature".

Figure 6:
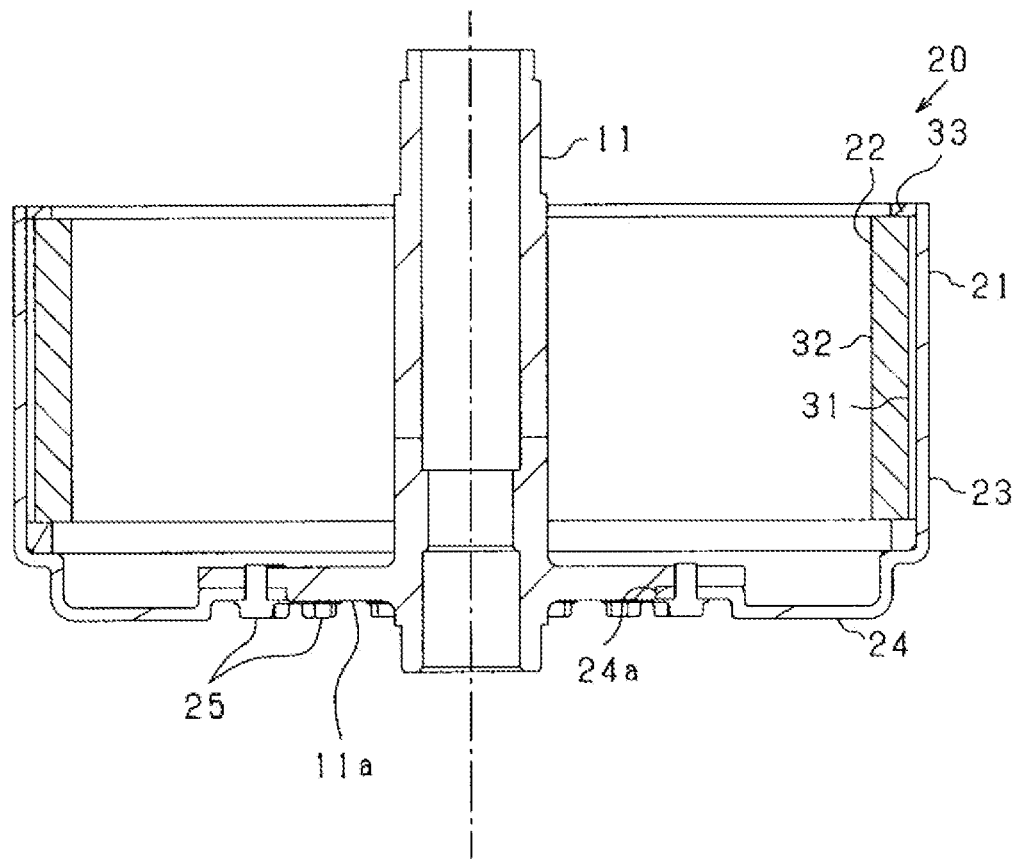
FIG. 6 is a sectional view of a rotor.

FIG. 6 is a longitudinal sectional view of the rotor 20. As illustrated in FIG. 6, the rotor 20 includes a substantially cylindrical rotor carrier 21 and an annular magnet unit 22 fixed to the rotor carrier 21. The rotor carrier 21 includes a cylinder 23 having a cylindrical shape and an end plate portion 24 provided at one end of the cylinder 23 in the axial direction. The cylinder 23 and the end plate portion 24 are integrated to form the rotor carrier 21. The rotor carrier 21 functions as a magnet retainer, and the magnet unit 22 is fixed to the inner side of the cylinder 23 in the radial direction in an annular shape. A through-hole 24a is formed in the end plate portion 24. The rotating shaft 11 is fixed to the end plate portion 24 by using a fastener 25 such as a bolt while the rotating shaft 11 is inserted through the through-hole 24a. The rotating shaft 11 has a flange 11a extending in a direction intersecting (orthogonal to) the axial direction. The rotor carrier 21 is fixed to the rotating shaft 11 while the flange 11a and the end plate portion 24 are surface-joined.

The magnet unit 22 includes a cylindrical magnet holder 31, a plurality of magnets 32 fixed to an inner peripheral surface of the magnet holder 31, and an end plate 33 fixed to an opposite side of the end plate portion 24 of the rotor carrier 21 among both sides in the axial direction. The magnet holder 31 has the same length dimension as the magnet 32 in the axial direction. The magnet 32 is provided in a state of being surrounded by the magnet holder 31 from the outer side in the radial direction. The magnet holder 31 and the magnet 32 are fixed while being in contact with the end plate 33 at the end on one side in the axial direction. The magnet unit 22 corresponds to a "magnet unit".

Figure 7:
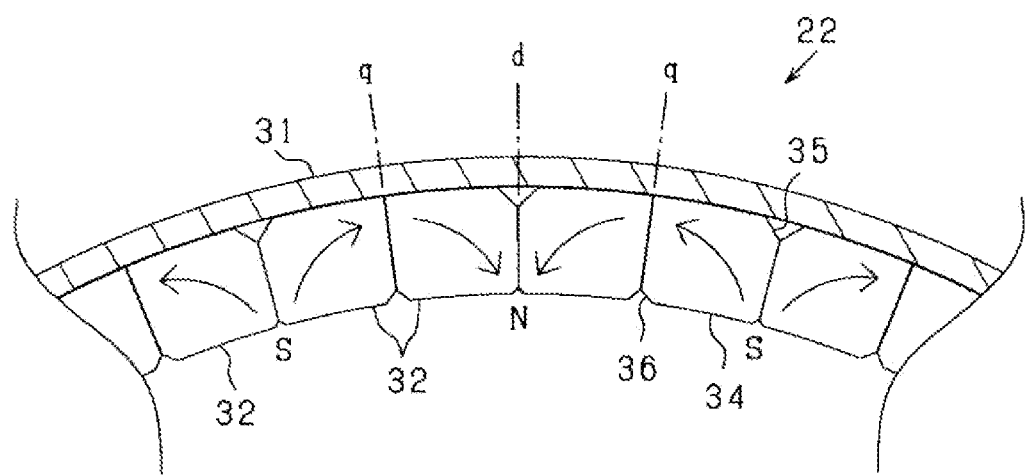
FIG. 7 is a partial transverse sectional view illustrating a sectional structure of a magnet unit.

FIG. 7 is a partial transverse sectional view illustrating a sectional structure of the magnet unit 22. In FIG. 7, the direction of the easy axis of magnetization of the magnet 32 is indicated by an arrow.

In the magnet unit 22, the magnets 32 are provided side by side such that the polarities are alternately changed along the circumferential direction of the rotor 20. Thus, the magnet unit 22 has a plurality of magnetic poles in the circumferential direction. The magnet 32 is a polar anisotropic permanent magnet, and is formed using a sintered neodymium magnet having an intrinsic coercive force of 400 [kA/m] or more and a remanent flux density Br of 1.0 [T] or more.

A peripheral surface of the magnet 32 on the inner side in the radial direction (stator 60 side) is a magnetic flux acting surface 34 on which a magnetic flux is transmitted and received. The magnet unit 22 intensively generates a magnetic flux in a region on or near the d-axis serving as the center of the magnetic pole on the magnetic flux acting surface 34 of the magnet 32. Specifically, in the magnet 32, the directions of the easy axis of magnetization differ between the d-axis side (portion closer to the d-axis) and the q-axis side (portion closer to the q-axis). The direction of the easy axis of magnetization on the d-axis side is parallel to the d-axis, whereas the direction of the easy axis of magnetization on the q-axis side is orthogonal to the q-axis. In this case, an arc-shaped magnetic path is formed along the direction of the easy axis of magnetization. In short, the magnet 32 is oriented such that the direction of the easy axis of magnetization is parallel to the d-axis serving as the center of the magnetic pole on a side of the d-axis as compared with that on a side of the q-axis serving as the boundary of the magnetic pole.

In the magnet 32, since the magnetic path is formed in an arc shape, the length of the magnetic path is greater than the thickness dimension of the magnet 32 in the radial direction. With this configuration, the permeance of the magnet 32 increases, and the magnet 32 can exhibit an ability equivalent or corresponding to a magnet having a large volume of magnets, without changing the volume of magnets.

Two magnets 32 adjacent to each other in the circumferential direction as one set constitutes one magnetic pole. That is, the plurality of magnets 32 arranged in the circumferential direction in the magnet unit 22 has division surfaces on the d-axis and the q-axis. The magnets 32 are disposed while being in contact with or close to each other. The magnet 32 has an arc-shaped magnetic path as described above. On the q-axis, the N-pole and the S-pole face each other in the magnets 32 adjacent to each other in the circumferential direction. Therefore, the permeance on or near the q-axis can be improved. In addition, since the magnets 32 on both sides across the q-axis attract each other, the magnets 32 can maintain a state where the magnets 32 are in contact with each other. Therefore, this also contributes to improvement of permeance.

Figure 8:
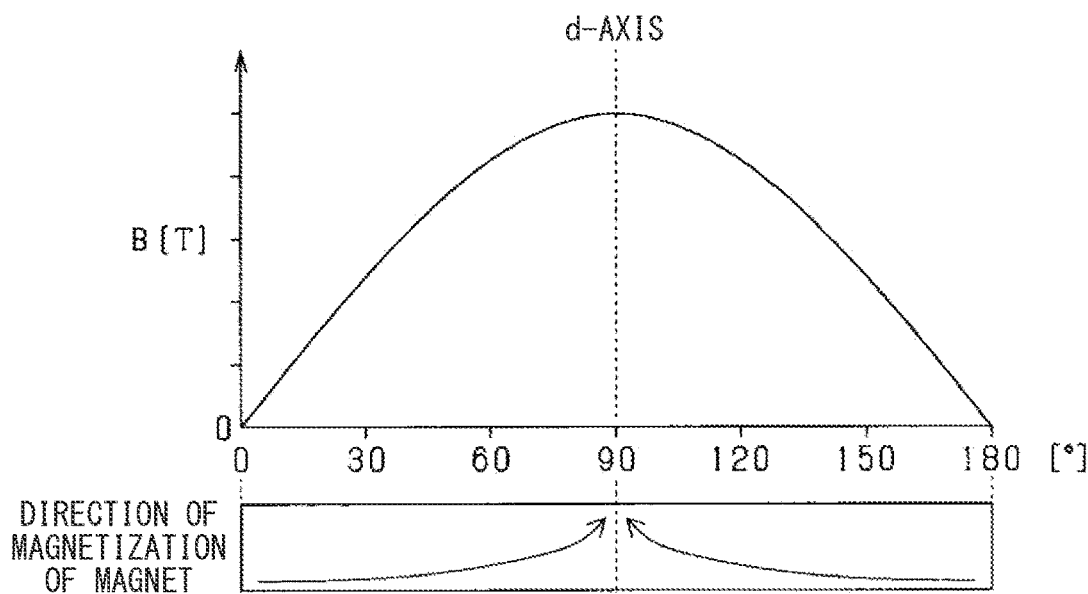
FIG. 8 is a graph illustrating a relationship between an electrical angle and a magnetic flux density for a magnet according to the embodiment.
Figure 9:
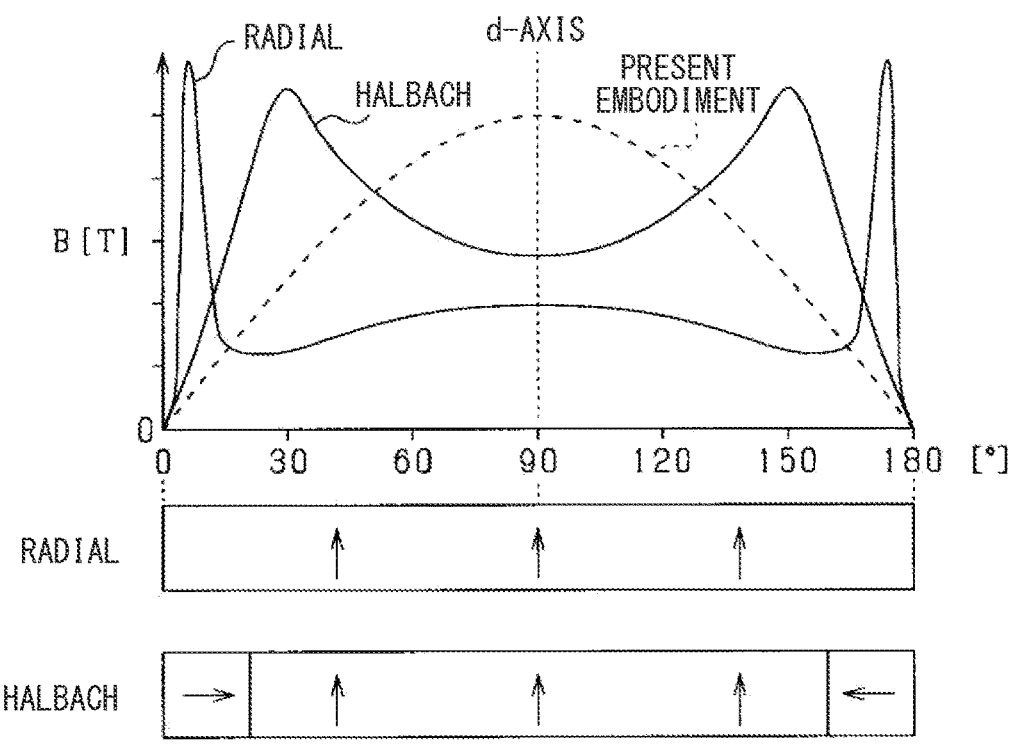
FIG. 9 is a graph illustrating a relationship between an electrical angle and a magnetic flux density for a magnet according to a comparative example.

In the magnet unit 22, since a magnetic flux flows in an arc shape between the adjacent N-pole and S-pole by each magnet 32, the magnetic path thereof is longer than, for example, that of the radial anisotropic magnet. Therefore, as illustrated in FIG. 8, the shape of the magnetic flux density distribution is close to a sine wave. As a result, unlike the magnetic flux density distribution of the radial anisotropic magnet illustrated in FIG. 9 as a comparative example, the magnetic flux can be concentrated on the center side of the magnetic pole, and the torque of the rotary electric machine 10 can be increased. Further, in the magnet unit 22 according to the present embodiment, the fact that there is a difference in the magnetic flux density distribution as compared with the conventional Halbach array magnet can be confirmed. In FIGS. 8 and 9, the horizontal axis represents the electrical angle, and the vertical axis represents the magnetic flux density. In FIGS. 8 and 9, 90° on the horizontal axis represents the d-axis (i.e., the center of the magnetic pole), and 0° and 180° on the horizontal axis each represent the q-axis.

That is, according to each magnet 32 having the above-described configuration, the magnetic flux on the d-axis is strengthened in the magnet unit 22, and the change in the magnetic flux on or near the q-axis is suppressed. Accordingly, implementation of the magnet unit 22 can be suitably performed in which the surface magnetic flux change from the q-axis to the d-axis is gentle in each magnetic pole.

The sine wave matching percentage of the magnetic flux density distribution is only required to be a certain value, for example, a value of 40% or more. This value setting can reliably improve the amount of magnetic flux in the central portion of the waveform, as compared with the case of using a radially oriented magnet or a parallel oriented magnet having a sine wave matching percentage of about 30%. Alternatively, when the sine wave matching percentage is set to 60% or more, the amount of magnetic flux in the central portion of the waveform can be reliably improved, as compared with a concentrated magnetic flux array such as a Halbach array.

In the radial anisotropic magnet illustrated in FIG. 9, the magnetic flux density changes steeply on or near the q-axis. As the change in the magnetic flux density is steeper, the eddy current undesirably increases in a stator winding 61 of the stator 60 to be described later. The magnetic flux change on the stator winding 61 side is also steep. On the other hand, in the present embodiment, the magnetic flux density distribution has a magnetic flux waveform close to a sine wave. Therefore, on or near the q-axis, the change in the magnetic flux density is smaller than the change in the magnetic flux density of the radial anisotropic magnet. This feature makes it possible to prevent the generation of eddy currents.

In the magnet 32, a recess 35 is formed in a predetermined range including the d-axis on the outer peripheral surface on the outer side in the radial direction, and a recess 36 is formed in a predetermined range including the q-axis on the inner peripheral surface on the inner side in the radial direction. In this case, according to the direction of the easy axis of magnetization of the magnet 32, the magnetic path is shortened on or near the d-axis on the outer peripheral surface of the magnet 32, and the magnetic path is shortened on or near the q-axis on the inner peripheral surface of the magnet 32. Therefore, considering the difficulty in causing the magnet 32 to generate a sufficient magnetic flux at a place where the length of the magnetic path is small, the magnet is removed at a place where the magnetic flux is weak.

The magnet unit 22 may use the magnets 32 whose number is identical to the number of the magnetic poles. For example, the magnet 32 is preferably provided such that one magnet is disposed between the d-axes, which serve as the centers of two magnetic poles adjacent to each other in the circumferential direction. In this case, the magnet 32 has a center in the circumferential direction on the q-axis and has a division surface on the d-axis. Alternatively, the magnet 32 may have a center in the circumferential direction on the d-axis instead of the q-axis. As the magnet 32, instead of using magnets whose number is twice the number of magnetic poles or magnets whose number is identical to the number of magnetic poles, an annular magnet connected in an annular shape may be used.

As illustrated in FIG. 3, a resolver 41 as a rotation sensor is provided at an end (upper end in the drawing) on the opposite side of the joint portion with the rotor carrier 21 among both sides in the axial direction of the rotating shaft 11. The resolver 41 includes a resolver rotor fixed to the rotating shaft 11 and a resolver stator disposed to face the outer side of the resolver rotor in the radial direction. The resolver rotor has a disk ring shape. The resolver rotor is provided coaxially with the rotating shaft 11 while the rotating shaft 11 is inserted therethrough. The resolver stator includes a stator core and a stator coil, and is fixed to the housing cover 242.

Figure 10:
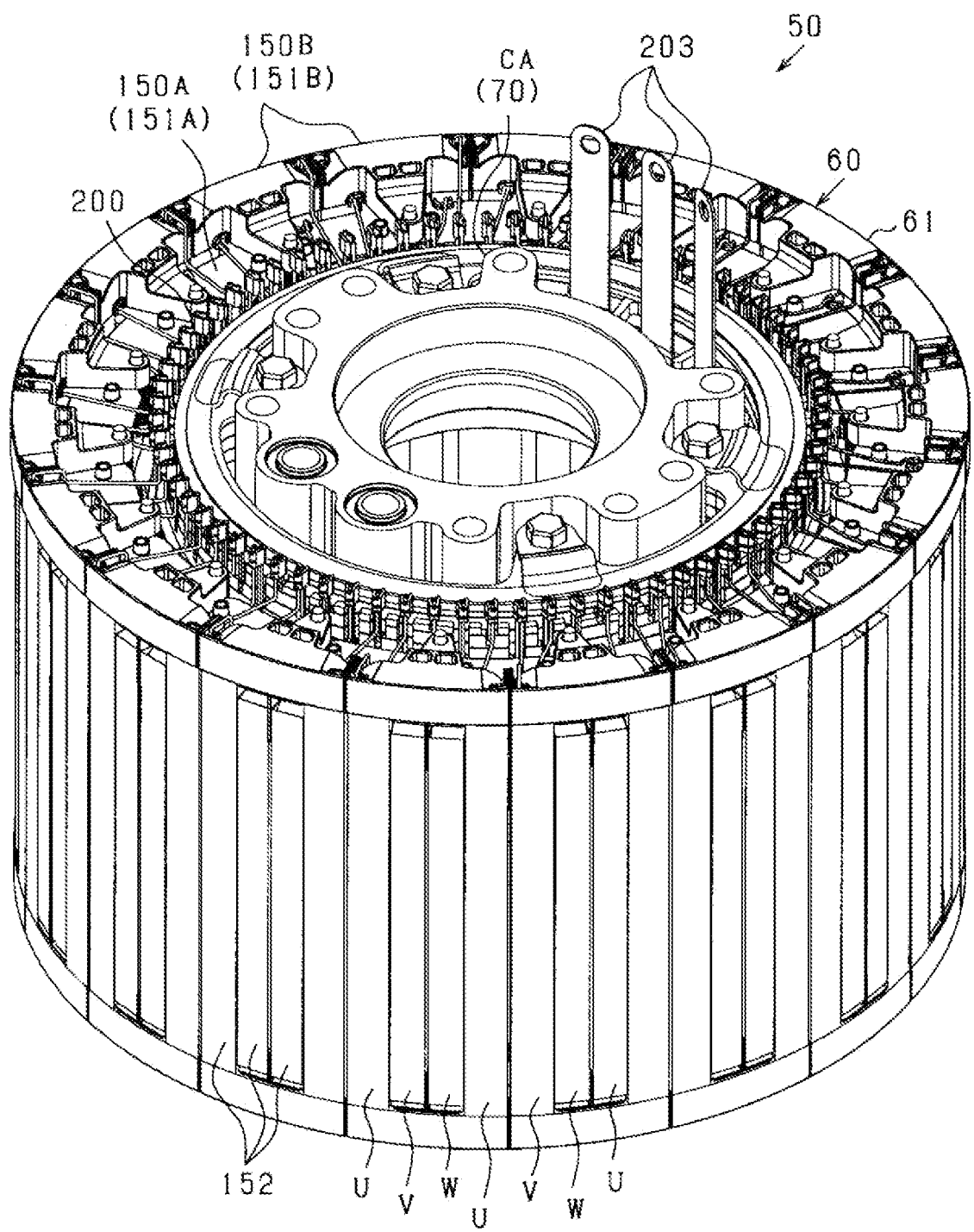
FIG. 10 is a perspective view of a stator unit.
Figure 11:
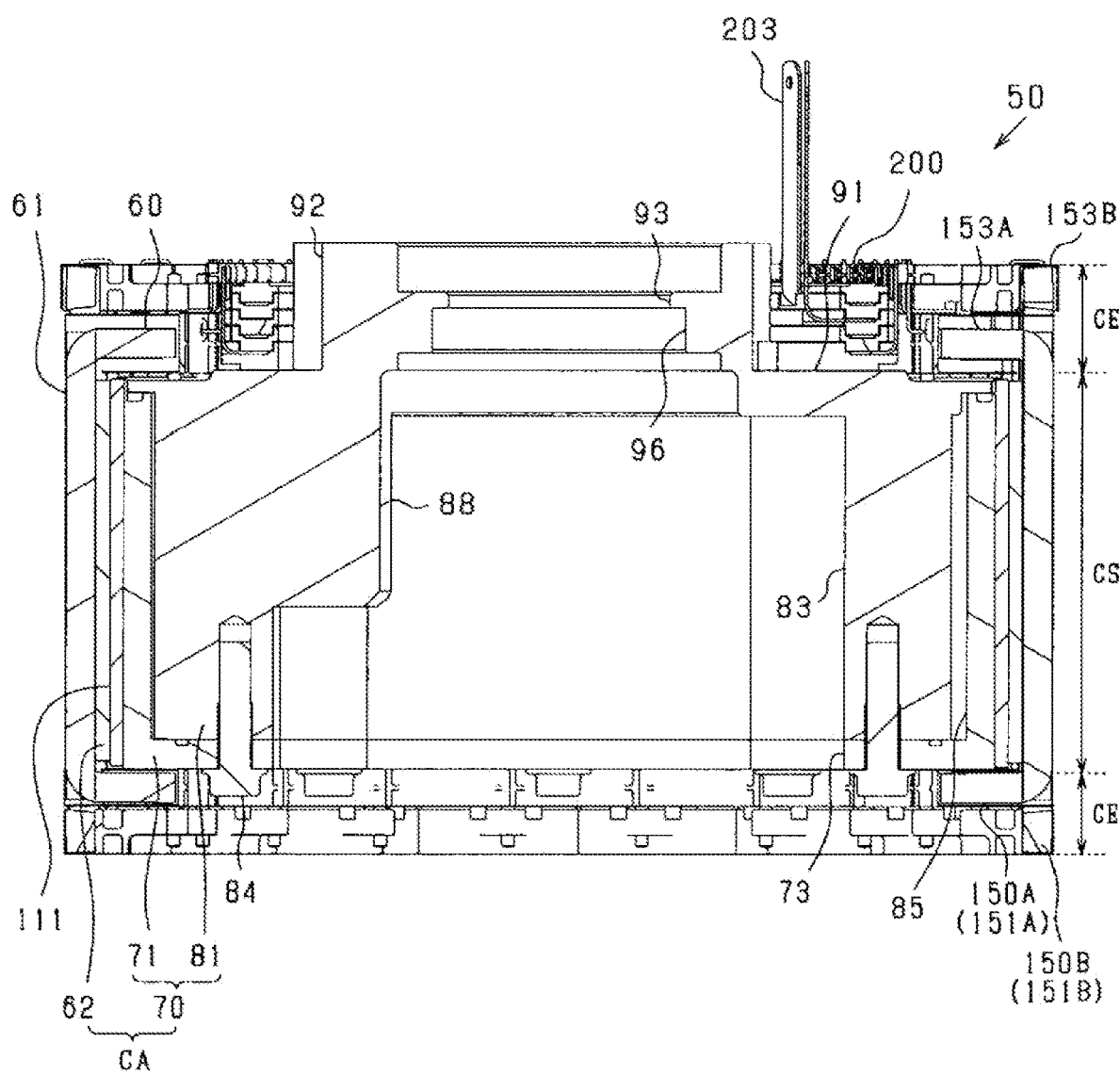
FIG. 11 is a longitudinal sectional view of the stator unit.

Next, a configuration of the stator unit 50 will be described. FIG. 10 is a perspective view of the stator unit 50, and FIG. 11 is a longitudinal sectional view of the stator unit 50. FIG. 11 is a longitudinal sectional view at the same position as FIG. 3.

The stator unit 50 includes the stator 60 and the stator holder 70 on the inner side of the stator 60 in the radial direction. The stator 60 includes the stator winding 61 and a stator core 62. The stator core 62 and the stator holder 70 are integrally provided as a core assembly CA, and a plurality of winding segments 151 constituting the stator winding 61 are assembled to the core assembly CA. The stator winding 61 corresponds to an "armature winding", the stator core 62 corresponds to an "armature core", and the stator holder 70 corresponds to an "armature retainer". The core assembly CA corresponds to a "support member".

Figure 12:
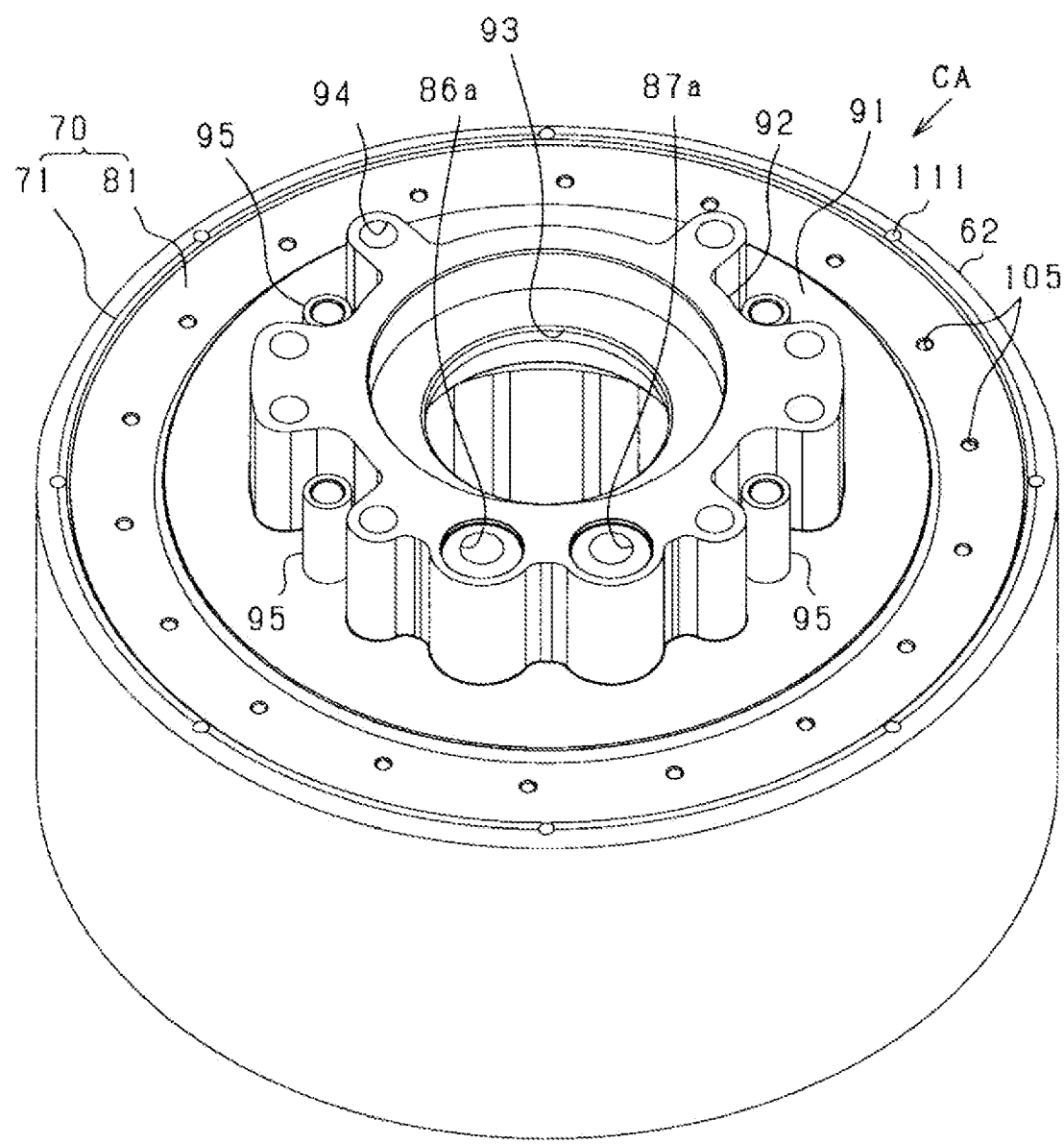
FIG. 12 is a perspective view of a core assembly as viewed from one side in an axial direction.
Figure 13:
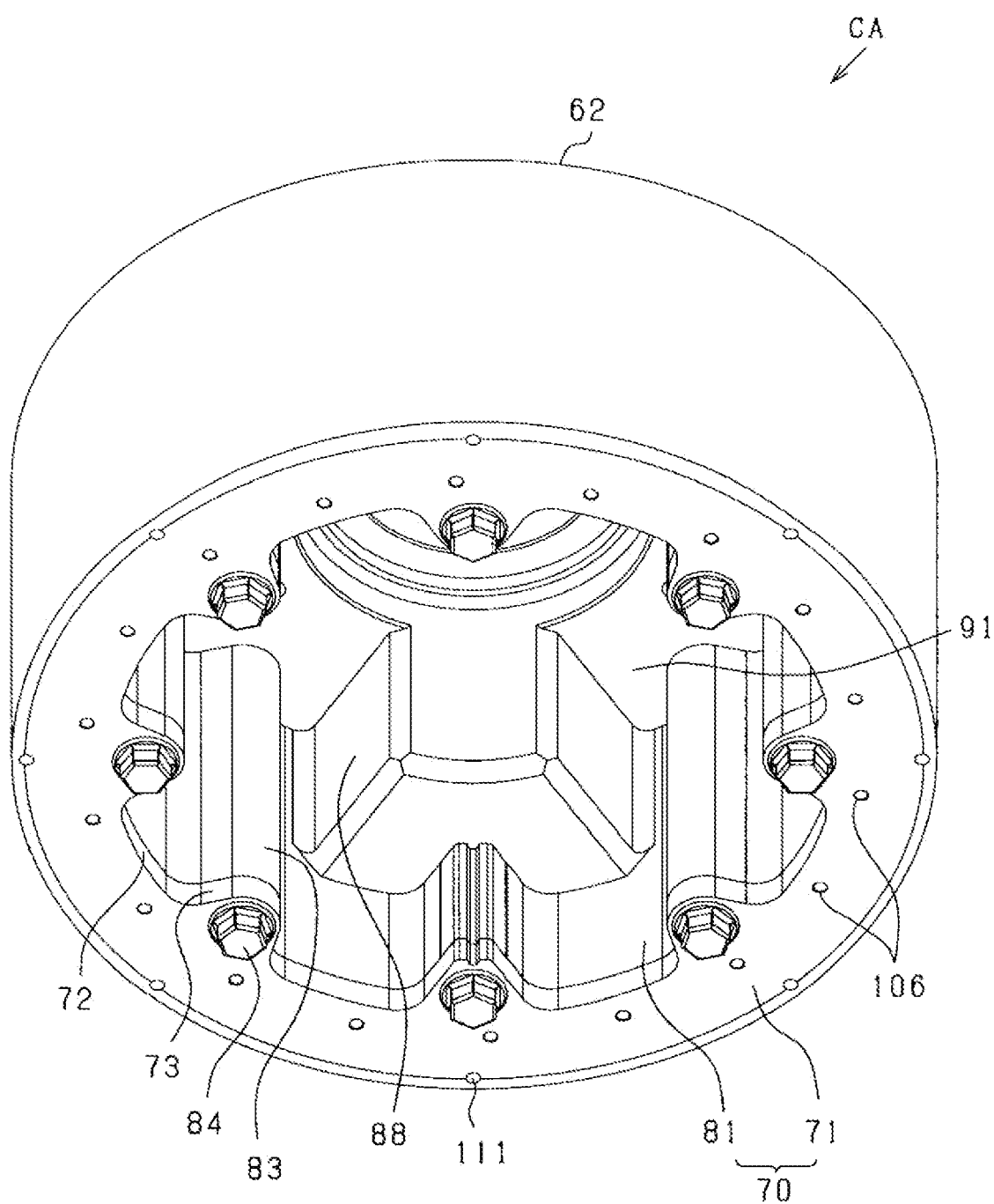
FIG. 13 is a perspective view of the core assembly as viewed from the other side in the axial direction.
Figure 14:
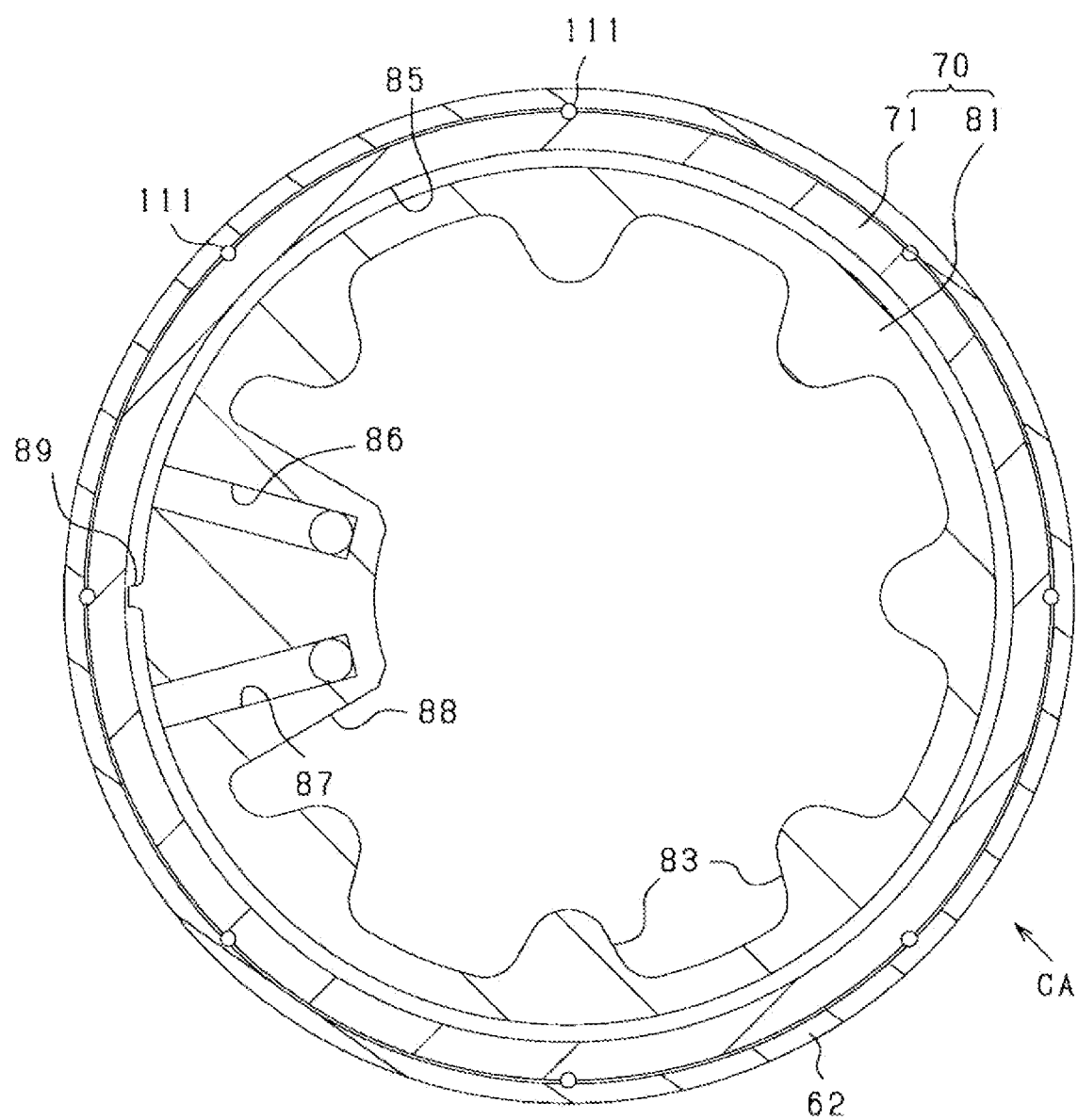
FIG. 14 is a transverse sectional view of the core assembly.
Figure 15:
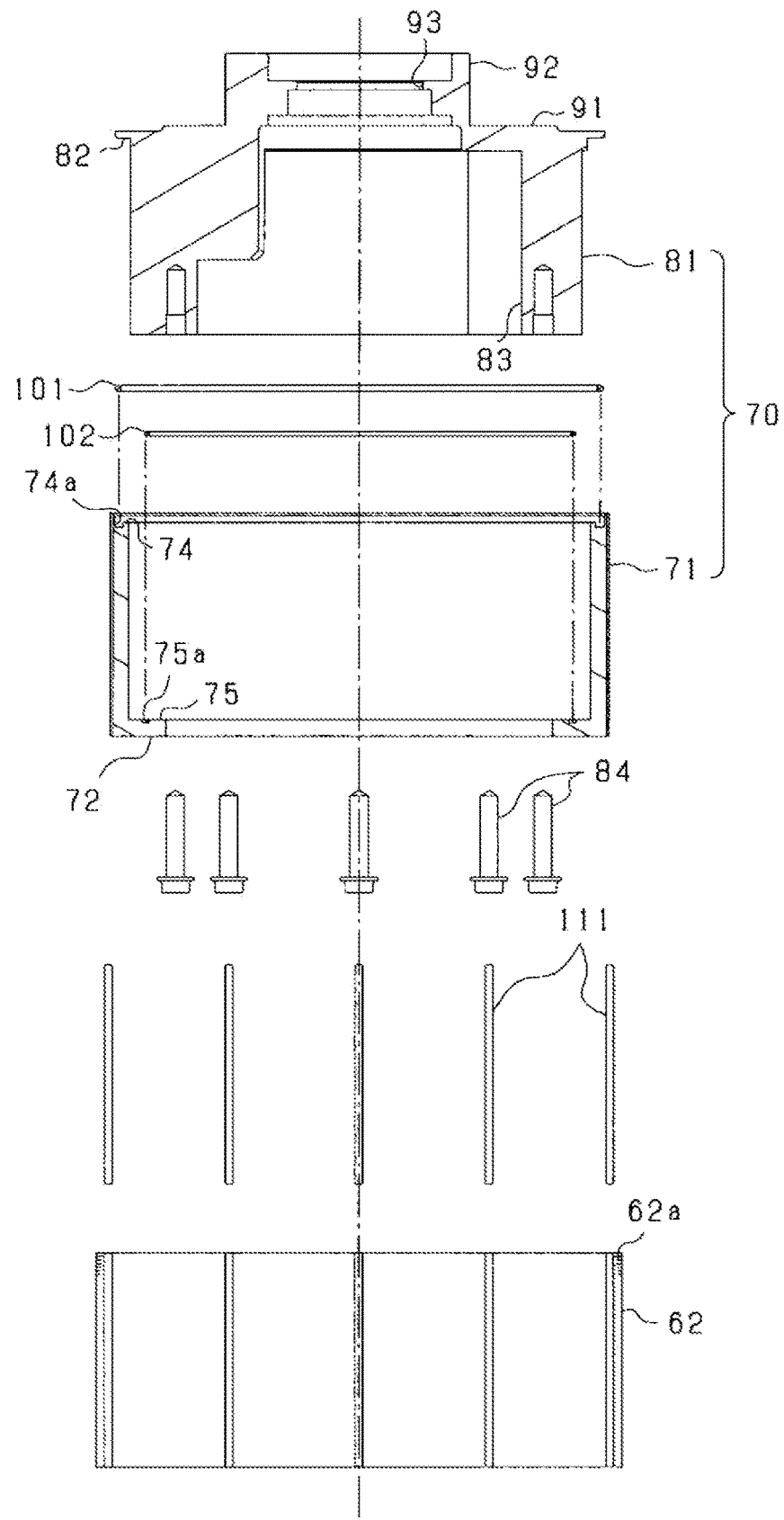
FIG. 15 is an exploded sectional view of the core assembly.

First, the core assembly CA will now be described. FIG. 12 is a perspective view of the core assembly CA as viewed from one side in the axial direction. FIG. 13 is a perspective view of the core assembly CA as viewed from the other side in the axial direction. FIG. 14 is a transverse sectional view of the core assembly CA. FIG. 15 is an exploded sectional view of the core assembly CA.

As described above, the core assembly CA includes the stator core 62 and the stator holder 70 assembled on the inner side of the stator core 62 in the radial direction. In other words, the stator core 62 is integrally assembled to the outer peripheral surface of the stator holder 70.

The stator core 62 is formed as a core sheet stacked body in which core sheets 62a including a magnetic steel sheet, which is a magnetic member, are stacked in the axial direction. The stator core 62 has a cylindrical shape having a predetermined thickness in the radial direction. The stator winding 61 is assembled to the outer side of the stator core 62 in the radial direction, that is, the rotor 20 side. The outer peripheral surface of the stator core 62 has a curved surface shape without protrusions and recesses. The stator core 62 functions as a back yoke. The stator core 62 is formed by stacking a plurality of the core sheets 62a in the axial direction. The core sheet 62a is punched into, for example, an annular plate shape. However, a stator core having a helical core structure may be used as the stator core 62. In the stator core 62 having a helical core structure, a strip-shaped core sheet is used. This core sheet is wound in an annular shape and is stacked in the axial direction to form the stator core 62 having a cylindrical shape as a whole.

In the present embodiment, the stator 60 has a slot-less structure having no tooth for forming a slot, but the configuration thereof may use any of the following (A) to (C).

(A) The stator 60 includes a conductor-to-conductor member between each adjacent two of the conductor portions (intermediate conductor portions 152 to be described later) in the circumferential direction. As the conductor-to-conductor member, a magnetic material having a relationship of $Wt \times Bs \leq Wm \times Br$ is used, where Wt represents a width dimension in the circumferential direction of the conductor-to-conductor member in one magnetic pole, Bs represents a saturation magnetic flux density of the conductor-to-conductor member, Wm represents a width dimension in the circumferential direction of the magnet 32 in one magnetic pole, and Br represents a remanent flux density of the magnet 32.

(B) The stator 60 includes a conductor-to-conductor member between each adjacent two of the conductor portions (intermediate conductor portions 152) in the circumferential direction. A non-magnetic material is used as the conductor-to-conductor member.

(C) The stator 60 does not include a conductor-to-conductor member between each adjacent two of the conductor portions (intermediate conductor portions 152) in the circumferential direction.

As illustrated in FIG. 15, the stator holder 70 includes an outer cylinder member 71 and an inner cylinder member 81. The outer cylinder member 71 is disposed on the outer side in the radial direction and the inner cylinder member 81 is disposed on the inner side in the radial direction, and they are integrally assembled to form the stator holder 70. Each of these members 71 and 81 includes, for example, metal such as aluminum or cast iron, or carbon fiber reinforced plastic (CFRP).

The outer cylinder member 71 is a cylindrical member having the outer peripheral surface and the inner peripheral surface, both of which are formed into an exact circular curved surface. An annular flange 72 extending inward in the radial direction is formed on one end side in the axial direction. The flange 72 includes a plurality of protrusions 73 extending inward in the radial direction at predetermined intervals in the circumferential direction (see FIG. 13). The outer cylinder member 71 includes facing surfaces 74 and 75 each facing the inner cylinder member 81 in the axial direction on one end side and the other end side in the axial direction, respectively. Annular grooves 74a and 75a that extend annularly are formed on the facing surfaces 74 and 75.

The inner cylinder member 81 is a cylindrical member having an outer diameter dimension smaller than an inner diameter dimension of the outer cylinder member 71. An outer peripheral surface of the inner cylinder member 81 is an exact circular curved surface concentric with the outer cylinder member 71. The inner cylinder member 81 includes an annular flange 82 extending outward in the radial direction on one end side in the axial direction. The inner cylinder member 81 is to be assembled to the outer cylinder member 71 while being in contact with the facing surfaces 74 and 75 of the outer cylinder member 71 in the axial direction. As illustrated in FIG. 13, the outer cylinder member 71 and the inner cylinder member 81 are assembled to each other by using a fastener 84 such as a bolt. Specifically, a plurality of protrusions 83 extending inward in the radial direction is formed on the inner peripheral side of the inner cylinder member 81 at predetermined intervals in the circumferential direction. The protrusions 73 and 83 are fastened to each other by using the fastener 84 while the end surface of the protrusion 83 in the axial direction and the protrusion 73 of the outer cylinder member 71 are stacked.

As illustrated in FIG. 14, the outer cylinder member 71 and the inner cylinder member 81 are assembled to each other. In this state, an annular gap is formed between the inner peripheral surface of the outer cylinder member 71 and the outer peripheral surface of the inner cylinder member 81. This gap space serves as a coolant path 85 through which a coolant such as cooling water flows. The coolant path 85 is provided in an annular shape in the circumferential direction of the stator holder 70. More specifically, the inner cylinder member 81 includes a path formation wall 88. The path formation wall 88 protrudes inward in the radial direction on the inner peripheral side of the inner cylinder member 81. In the path formation wall 88, an inlet path 86 and an outlet path 87 are formed, and each of the paths 86 and 87 is open to the outer peripheral surface of the inner cylinder member 81. The inner cylinder member 81 includes, on the outer peripheral surface thereof, a partition 89 for partitioning the coolant path 85 into an inlet side and an outlet side. This configuration allows a coolant flowing in from the inlet path 86 to flow through the coolant path 85 in the circumferential direction, and then flow out from the outlet path 87.

The inlet path 86 and the outlet path 87 each include a one end extending in the radial direction to be open to the outer peripheral surface of the inner cylinder member 81, and each include the other end extending in the axial direction to be open to the end surface of the inner cylinder member 81 in the axial direction. FIG. 12 illustrates an inlet opening 86a communicating with the inlet path 86 and an outlet opening 87a communicating with the outlet path 87. The inlet path 86 and the outlet path 87 respectively communicate with an inlet port 244 and an outlet port 245 (see FIG. 1) attached to the housing cover 242. The coolant enters and exits through the ports 244 and 245, respectively.

A sealing members 101 and 102 for preventing leakage of the coolant in the coolant path 85 is provided at a joint portion between the outer cylinder member 71 and the inner cylinder member 81 (see FIG. 15). Specifically, the sealing members 101 and 102 are, for example, O-rings. The sealing members 101 and 102 are provided in a manner that the annular grooves 74a and 75a of the outer cylinder member 71 respectively receive the sealing members 101 and 102, and the outer cylinder member 71 and the inner cylinder member 81 respectively compress the sealing members 101 and 102.

As illustrated in FIG. 12, the inner cylinder member 81 has an end plate portion 91 on one end side in the axial direction. The end plate portion 91 includes a boss 92 having a hollow cylindrical shape extending in the axial direction. The Boss 92 is provided so as to surround an insertion hole 93 through which the rotating shaft 11 is inserted. The boss 92 includes a plurality of fastener 94 for fixing the housing cover 242. The end plate portion 91 includes a plurality of rods 95 extending in the axial direction on the outer side of the boss 92 in the radial direction. The rod 95 is a portion serving as a fixing portion for fixing the bus bar module 200, and details thereof will be described later. The boss 92 serves as a bearing retainer that retains the bearing 12. The bearing 12 is fixed to a bearing fixing portion 96 provided on the inner peripheral portion of the boss 92 (see FIG. 3).

As illustrated in FIGS. 12 and 13, the outer cylinder member 71 and the inner cylinder member 81 are respectively formed with recesses 105 and 106, both of which are used for fixing a plurality of coil modules 150 to be described later.

Specifically, as illustrated in FIG. 12, a plurality of the recesses 105 are formed at equal intervals in the circumferential direction on the end surface of the inner cylinder member 81 in the axial direction, more specifically, the outer end surface of the end plate portion 91 in the axial direction around the boss 92. As illustrated in FIG. 13, a plurality of the recesses 106 are formed at equal intervals in the circumferential direction on the end surface of the outer cylinder member 71 in the axial direction, more specifically, on the outer end surface of the flange 72 in the axial direction. These recesses 105 and 106 are each provided so as to be arranged on an imaginary circle concentric with the core assembly CA. The recesses 105 and 106 are provided at the same position in the circumferential direction, and the intervals and the number thereof are the same.

The stator core 62 is assembled while generating a compression force in the radial direction with respect to the stator holder 70 in order to secure the strength of assembly with respect to the stator holder 70. Specifically, the stator core 62 is fitted and fixed to the stator holder 70 with a predetermined interference by shrink-fitting or press-fitting. In this case, the stator core 62 and the stator holder 70 can be said to be assembled while stress in the radial direction from one of them to the other is generated. In the case of increasing the torque of the rotary electric machine 10, for example, increase of the diameter of the stator 60 is conceivable. In such a case, the tightening force of the stator core 62 is increased in order to strengthen the joining of the stator core 62 to the stator holder 70. However, if the compressive stress (in other words, residual stress) of the stator core 62 is increased, there is a concern that the stator core 62 may be damaged.

To avoid the above problem, in the present embodiment, in the configuration in which the stator core 62 and the stator holder 70 are fitted and fixed to each other with predetermined interference, a regulation portion is provided at portions where the stator core 62 and the stator holder 70 face each other in the radial direction. The regulation portion regulates displacement of the stator core 62 in the circumferential direction by engagement in the circumferential direction. That is, as illustrated in FIGS. 12 to 14, a plurality of engagement members 111 as regulation portions are provided at predetermined intervals in the circumferential direction between the stator core 62 and the outer cylinder member 71 of the stator holder 70 in the radial direction. The engagement members 111 suppress positional shift between the stator core 62 and the stator holder 70 in the circumferential direction. In this case, a recess is preferably provided in at least one of the stator core 62 and the outer cylinder member 71, and the engagement member 111 may be engaged in the recess. Instead of the engagement member 111, a protrusion may be provided on one of the stator core 62 and the outer cylinder member 71.

In the above-described configuration, the stator core 62 and the stator holder 70 (outer cylinder member 71) are provided while mutual displacement in the circumferential direction is regulated by the engagement member 111 in addition to being fitted and fixed with predetermined interference. Therefore, even if the interference in the stator core 62 and the stator holder 70 is relatively small, the stator core 62 can be prevented from being displaced in the circumferential direction. Since a desired displacement prevention effect can be obtained even if the interference is relatively small, the stator core 62 can be prevented from being damaged due to an excessively large interference. As a result, the displacement of the stator core 62 can be appropriately prevented.

An annular internal space may be formed on the inner peripheral side of the inner cylinder member 81 so as to surround the rotating shaft 11. For example, an electrical component constituting an inverter as a power converter may be disposed in the internal space. The electrical component is, for example, an electrical module making a semiconductor switching element and a capacitor into a package. The electrical module is disposed in contact with the inner peripheral surface of the inner cylinder member 81, so that the electrical module can be cooled by the coolant flowing through the coolant path 85. On the inner peripheral side of the inner cylinder member 81, the plurality of protrusions 83 may be eliminated or the protruding height of the protrusions 83 may be reduced. This change can expand the internal space on the inner peripheral side of the inner cylinder member 81.

Next, the configuration of the stator winding 61 assembled to the core assembly CA will be described in detail. As illustrated in FIGS. 10 and 11, the stator winding 61 is assembled to the core assembly CA. The plurality of winding segments 151 constituting the stator winding 61 are assembled to the outer side of the core assembly CA in the radial direction, that is, to the outer side of the stator core 62 in the radial direction, to be arranged in the circumferential direction.

The stator winding 61 has a plurality of phase windings. The phase windings of respective phases are disposed in a predetermined order in the circumferential direction to be formed in a cylindrical shape (annular shape). In the present embodiment, the stator winding 61 has a three-phase windings including the U-phase, the V-phase, and the W-phase windings.

As illustrated in FIG. 11, the stator 60 includes, in the axial direction, a portion corresponding to a coil side CS facing the magnet unit 22 in the rotor 20 in the radial direction, and a portion corresponding to a coil end CE that is the outer side of the coil side CS in the axial direction. In this case, the stator core 62 is provided in a range corresponding to the coil side CS in the axial direction.

In the stator winding 61, the phase winding of each phase has the plurality of winding segments 151 (see FIG. 16), and the winding segments 151 are individually provided as the coil module 150. That is, the winding segments 151 in the phase windings of each phase are integrally provided to form the coil module 150. The coil modules 150 whose number is predetermined and corresponds to the number of poles constitute the stator winding 61. The coil modules 150 (winding segments 151) of the respective phases are disposed side by side in a predetermined order in the circumferential direction. The conductor portion of the respective phases are thus disposed side by side in a predetermined order at the coil side CS of the stator winding 61. FIG. 10 illustrates an arrangement order of the U-phase, V-phase, and W-phase conductor portions at the coil side CS. In the present embodiment, the number of magnetic poles is set to 24, but the number thereof can be freely set.

Figure 16:
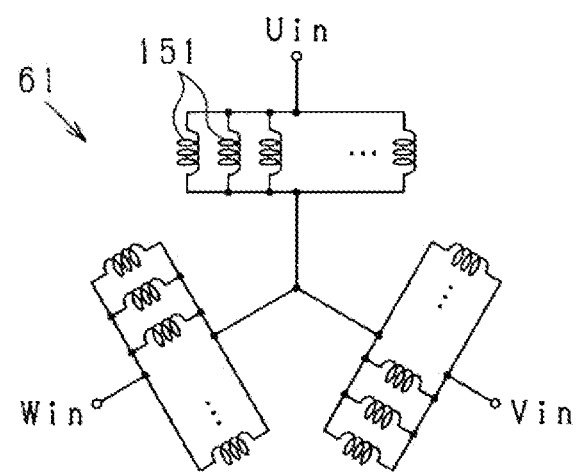
FIG. 16 is a circuit diagram illustrating a connection state of a winding segment in each three-phase winding.

In the stator winding 61, the winding segments 151 of the coil modules 150 are connected in parallel or in series for respective phases, thereby forming phase windings of respective phases. FIG. 16 is a circuit diagram illustrating a connection state of the winding segment 151 in each three-phase winding. FIG. 16 illustrates the winding segments 151 in the phase windings of respective phases in a state of being connected in parallel.

As illustrated in FIG. 11, the coil module 150 is assembled on the outer side of the stator core 62 in the radial direction. In this case, the coil module 150 is assembled while both end portions thereof in the axial direction protrude outward in the axial direction from the stator core 62 (that is, the coil end CE side). In other words, the stator winding 61 has a portion corresponding to the coil end CE protruding outward in the axial direction from the stator core 62, and a portion corresponding to the coil side CS on the inner side of the coil end CE in the axial direction.

The coil module 150 has two types of shapes. One is a shape in which the winding segment 151 is bent inward in the radial direction, that is, bent toward the stator core 62 at the coil end CE. The other is a shape in which the winding segment 151 is not bent inward in the radial direction and extends linearly in the axial direction at the coil end CE. In the following description, for convenience, the winding segment 151 having a bent shape on both end sides in the axial direction is also referred to as a "first winding segment 151A", and the coil module 150 having the first winding segment 151A is also referred to as a "first coil module 150A". On the other hand, the winding segment 151 not having a bent shape on both end sides in the axial direction is also referred to as a "second winding segment 151B", and the coil module 150 having the second winding segment 151B is also referred to as a "second coil module 150B".

Figure 17:
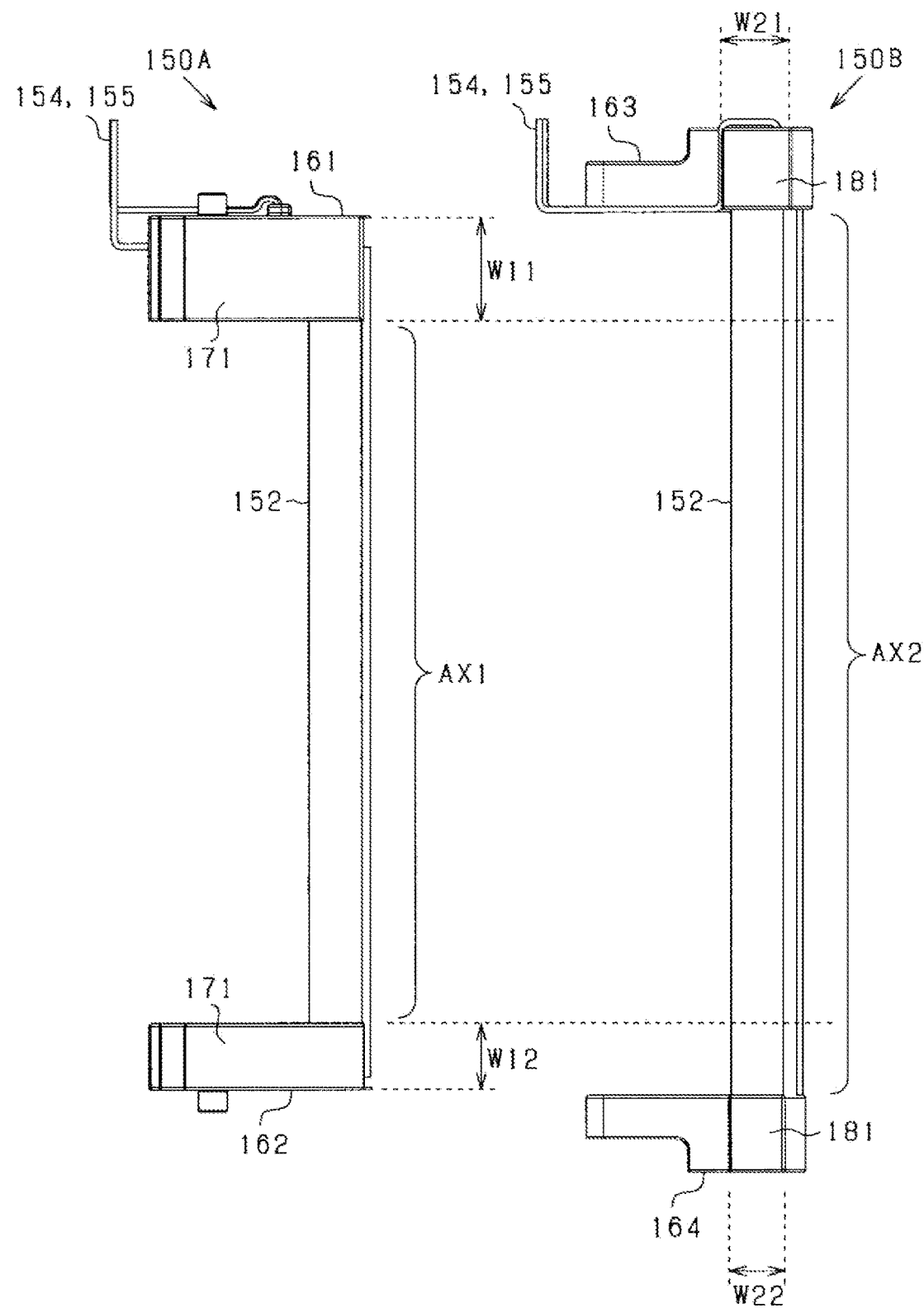
FIG. 17 is a side view illustrating a first coil module and a second coil module arranged side by side for comparison.
Figure 18:
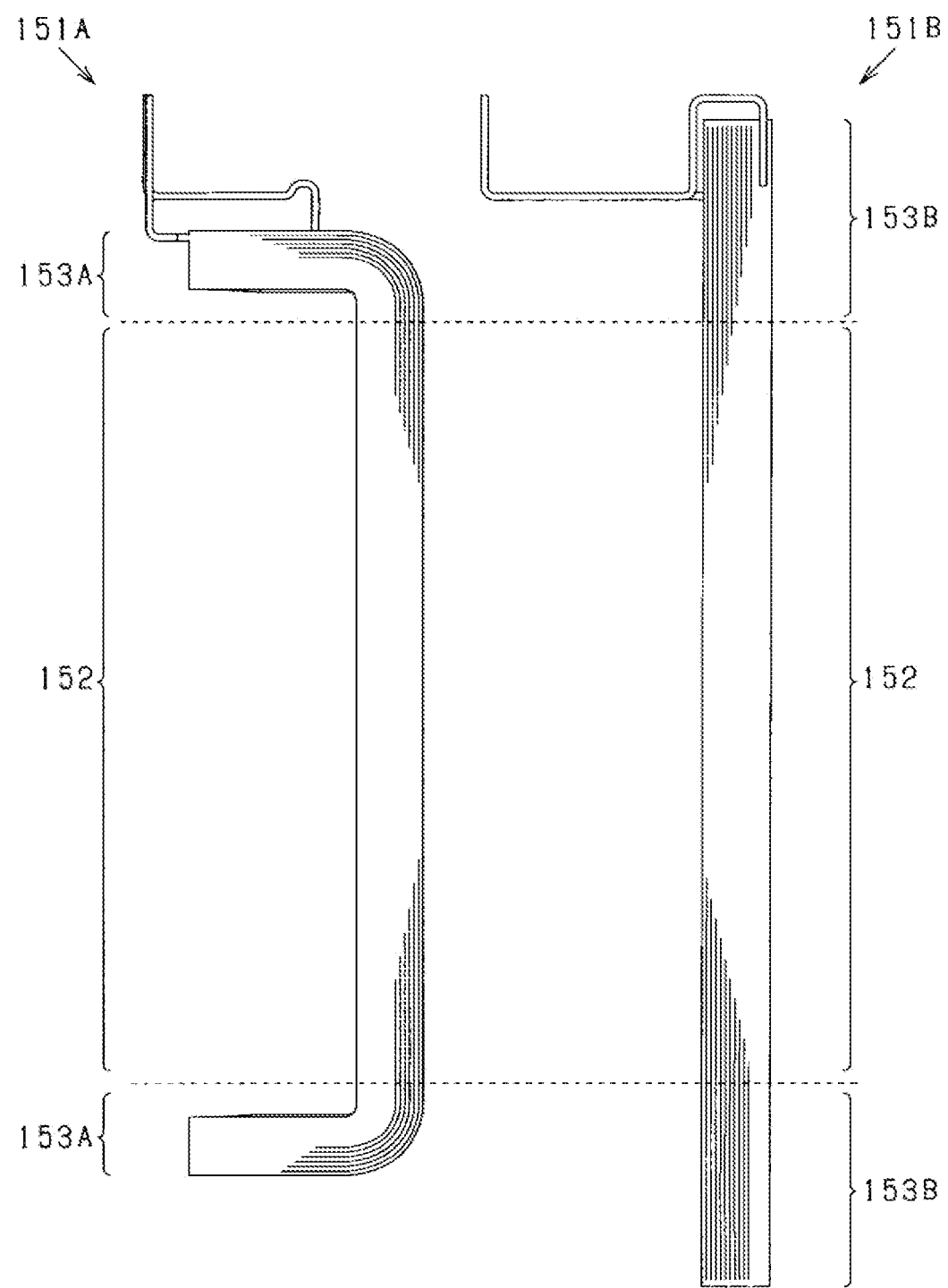
FIG. 18 is a side view illustrating a first winding segment and a second winding segment arranged side by side for comparison.

FIG. 17 is a side view illustrating the first coil module 150A and the second coil module 150B arranged side by side for comparison. FIG. 18 is a side view illustrating the first winding segment 151A and the second winding segment 151B arranged side by side for comparison. As illustrated in these drawings, the coil modules 150A and 150B and the winding segments 151A and 151B have different lengths in the axial direction and different end shapes on both sides in the axial direction. The first winding segment 151A has a substantially C shape in a side view, and the second winding segment 151B has a substantially I shape in a side view. The first winding segment 151A is mounted with insulating covers 161 and 162 as "first insulating covers" on both sides in the axial direction, and the second winding segment 151B is mounted with insulating covers 163 and 164 as "second insulating covers" on both sides in the axial direction.

Next, the configurations of the coil modules 150A and 150B will be described in detail.

Of the coil modules 150A and 150B, first, the first coil module 150A will now be described. FIG. 19(a) is a perspective view illustrating a configuration of the first coil module 150A. FIG. 19(b) is an exploded perspective view illustrating components of the first coil module 150A. FIG. 20 is a sectional view taken along line 20-20 in FIG. 19(a).

Figure 19:
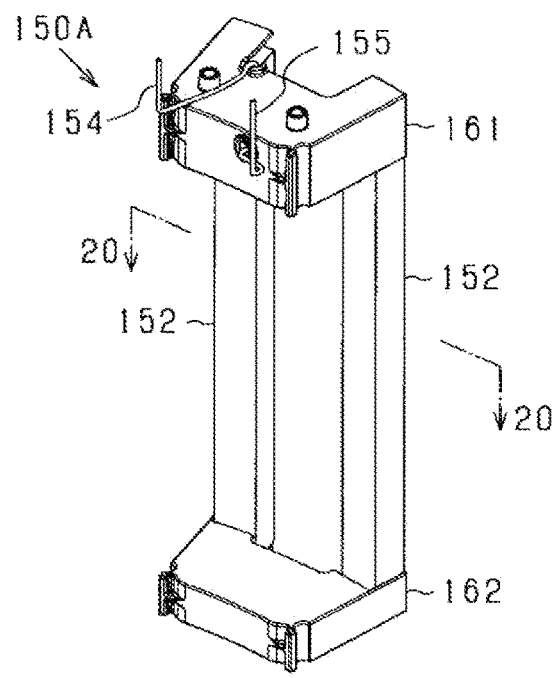
FIG. 19 is a set of views illustrating a configuration of the first coil module.
Figure 19:
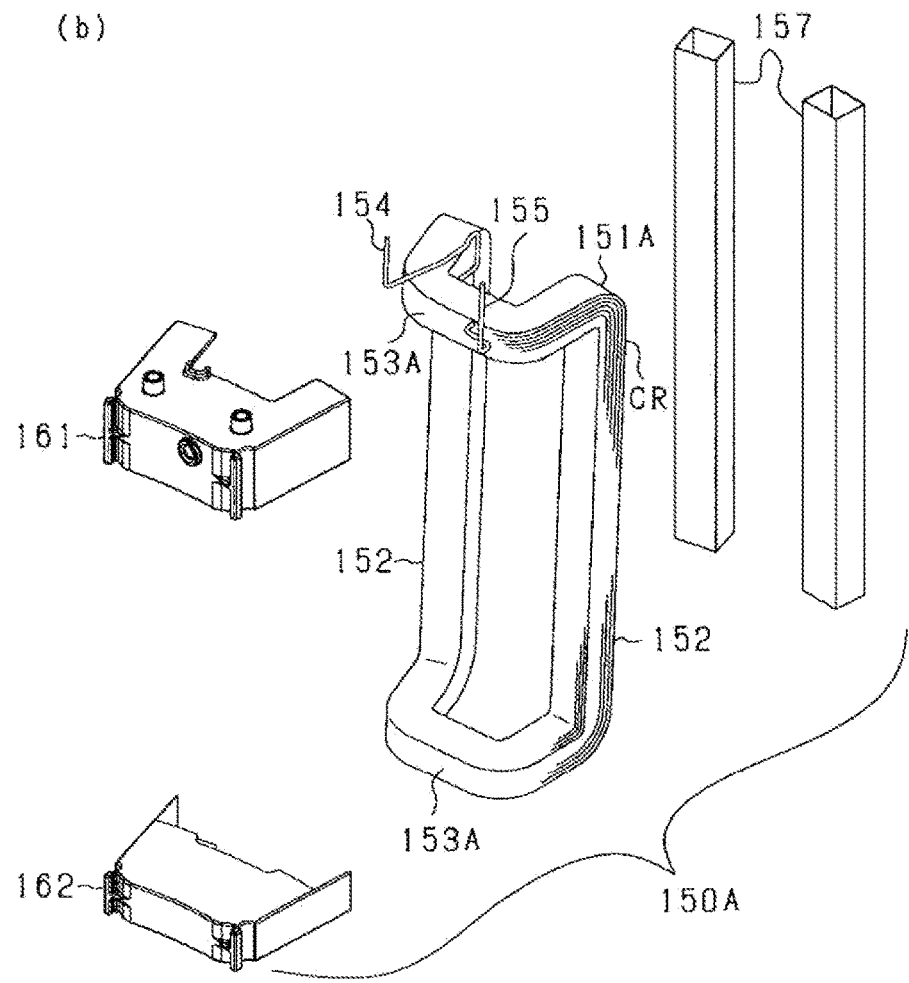
Figure 20:
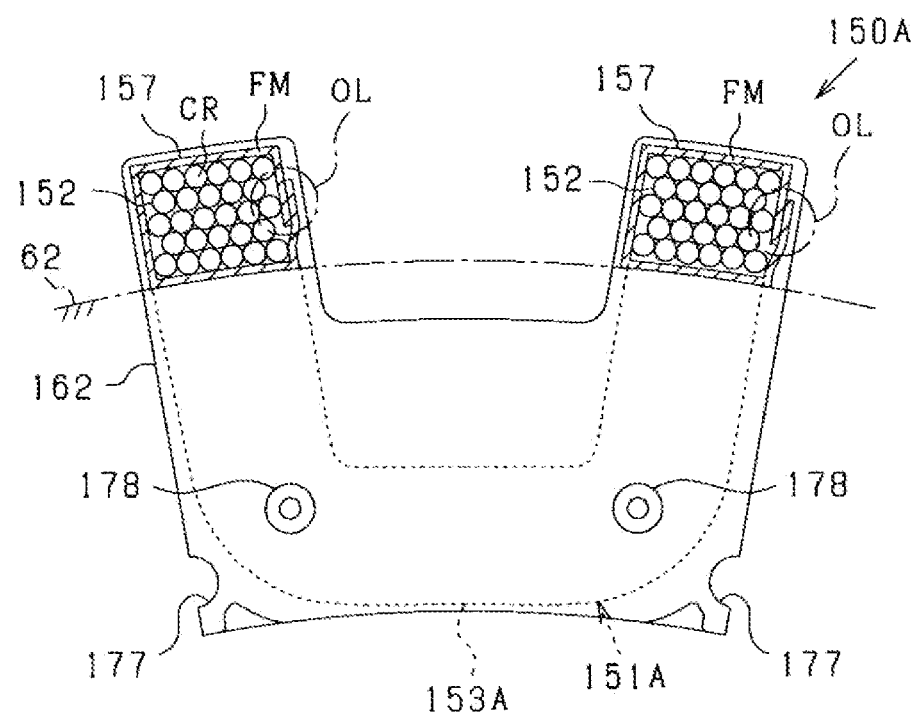
FIG. 20 is a sectional view taken along line 20-20 in FIG. 19(a)

As illustrated in (a) and (b) in FIG. 19, the first coil module 150A includes the first winding segment 151A and the insulating covers 161 and 162. The first winding segment 151A is formed by multiply winding a conductive wire member CR. The insulating covers 161 and 162 are respectively attached to one end side and the other end side of the first winding segment 151A in the axial direction. The insulating covers 161 and 162 are each formed of an insulating material such as synthetic resin.

The first winding segment 151A includes a pair of intermediate conductor portions 152 and a pair of link portions 153A. The pair of intermediate conductor portions 152 are provided to be in parallel to each other and have a linear shape. The pair of link portions 153A respectively connect the pair of intermediate conductor portions 152 at both ends in the axial direction. The first winding segment 151A is formed in an annular shape by the pair of intermediate conductor portions 152 and the pair of link portions 153A. The pair of intermediate conductor portions 152 are separated at a predetermined coil pitch. The intermediate conductor portions 152 of the winding segments 151 of the other phases can be disposed between the pair of intermediate conductor portions 152 in the circumferential direction. In the present embodiment, the pair of intermediate conductor portions 152 are separated at two coil pitches. One intermediate conductor portion 152 for each of the winding segments 151 of the other two phases is disposed between the pair of intermediate conductor portions 152.

The pair of link portions 153A have the shape identical to each other on both sides in the axial direction, and are provided as portions corresponding to the coil ends CE (see FIG. 11). Each of the link portions 153A is provided so as to be bent in a direction orthogonal to the intermediate conductor portion 152, that is, in a direction orthogonal to the axial direction.

As illustrated in FIG. 18, the first winding segment 151A has the link portion 153A on both sides in the axial direction, and the second winding segment 151B has a link portion 153B on both sides in the axial direction. The link portions 153A and 153B of the respective winding segments 151A and 151B have different shapes. In order to clarify the distinction, the link portion 153A of the first winding segment 151A is also referred to as a "first link portion 153A", and the link portion 153B of the second winding segment 151B is also referred to as a "second link portion 153B".

In each of the winding segments 151A and 151B, the intermediate conductor portion 152 is provided as a coil side conductor portion arranged one by one in the circumferential direction at the coil side CS. Each of the link portions 153A and 153B is provided as a coil end conductor portion connecting the intermediate conductor portions 152 of the same phase at two positions different in the circumferential direction at the coil end CE.

As illustrated in FIG. 20, the first winding segment 151A is formed by multiply winding the conductive wire member CR such that the transverse section of a bunch of conductive wire members is quadrangular. FIG. 20 illustrates a transverse section of the intermediate conductor portion 152. In the intermediate conductor portion 152, the conductive wire member CR is multiply wound so as to be arranged in the circumferential direction and the radial direction. In other words, the conductive wire member CR is arranged in a plurality of rows in the circumferential direction and arranged in a plurality of rows in the radial direction in the intermediate conductor portion 152. With this arrangement, the first winding segment 151A is formed such that the transverse section of a bunch of conductive wire members has a substantially rectangular shape. At the extending end of the first link portion 153A, the conductive wire member CR is multiply wound so as to be arranged in the axial direction and the radial direction by being bent in the radial direction. In the present embodiment, the conductive wire member CR is concentrically wound to form the first winding segment 151A. However, any winding method of the conductive wire member CR may be employed. The conductive wire member CR may be multiply wound in a form of alpha winding instead of concentric winding.

In the first winding segment 151A, an end of the conductive wire member CR is drawn out from one first link portion 153A (the first link portion 153A on the upper side of FIG. 19(*b*)) among the first link portions 153A on both sides in the axial direction. These ends serve as winding ends 154 and 155. The winding ends 154 and 155 are portions that respectively start and end winding of the conductive wire member CR. One of the winding ends 154 and 155 is connected to a current (input/output) I/O terminal, and the other is connected to a neutral point.

In the first winding segment 151A, each intermediate conductor portion 152 is covered with a sheet-like insulating jacket 157. FIG. 19(*a*) illustrates the first coil module 150A in which the intermediate conductor portion 152 is covered with the insulating jacket 157 and is on the inner side of the insulating jacket 157. However, for convenience, such a portion is referred to as an intermediate conductor portion 152 (the same applies to FIG. 22(*a*) to be described later).

The insulating jacket 157 employs a film member FM having at least a length of a range of the intermediate conductor portion 152 to be covered with and insulated in the axial direction as a dimension in the axial direction. The insulating jacket 157 is provided by winding the film member FM around the intermediate conductor portion 152. The film member FM is made of, for example, a polyethylene naphthalate (PEN) film. More specifically, the film member FM includes a film base material and an adhesion layer provided on one of both surfaces of the film base material and having foamability. The film member FM is wound around the intermediate conductor portion 152 while being adhered by an adhesion layer. A non-foamable adhesive can also be used as the adhesion layer.

As illustrated in FIG. 20, the conductive wire member CR is arranged in the circumferential direction and the radial direction, whereby the intermediate conductor portion 152 has a substantially rectangular transverse section. The film member FM covers around the intermediate conductor portion 152 with the ends of the film member FM in the circumferential direction overlapping each other, whereby the insulating jacket 157 is provided. The film member FM is a rectangular sheet whose longitudinal dimension is greater than the length of the intermediate conductor portion 152 in the axial direction and whose lateral dimension is greater than a single wrap-around length of the intermediate conductor portion 152. The film member FM is wound around the intermediate conductor portion 152 while being creased to fit to a sectional shape of the intermediate conductor portion 152. When the film member FM is wound around the intermediate conductor portion 152, a gap between the conductive wire member CR of the intermediate conductor portion 152 and the film base material can be filled with foam generated from the adhesion layer. In an overlapping portion OL of the film member FM, the ends of the film member FM in the circumferential direction are joined to each other by an adhesion layer.

In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the first winding segment 151A, the insulating jacket 157 is provided in a range from the intermediate conductor portion 152 to a portion covered with the insulating covers 161 and 162 in the first link portion 153A on both sides in the axial direction (i.e., a portion on the inner side of the insulating covers 161 and 162). With reference to FIG. 17, a range of AX1 in the first coil module 150A is a portion not covered with the insulating covers 161 or 162, and the insulating jacket 157 is provided in a range vertically expanded from the range AX1.

Next, a configuration of the insulating covers 161 and 162 will be described.

The insulating cover 161 is mounted to the first link portion 153A on one side of the first winding segment 151A in the axial direction. The insulating cover 162 is mounted to the first link portion 153A on the other side of the first winding segment 151A in the axial direction. Among them, the configuration of the insulating cover 161 is illustrated in (a) and (b) of FIG. 21. (a) and (b) of FIG. 21 are perspective views of the insulating cover 161 as viewed from two different directions.

Figure 21:
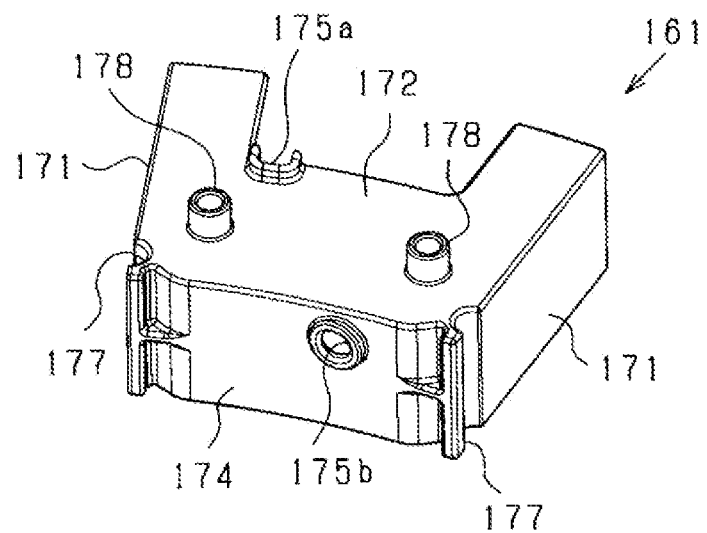
FIG. 21 is a perspective view illustrating a configuration of an insulating cover.
Figure 21:
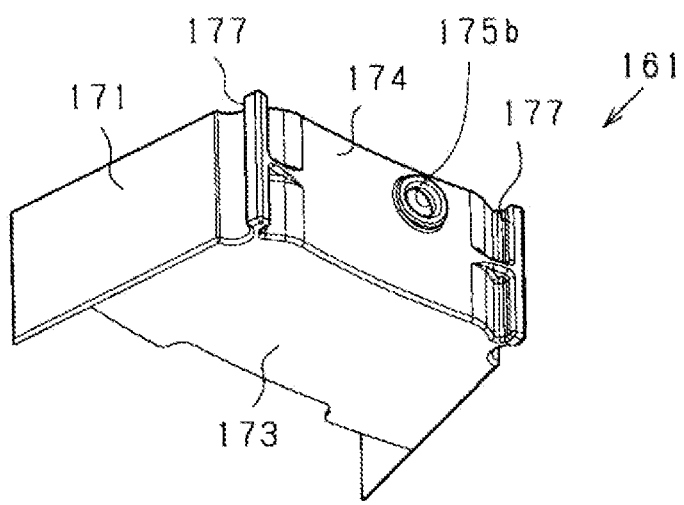

As illustrated in (a) and (b) of FIG. 21, the insulating cover 161 includes a pair of side surface portions 171 serving as side surfaces in the circumferential direction, the outer surface portion 172 on the outer side in the axial direction, an inner surface portion 173 on the inner side in the axial direction, and a front surface portion 174 on the inner side in the radial direction. Each of these portions 171 to 174 is formed in a plate shape, and is three-dimensionally joined to each other such that only the outer side in the radial direction is open. Each of the pair of side surface portions 171 is provided in a direction extending toward the axial center of the core assembly CA with the core assembly CA being assembled. Therefore, in a state where the plurality of first coil modules 150A are disposed side by side in the circumferential direction, the side surface portions 171 of the insulating cover 161 face each other while being in contact with or close to each other in the adjacent first coil modules 150A. As a result, the first coil modules 150A adjacent to each other in the circumferential direction can be disposed in a suitable annular shape while being insulated from each other.

In the insulating cover 161, the outer surface portion 172 includes an opening 175a for drawing out the winding end 154 of the first winding segment 151A, and the front surface portion 174 includes an opening 175b for drawing out the winding end 155 of the first winding segment 151A. In this case, one winding end 154 is drawn out in the axial direction from the outer surface portion 172, whereas the other winding end 155 is drawn out in the radial direction from the front surface portion 174.

In the insulating cover 161, the pair of side surface portions 171 each include semicircular recesses 177 extending in the axial direction at both ends of the front surface portion 174 in the circumferential direction, that is, positions where the side surface portions 171 and the front surface portion 174 intersect. The outer surface portion 172 includes a pair of protrusions 178 extending in the axial direction at positions symmetrical on both sides in the circumferential direction with the center line of the insulating cover 161 in the circumferential direction as a reference.

The supplementary description of the recess 177 of the insulating cover 161 will be provided. As illustrated in FIG. 20, the first link portion 153A of the first winding segment 151A has a curved shape that protrudes inward in the radial direction, that is, toward the core assembly CA, among inward and outward in the radial direction. In such a configuration, a gap that becomes wider toward the extending end side of the first link portion 153A is formed between the first link portions 153A adjacent to each other in the circumferential direction. In the present embodiment, by utilizing the gap between the first link portions 153A arranged in the circumferential direction, the recess 177 is provided at a position on the outer side of the curved portion of the first link portion 153A at the side surface portion 171 of the insulating cover 161.

A temperature detector (thermistor) may be provided in the first winding segment 151A. In such a configuration, an opening for drawing out a signal line extending from the temperature detector is preferably provided in the insulating cover 161. In this case, the temperature detector can be suitably accommodated in the insulating cover 161.

Although not described in detail with reference to the drawings, the insulating cover 162 on the other side in the axial direction has a configuration substantially the same as or similar to the insulating cover 161. Similarly to the insulating cover 161, the insulating cover 162 includes the pair of side surface portions 171, the outer surface portion 172 on the outer side in the axial direction, the inner surface portion 173 on the inner side in the axial direction, and the front surface portion 174 on the inner side in the radial direction. In the insulating cover 162, the pair of side surface portions 171 each include the semicircular recesses 177 at both ends of the front surface portion 174 in the circumferential direction, and the outer surface portion 172 includes the pair of protrusions 178. A difference from the insulating cover 161 is that the insulating cover 162 does not include an opening for drawing out the winding ends 154 and 155 of the first winding segment 151A.

In the insulating covers 161 and 162, the height dimensions thereof in the axial direction (i.e., the width dimension in the axial direction of the pair of side surface portions 171 and the front surface portion 174) differ from each other. Specifically, as illustrated in FIG. 17, $W11 > W12$ is satisfied, where $W11$ represents a height dimension of the insulating cover 161 in the axial direction, and $W12$ represents a height dimension of the insulating cover 162 in the axial direction. The reasons for the above are as follows. The multiply wound conductive wire member CR requires the winding stage of the conductive wire member CR to be shifted to the subsequent stage (lane-changed) in a direction orthogonal to the winding direction (turning direction). Accordingly, the winding width is considered to be increased due to the shift thereof. To supplement, the insulating cover 161 among the insulating cover 161 and 162 is a portion covering the first link portion 153A on the side including the winding start and the winding end of the conductive wire member CR. Since the first link portion 153A includes the winding start and the winding end of the conductive wire member CR, the winding margin (overlapping margin) of the conductive wire member CR at the first link portion 153A becomes larger than that at the other portions, resulting in the potentially large winding width. Taking these factors into consideration, the height dimension $W11$ of the insulating cover 161 in the axial direction is greater than the height dimension $W12$ of the insulating cover 162 in the axial direction. The above configuration can eliminate the inconvenience that the number of turns of the conductive wire member CR is limited by the insulating covers 161 and 162, unlike the case where the respective height dimensions $W11$ and $W12$ of the insulating covers 161 and 162 have the dimension identical to each other.

Next, the second coil module 150B will be described.

FIG. 22(a) is a perspective view illustrating a configuration of the second coil module 150B, and FIG. 22(b) is an exploded perspective view illustrating components of the second coil module 150B. FIG. 23 is a sectional view taken along line 23-23 in FIG. 22(a).

Figure 22:
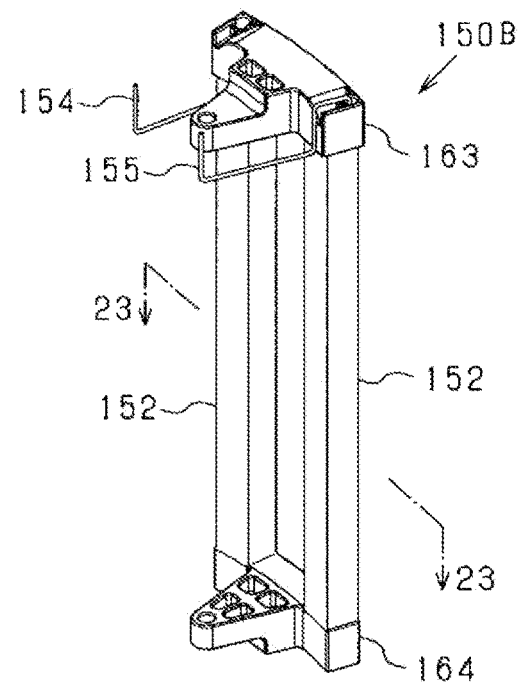
FIG. 22 is a view illustrating a configuration of the second coil module.
Figure 22:
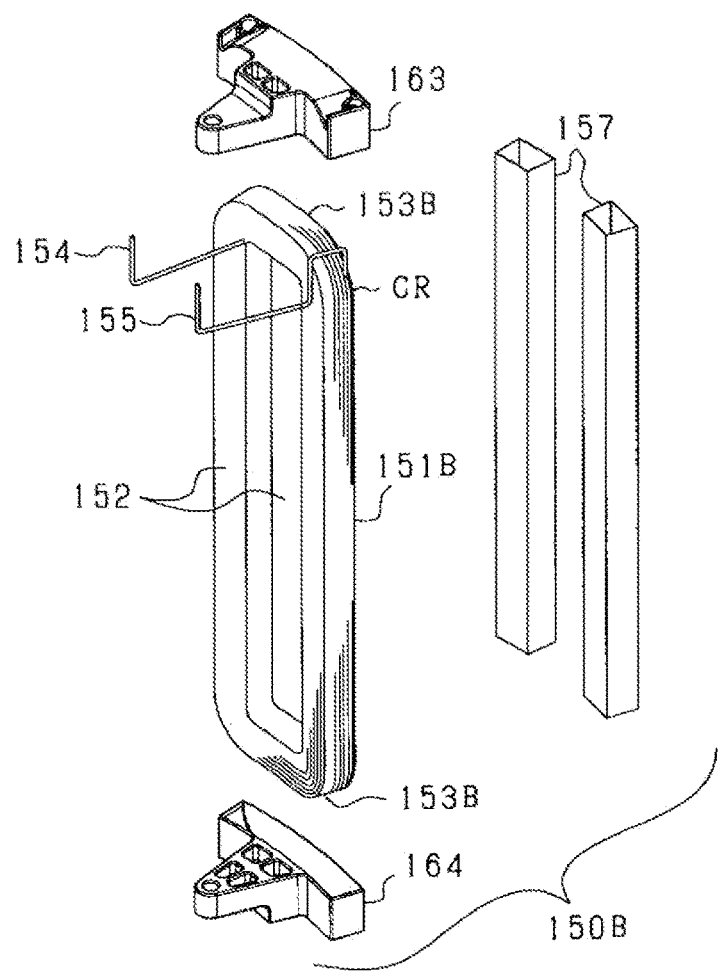
Figure 23:
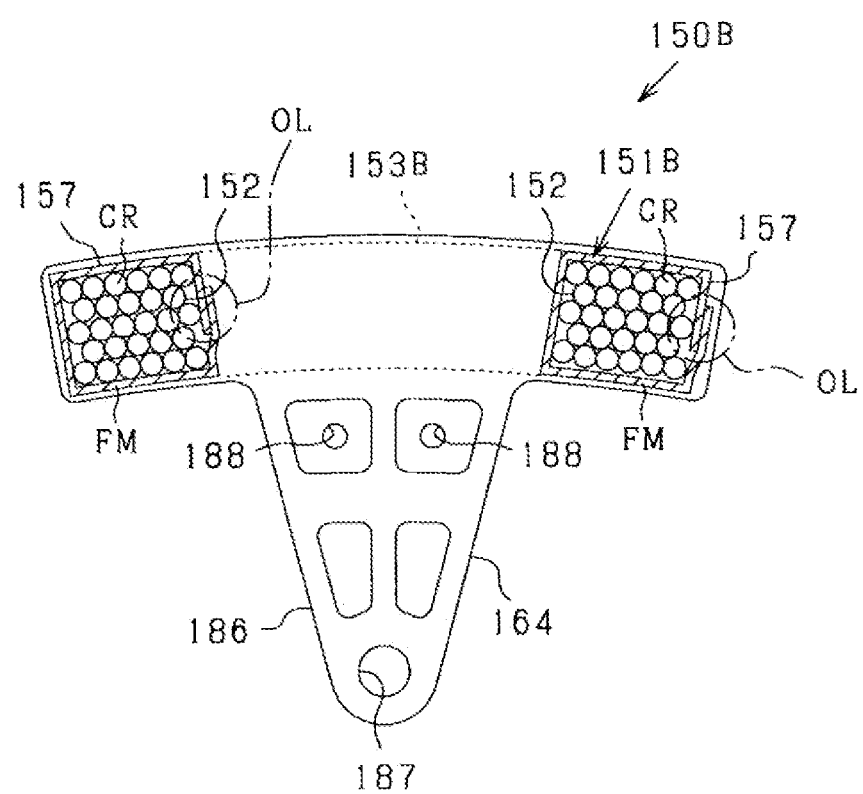
FIG. 23 is a sectional view taken along line 23-23 in FIG. 22(a)

As illustrated in (a) and (b) in FIG. 22, the second coil module 150B includes the second winding segment 151B and the insulating covers 163 and 164. Similarly to the first winding segment 151A, the second winding segment 151B is formed by multiply winding the conductive wire member CR. The insulating covers 163 and 164 are respectively attached to one end side and the other end side of the second winding segment 151B in the axial direction. The insulating covers 163 and 164 are each formed of an insulating material such as synthetic resin.

The second winding segment 151B includes a pair of intermediate conductor portions 152 and a pair of second link portions 153B. The pair of intermediate conductor portions 152 are provided to be in parallel to each other and have a linear shape. The pair of second link portions 153B connect the pair of intermediate conductor portions 152 at both ends in the axial direction. The second winding segment 151B is formed in an annular shape by the pair of intermediate conductor portions 152 and the pair of second link portions 153B. In the second winding segment 151B, the pair of intermediate conductor portions 152 have the same configuration as the intermediate conductor portions 152 of the first winding segment 151A. On the other hand, the pair of second link portions 153B is different in configuration from the first link portions 153A of the first winding segment 151A. The second link portions 153B of the second winding segment 151B are provided so as to linearly extend in the axial direction from the intermediate conductor portion 152 without being bent in the radial direction. FIG. 18 clearly illustrates the difference between the winding segments 151A and 151B in comparison.

In the second winding segment 151B, an end of the conductive wire member CR is drawn out from one second link portion 153B (the second link portion 153B on the upper side of FIG. 22(b)) among the second link portions 153B on both sides in the axial direction. These ends serve as the winding ends 154 and 155. Also in the second winding segment 151B, similarly to the first winding segment 151A, one of the winding ends 154 and 155 is connected to the current I/O terminal, and the other is connected to a neutral point.

In the second winding segment 151B, similarly to the first winding segment 151A, each intermediate conductor portion 152 is covered with a sheet-like insulating jacket 157. The insulating jacket 157 employs the film member FM having at least a length of a range of the intermediate conductor portion 152 to be covered with and insulated in the axial direction as a dimension in the axial direction. The insulating jacket 157 is provided by winding the film member FM around the intermediate conductor portion 152.

The configuration related to the insulating jacket 157 is substantially the same or similar to each other in the winding segments 151A and 151B. That is, as illustrated in FIG. 23, the film member FM covers around the intermediate conductor portion 152 with the ends of the film member FM in the circumferential direction overlapping each other. In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the second winding segment 151B, the insulating jacket 157 is provided in a range from the intermediate conductor portion 152 to a portion covered with the insulating covers 163 and 164 in the second link portion 153B on both sides in the axial direction (i.e., a portion on the inner side of the insulating covers 163 and 164). With reference to FIG. 17, a range of AX2 in the second coil module 150B is a portion not covered with the insulating covers 163 and 164, and the insulating jacket 157 is provided in a range vertically expanded from the range AX2.

In each of the winding segments 151A and 151B, the insulating jacket 157 is provided in a range including part of the link portions 153A and 153B. In other words, in each of the winding segments 151A and 151B, the insulating jacket 157 is provided in the intermediate conductor portion 152 and a portion of the link portions 153A and 153B continuously extending linearly from the intermediate conductor portion 152. However, since the lengths of the winding segments 151A and 151B in the axial direction differ from each other, the ranges of the insulating jacket 157 in the axial direction also differ from each other.

Next, a configuration of the insulating covers 163 and 164 will be described.

The insulating cover 163 is mounted to the second link portion 153B on one side of the second winding segment 151B in the axial direction. The insulating cover 164 is mounted to the second link portion 153B on the other side of the second winding segment 151B in the axial direction. Among them, the configuration of the insulating cover 163 is illustrated in (a) and (b) of FIG. 24. (a) and (b) of FIG. 24 are perspective views of the insulating cover 163 as viewed from two different directions.

Figure 24:
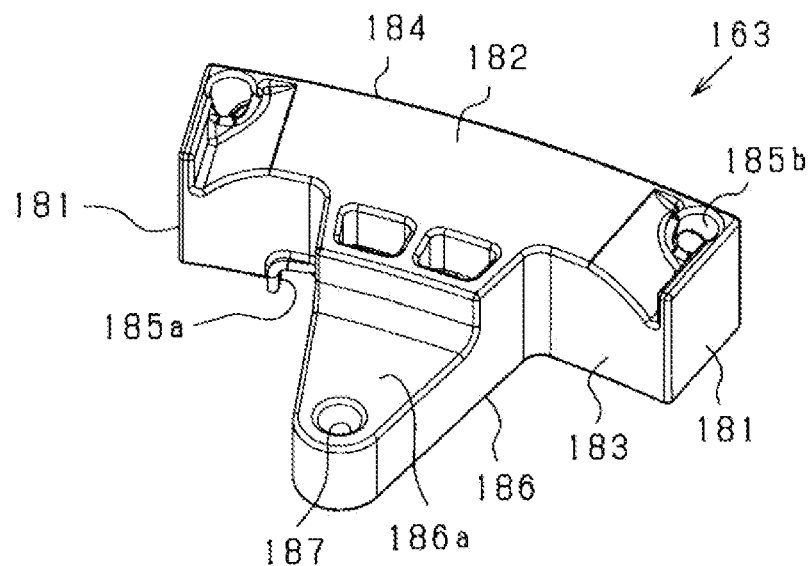
FIG. 24 is a perspective view illustrating a configuration of the insulating cover.
Figure 24:
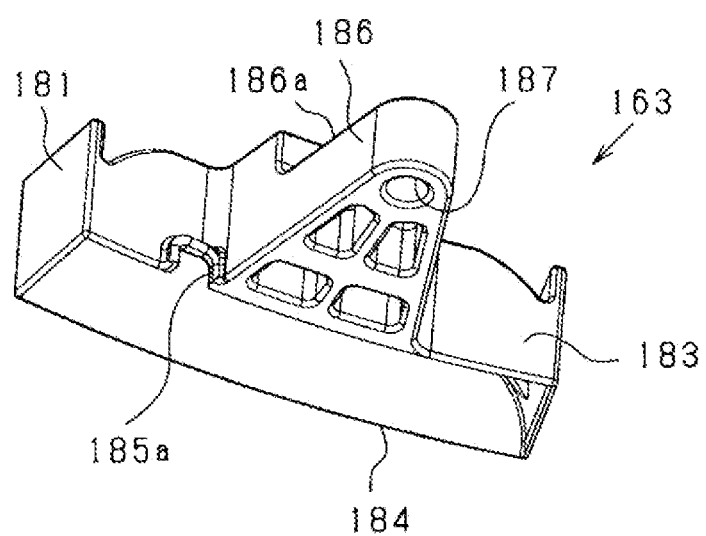

As illustrated in (a) and (b) of FIG. 24, the insulating cover 163 includes a pair of side surface portions 181 serving as side surfaces in the circumferential direction, an outer surface portion 182 on the outer side in the axial direction, a front surface portion 183 on the inner side in the radial direction, and a rear surface portion 184 on the outer side in the radial direction. Each of these portions 181 to 184 is formed in a plate shape, and is three-dimensionally joined to each other such that only the inner side in the axial direction is open. Each of the pair of side surface portions 181 is provided in a direction extending toward the axial center of the core assembly CA with the core assembly CA being assembled. Therefore, in a state where the plurality of second coil modules 150B are disposed side by side in the circumferential direction, the side surface portions 181 of the insulating cover 163 face each other while being in contact with or close to each other in the adjacent second coil modules 150B. As a result, the second coil modules 150B adjacent to each other in the circumferential direction can be disposed in a suitable annular shape while being insulated from each other.

In the insulating cover 163, the front surface portion 183 includes an opening 185a for drawing out the winding end 154 of the second winding segment 151B, and the outer surface portion 182 includes an opening 185b for drawing out the winding end 155 of the second winding segment 151B.

The front surface portion 183 of the insulating cover 163 includes a protrusion 186 protruding inward in the radial direction. The protrusion 186 is provided at a central position between one end and the other end in the circumferential direction of the insulating cover 163 so as to protrude inward in the radial direction from the second link portion 153B. The protrusion 186 has a tapered shape that tapers toward the inner side in the radial direction in plan view. A through-hole 187 extending in the axial direction is provided at an extending end thereof. The protrusion 186 can employ any configurations as long as the protrusion 186 protrudes inward in the radial direction from the second link portion 153B and has the through-hole 187 at the central position between one end and the other end of the insulating cover 163 in the circumferential direction. However, assuming a state of overlapping with the insulating cover 161 on the inner side in the axial direction, the protrusion 186 is desirably formed to have a small width in the circumferential direction so as to avoid interference with the winding ends 154 and 155.

The protrusion 186 is thinned in the axial direction in a stepwise manner at the extending end on the inner side in the radial direction. The through-hole 187 is provided at a low step portion 186a thus thinned. The low step portion 186a corresponds to a portion where the height from the end surface of the inner cylinder member 81 in the axial direction is smaller than the height of the second link portion 153B in a state where the second coil module 150B is assembled to the core assembly CA.

As illustrated in FIG. 23, the protrusion 186 includes a through-hole 188 passing therethrough in the axial direction. Accordingly, in a state where the insulating covers 161 and 163 overlap each other in the axial direction, a space between the insulating covers 161 and 163 can be filled with the adhesive through the through-hole 188.

Although not described in detail with reference to the drawings, the insulating cover 164 on the other side in the axial direction has a configuration substantially the same as or similar to the insulating cover 163. Similarly to the insulating cover 163, the insulating cover 164 includes the pair of side surface portions 181, the outer surface portion 182 on the outer side in the axial direction, the front surface portion 183 on the inner side in the radial direction, and the rear surface portion 184 on the outer side in the radial direction. The insulating cover 164 further includes the through-hole 187 provided at the extending end of the protrusion 186. A difference from the insulating cover 163 is that the insulating cover 164 does not include an opening for drawing out the winding ends 154 and 155 of the second winding segment 151B.

In the insulating covers 163 and 164, the width dimensions of the pair of side surface portions 181 in the radial direction differ from each other. Specifically, as illustrated in FIG. 17, W21>W22 is satisfied, where W21 represents a width dimension of the side surface portion 181 in the insulating cover 163 in the radial direction, and W22 represents a width dimension of the side surface portion 181 in the insulating cover 164 in the radial direction. In other words, the insulating cover 163 among the insulating cover 163 and 164 is a portion covering the second link portion 153B on the side including the winding start and the winding end of the conductive wire member CR. Since the second link portion 153B includes the winding start and the winding end of the conductive wire member CR, the winding margin (overlapping margin) of the conductive wire member CR at the second link portion 153B becomes larger than that at the other portions, resulting in the potentially large winding width. Taking this factor into consideration, the width dimension W21 of the insulating cover 163 in the radial direction is greater than the width dimension W22 of the insulating cover 164 in the radial direction. The above configuration can eliminate the inconvenience that the number of turns of the conductive wire member CR is limited by the insulating covers 163 and 164, unlike the case where the respective width dimensions W21 and W22 of the insulating covers 163 and 164 have the dimension identical to each other.

Figure 25:
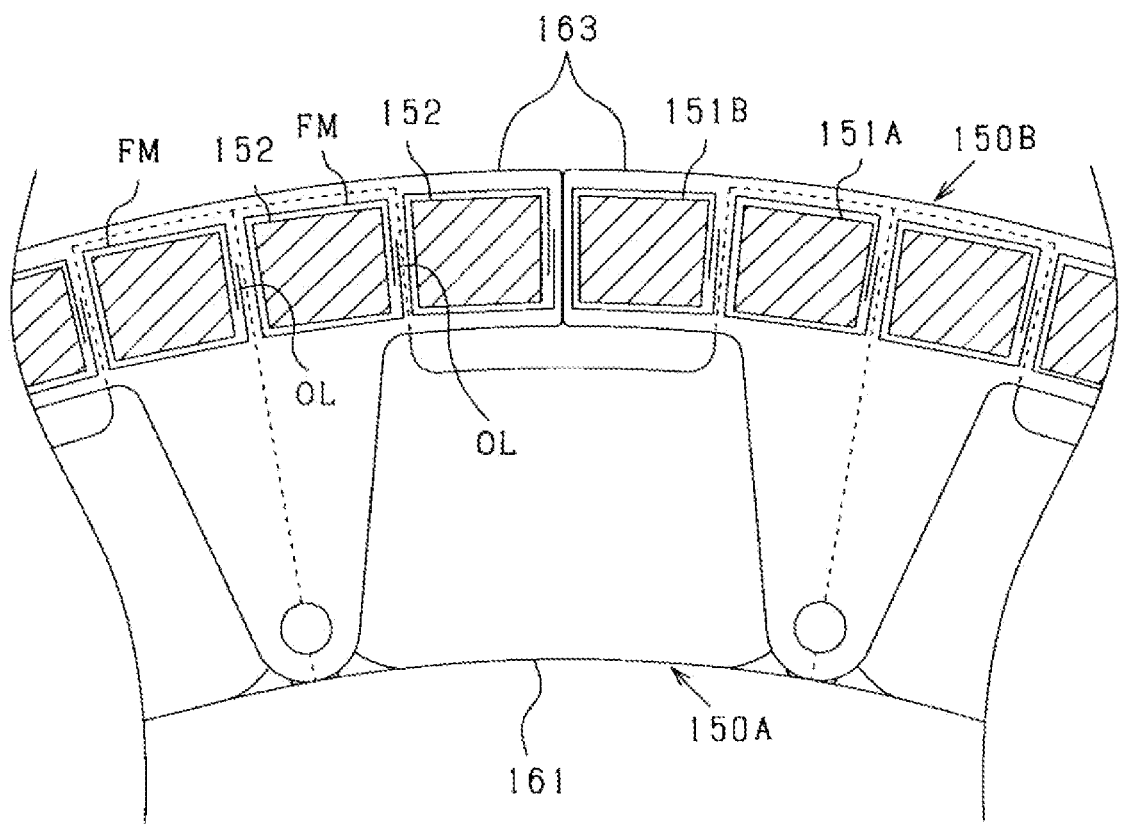
FIG. 25 is a view illustrating an overlapping position of the film member in a state where the coil modules are arranged in a circumferential direction.

FIG. 25 is a view illustrating an overlapping position of the film member FM in a state where the coil modules 150A and 150B are arranged in the circumferential direction. As described above, in each of the coil modules 150A and 150B, the periphery of the intermediate conductor portion 152 is covered with the film member FM so as to overlap with each other at the portion of the winding segment 151 of the other phase facing the intermediate conductor portion 152, that is, at the side surface of the intermediate conductor portion 152 in the circumferential direction (see FIGS. 20 and 23). In a state where the coil modules 150A and 150B are disposed in the circumferential direction, the overlapping portions OL of the film members FM are disposed on the same side among both sides in the circumferential direction (the right side in the circumferential direction in the drawing). With this arrangement, in the intermediate conductor portions 152 of the winding segments 151A and 151B of different phases adjacent to each other in the circumferential direction, the overlapping portions OL of the film members FM do not overlap with each other in the circumferential direction. In this case, a maximum of three film members FM overlap with each other between the intermediate conductor portions 152 arranged in the circumferential direction.

Next, a configuration related to assembly of the coil modules 150A and 150B to the core assembly CA will be described.

The coil modules 150A and 150B have different lengths in axial direction and different shapes of the link portions 153A and 153B of the winding segments 151A and 151B. The coil modules 150A and 150B are attached to the core assembly CA while the first link portion 153A of the first coil module 150A is disposed on the inner side in the axial direction and the second link portion 153B of the second coil module 150B is disposed on the outer side in the axial direction. As for the insulating covers 161 to 164, each of the insulating covers 161 to 164 is fixed to the core assembly CA while the insulating covers 161 and 163 are overlapped in the axial direction on one end side of the respective coil modules 150A and 150B in the axial direction and the insulating covers 162 and 164 are overlapped in the axial direction on the other end side of the respective coil modules 150A and 150B in the axial direction.

Figure 26:
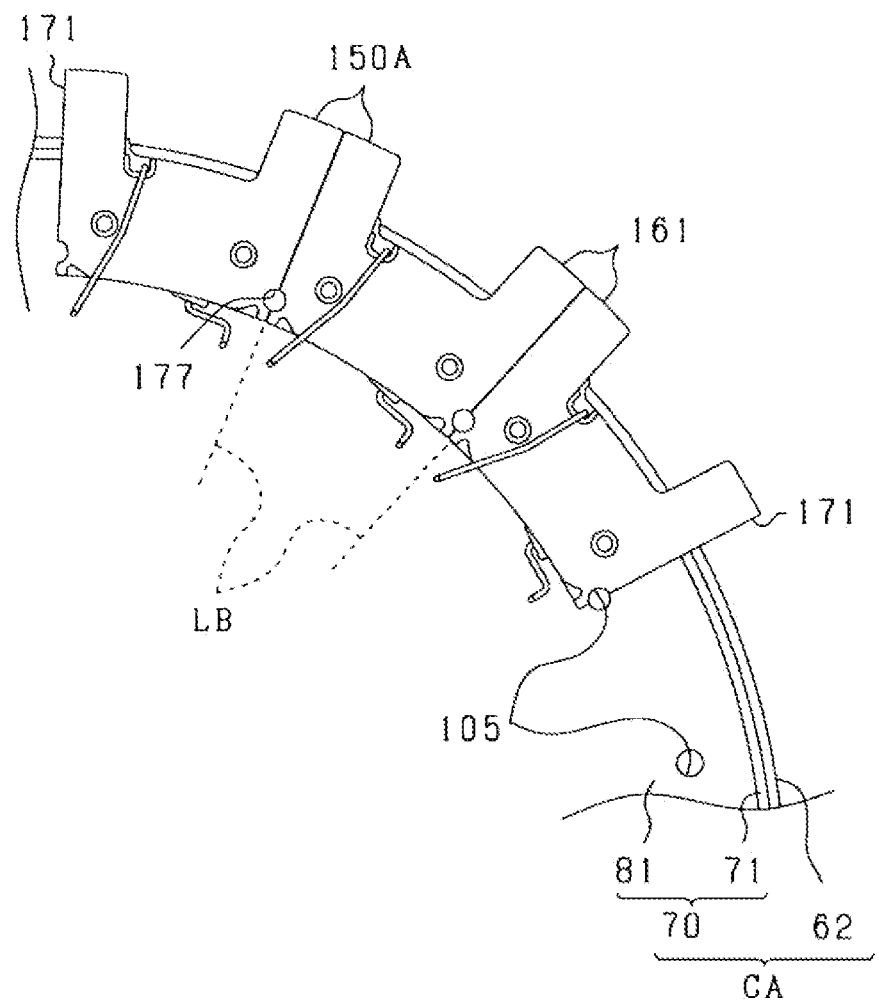
FIG. 26 is a plan view illustrating a state where the first coil module is assembled to the core assembly.
Figure 27:
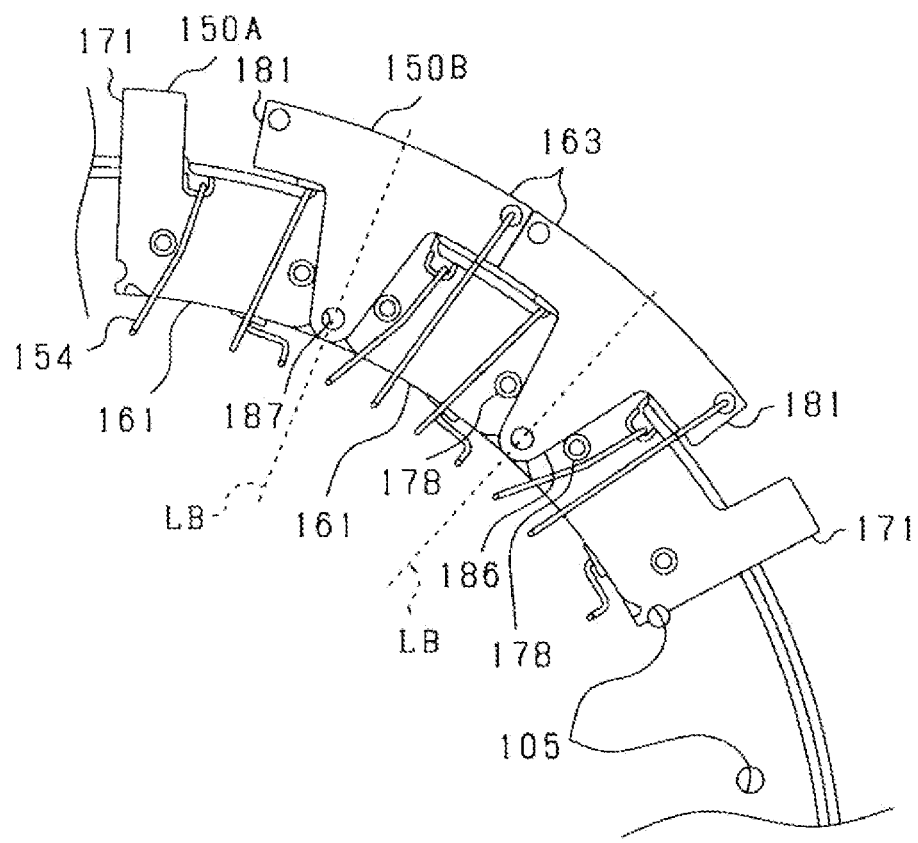
FIG. 27 is a plan view illustrating a state where the first coil module and the second coil module are assembled to the core assembly.
Figure 28:
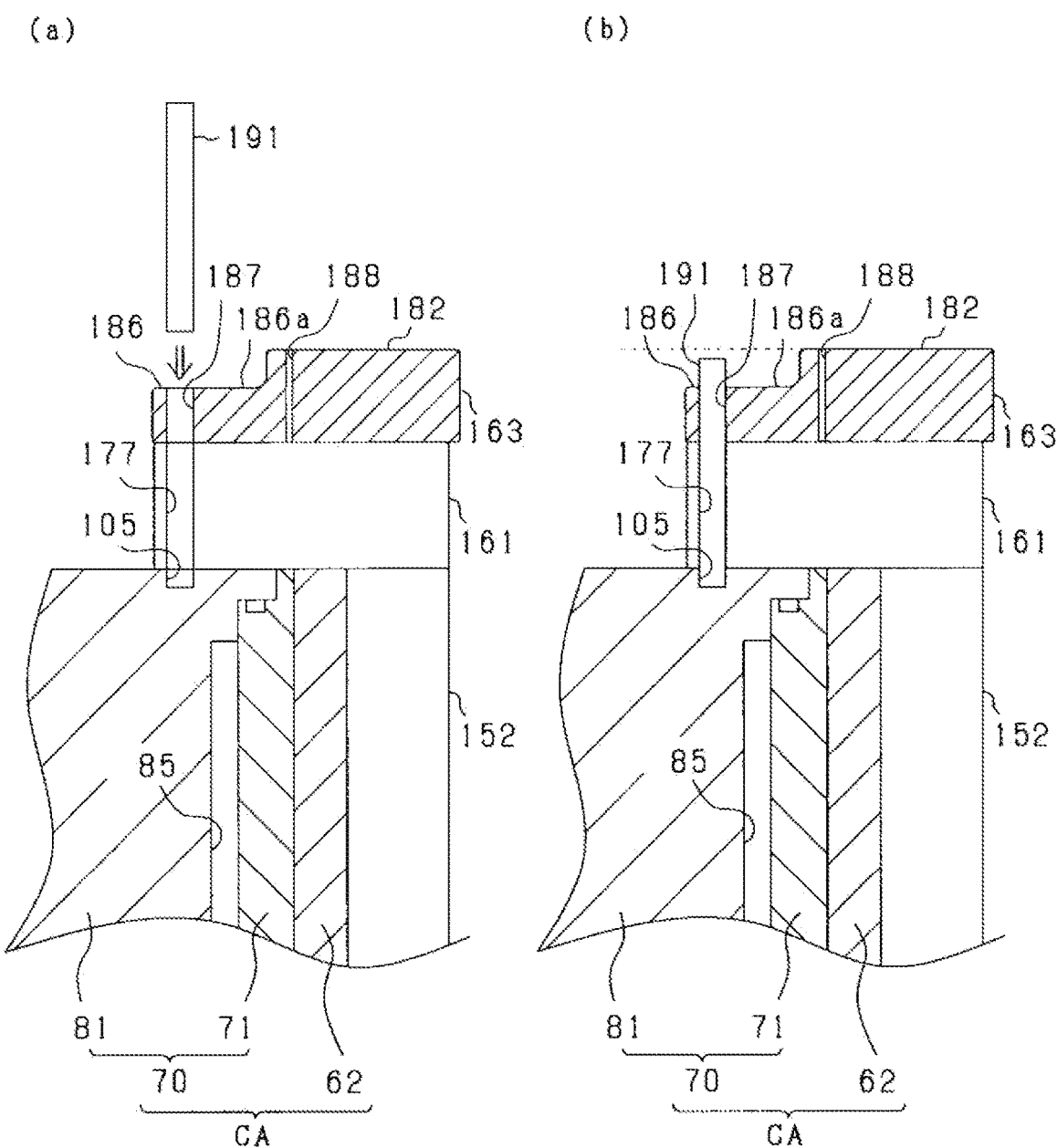
FIG. 28 is a longitudinal sectional view illustrating a fixed state by using a fastening pin.

FIG. 26 is a plan view illustrating a state where the plurality of insulating covers 161 are arranged in the circumferential direction while the first coil module 150A is assembled to the core assembly CA. FIG. 27 is a plan view illustrating a state where the plurality of insulating covers 161 and 163 are arranged in the circumferential direction while the first coil module 150A and the second coil module 150B are assemble to the core assembly CA. FIG. 28(*a*) is a longitudinal sectional view illustrating a state before fixation with a fastening pin 191 while the coil modules 150A and 150B are assemble to the core assembly CA. FIG. 28(*b*) is a longitudinal sectional view illustrating a state after fixation with the fastening pin 191 while the coil modules 150A and 150B are assemble to the core assembly CA.

As illustrated in FIG. 26, in a state where the plurality of first coil modules 150A are assembled to the core assembly CA, the plurality of insulating covers 161 are disposed with the side surface portions 171 being in contact with or close to each other. Each of the insulating covers 161 is disposed such that a boundary line LB at which the side surface portions 171 face each other lays over the recess 105 on the end surface of the inner cylinder member 81 in the axial direction. In this case, when the side surface portions 171 of the insulating covers 161 adjacent to each other in the circumferential direction are brought into contact with or close to each other, a through-hole portion extending in the axial direction is formed by each of the recesses 177 of the insulating covers 161. The positions of the through-hole portion and the recess 105 then match each other.

As illustrated in FIG. 27, the second coil module 150B is further assembled to the integrated object of the core assembly CA and the first coil module 150A. This assembly involves disposing the plurality of insulating covers 163 with the side surface portions 181 being in contact with or close to each other. In this state, the link portions 153A and 153B are disposed so as to cross each other on a circle in which the intermediate conductor portions 152 are arranged in the circumferential direction. Each insulating cover 163 is disposed such that the protrusion 186 overlaps the insulating cover 161 in the axial direction and the through-hole 187 of the protrusion 186 is connected in the axial direction to the through-hole portion formed by each recess 177 of the insulating cover 161.

At this time, the protrusion 186 of the insulating cover 163 is guided to a predetermined position by the pair of protrusions 178 provided on the insulating cover 161. In this way, the position of the through-hole 187 on the insulating cover 163 side matches the position of the through-hole portion and the recess 105 of the inner cylinder member 81 on the insulating cover 161 side. More specifically, in a state where the coil modules 150A and 150B are assembled to the core assembly CA, the recess 177 of the insulating cover 161 is positioned on the back side of the insulating cover 163. Thus, the through-hole 187 of the protrusion 186 may be difficult to be aligned with the recess 177 of the insulating cover 161. In this respect, the protrusion 186 of the insulating cover 163 is guided by the pair of protrusions 178 of the insulating cover 161, so that the alignment of the insulating cover 163 with respect to the insulating cover 161 is facilitated.

As illustrated in (a) and (b) of FIG. 28, fixing with the fastening pin 191 as a fastening member is then performed while the insulating cover 161 and the protrusion 186 of the insulating cover 163 are engaged with the fastening pin 191 at their overlapping portion. More specifically, the fastening pin 191 is inserted into the recesses 105 and 177 and the through-hole 187 while the recess 105 of the inner cylinder member 81, the recess 177 of the insulating cover 161, and the through-hole 187 of the insulating cover 163 are aligned. Accordingly, the insulating covers 161 and 163 are integrally fixed to the inner cylinder member 81. According to this configuration, the coil modules 150A and 150B adjacent to each other in the circumferential direction are fixed to the core assembly CA by the common fastening pin 191 at the coil end CE. The fastening pin 191 desirably includes a material having good thermal conductivity, and is, for example, a metal pin.

As illustrated in FIG. 28(b), the fastening pin 191 is assembled to the low step portion 186a of the protrusion 186 of the insulating cover 163. In this state, the upper end of the fastening pin 191 protrudes above the low step portion 186a, but does not protrude upward from the upper surface (outer surface portion 182) of the insulating cover 163. In this case, the length of the fastening pin 191 is greater than the height dimension in the axial direction of the overlapping portion between the insulating cover 161 and the protrusion 186 (low step portion 186a) of the insulating cover 163 and has a margin protruding upward. Thus, conceivably, when the fastening pin 191 is inserted into the recesses 105 and 177 and the through-hole 187 (that is, when the fastening pin 191 is fixed), such an insertion (fixing) work can be easily performed. In addition, the upper end of the fastening pin 191 does not protrude upward from the upper surface (outer surface portion 182) of the insulating cover 163. This configuration can eliminate an inconvenience that the axial length of the stator 60 becomes large due to the protrusion of the fastening pin 191.

After fixing the insulating covers 161 and 163 by the fastening pin 191, the adhesive is filled through the through-hole 188 provided in the insulating cover 163. In this way, the insulating covers 161 and 163 overlapping in the axial direction are securely joined to each other. In (a) and (b) of FIG. 28, for convenience, the through-hole 188 is illustrated in a range from the upper surface to the lower surface of the insulating cover 163. In practice, however, the through-hole 188 is provided in a thin plate portion formed by lightening or the like.

As illustrated in FIG. 28(b), the position of each of the insulating covers 161 and 163 fixed with the fastening pin 191 is the end surface of the stator holder 70 in the axial direction further on the inner side than the stator core 62 in the radial direction (on the left side in the drawing), and the fastening pin 191 is fixed to the stator holder 70. That is, the first link portion 153A is fixed to the end surface of the stator holder 70 in the axial direction. In this case, since the stator holder 70 includes the coolant path 85, the heat generated at the first winding segment 151A is directly transferred from the first link portion 153A to the portion at or near the coolant path 85 of the stator holder 70. The fastening pin 191 is inserted into the recess 105 of the stator holder 70, and heat transfer to the stator holder 70 side is promoted through the fastening pin 191. With this configuration, improvement of cooling performance of the stator winding 61 is achieved.

In the present embodiment, 18 of the insulating covers 161 and 18 of the insulating covers 163 are disposed to overlap each other on the inner side and the outer side in the axial direction at the coil end CE. Recesses 105 are provided at 18 locations that is the same as the number of the insulating covers 161 and the number of the insulating covers 163 on the end surface of the stator holder 70 in the axial direction. The recesses 105 at the 18 locations are fixed with the fastening pins 191.

Although not illustrated, the same applies to the insulating covers 162 and 164 on the opposite side in the axial direction. In other words, first, when the side surface portions 171 of the insulating covers 162 adjacent to each other in the circumferential direction are brought into contact with or close to each other upon assembly of the first coil module 150A, a through-hole portion extending in the axial direction is formed by each of the recesses 177 of the insulating covers 162. The positions of the through-hole portion and the recess 106 at the end surface of the outer cylinder member 71 in the axial direction then match each other. Thereafter, due to the assembly of the second coil module 150B, the position of the through-hole 187 on the insulating cover 164 side matches the positions of the through-hole portion on the insulating cover 163 side and the recess 106 of the outer cylinder member 71. Subsequently, the fastening pin 191 is inserted into the recesses 106 and 177 and the through-hole 187, whereby the insulating covers 162 and 164 is integrally fixed to the outer cylinder member 71.

When the coil modules 150A and 150B are assembled to the core assembly CA, all the first coil modules 150A are assembled first to the outer peripheral side of the core assembly CA, and then all the second coil modules 150B are assembled and fixed with the fastening pins 191. Alternatively, the two first coil modules 150A and the one second coil module 150B may be first fixed to the core assembly CA with one fastening pin 191, and thereafter, the assembly of the first coil module 150A, the assembly of the second coil module 150B, and fixing with the fastening pin 191 may be repeatedly performed in this order.

Next, the bus bar module 200 will be described.

Figure 29:
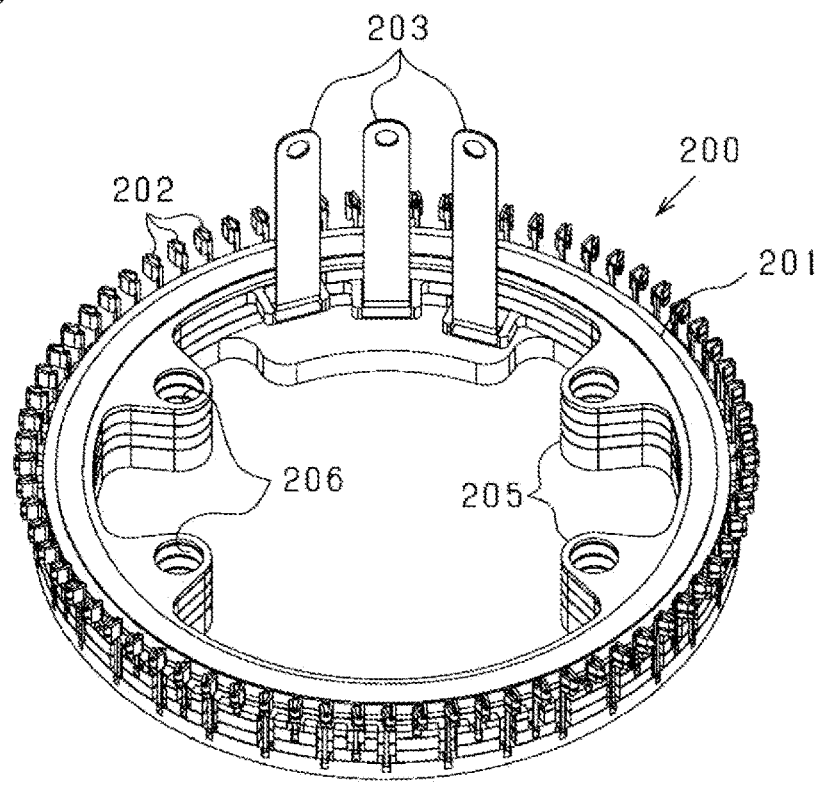
FIG. 29 is a perspective view of a bus bar module.
Figure 30:
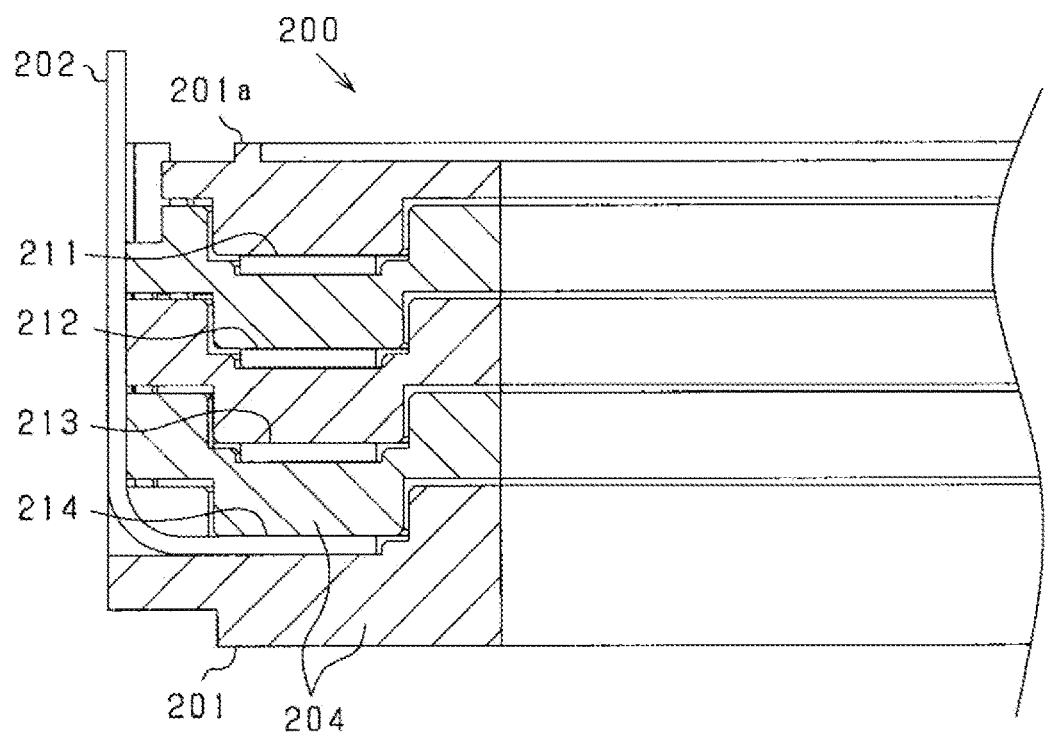
FIG. 30 is a sectional view illustrating part of a longitudinal section of the bus bar module.

The bus bar module 200 is a winding connection member that is electrically connected to the winding segment 151 of each coil module 150 in the stator winding 61, connects one end of the winding segment 151 of each phase in parallel for each phase, and connects the other ends of the winding segments 151 at a neutral point. FIG. 29 is a perspective view of the bus bar module 200. FIG. 30 is a sectional view illustrating part of a longitudinal section of the bus bar module 200.

The bus bar module 200 includes an annular ring 201 having an annular shape, a plurality of connection terminals 202 extending from the annular ring 201, and three I/O terminals 203 provided for each phase winding. The annular ring 201 is formed in an annular shape by using, for example, an insulating member such as resin.

As illustrated in FIG. 30, the annular ring 201 has a substantially annular plate shape and includes stacked plates 204 stacked in multiple layers (five layers in the present embodiment) in the axial direction. Four bus bars 211 to 214 are provided while being sandwiched between each adjacent two of the stacked plates 204. Each of the bus bars 211 to 214 has an annular shape, and includes a U-phase bus bar 211, a V-phase bus bar 212, a W-phase bus bar 213, and a neutral-point bus bar 214. These bus bars 211 to 214 are disposed side by side in the axial direction with plate surfaces facing each other in the annular ring 201. Each stacked plate 204 and each of the bus bars 211 to 214 are joined to each other by using an adhesive. An adhesive sheet is desirably used as the adhesive. However, a liquid or semi-liquid adhesive may be applied. The connection terminal 202 is connected to each of the bus bars 211 to 214 so as to protrude outward in the radial direction from the annular ring 201.

A protrusion 201a annularly extending in an annular shape is provided on the upper surface of the annular ring 201, that is, the upper surface of the stacked plate 204 on the outermost layer side of the stacked plates 204 provided in the form of five layers.

The bus bar module 200 only needs to be provided in a state where the bus bars 211 to 214 are embedded in the annular ring 201. The bus bars 211 to 214 disposed at predetermined intervals may be integrally insert-molded. The arrangement of the bus bars 211 to 214 is not limited to the configuration in which all the bus bars are arranged in the axial direction and all the plate surfaces face the same direction. For example, the bus bars 211 to 214 may be arranged in the radial direction, may be arranged in two rows in the axial direction and in two rows in the radial direction, and may include different extending directions.

In FIG. 29, the connection terminals 202 are arranged in the circumferential direction of the annular ring 201 and extend in the axial direction on the outer side in the radial direction. The connection terminals 202 include a connection terminal connected to the U-phase bus bar 211, a connection terminal connected to the V-phase bus bar 212, a connection terminal connected to the W-phase bus bar 213, and a connection terminal connected to the neutral-point bus bar 214. The connection terminals 202 are provided as many as the winding ends 154 and 155 of the respective winding segments 151 in the coil module 150. One winding end 154 or one winding end 155 of each winding segment 151 is connected to the corresponding connection terminal 202. With this configuration, the bus bar module 200 is connected to each of the U-phase winding segment 151, the V-phase winding segment 151, and the W-phase winding segment 151.

The I/O terminal 203 is made of, for example, a bus bar member, and is provided in a direction extending in the axial direction. The I/O terminal 203 includes a U-phase I/O terminal 203U, a V-phase I/O terminal 203V, and a W-phase I/O terminal 203W. These I/O terminals 203 are connected to the respective bus bars 211 to 213 for each phase in the annular ring 201. Through the I/O terminals 203, power is input from an inverter (not illustrated) and output to the phase winding of each phase of the stator winding 61.

A current sensor that detects the phase current of each phase may be integrally provided in the bus bar module 200. In this case, preferably, a current detection terminal is provided in the bus bar module 200 and a detection result of the current sensor is output to a controller (not illustrated) through the current detection terminal.

The annular ring 201 has a plurality of protrusions 205 protruding toward the inner peripheral side as fixed portions with respect to the stator holder 70. A through-hole 206 extending in the axial direction is formed in the protrusion 205.

Figure 31:
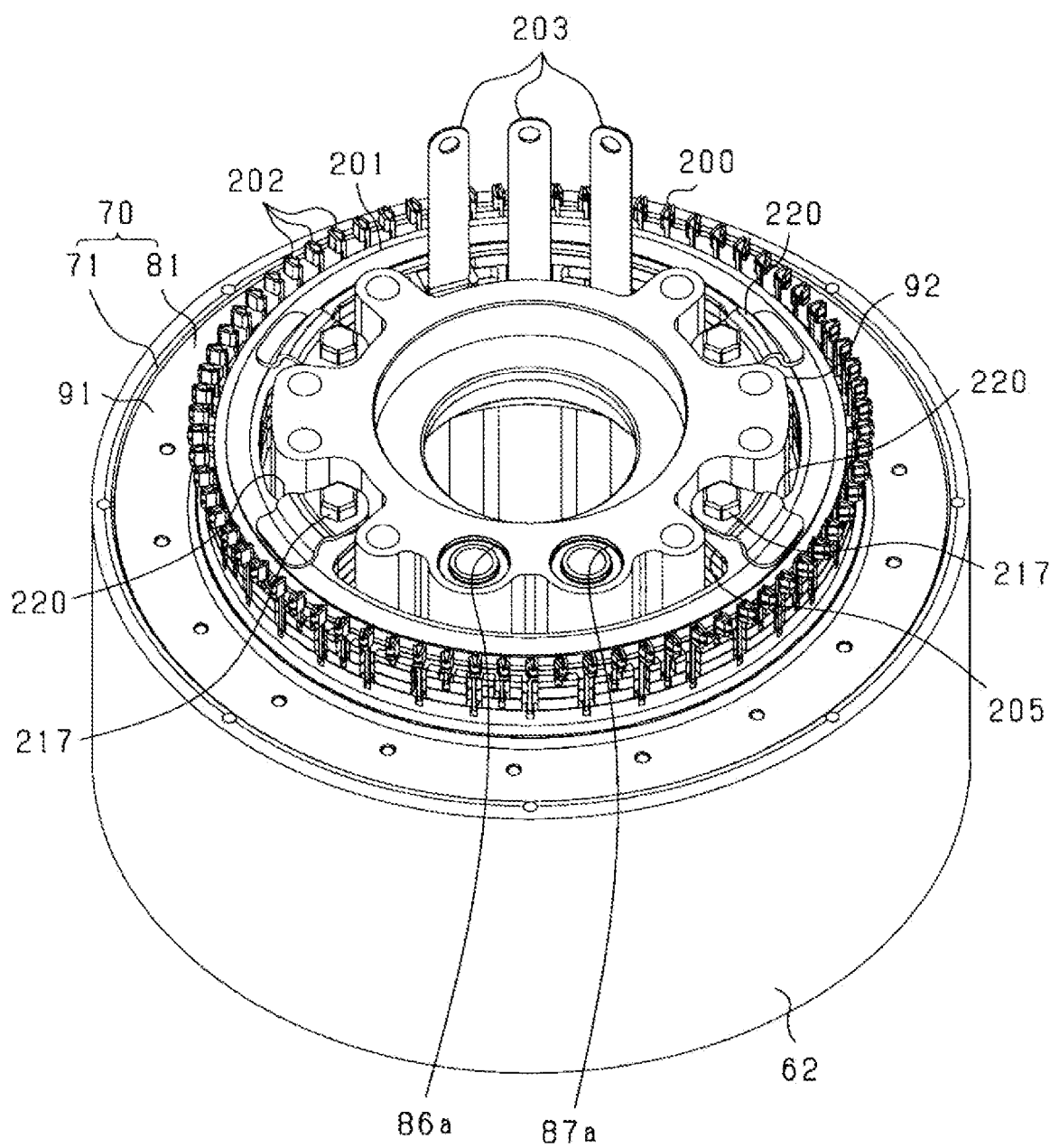
FIG. 31 is a perspective view illustrating a state where the bus bar module is assembled to a stator holder.
Figure 32:
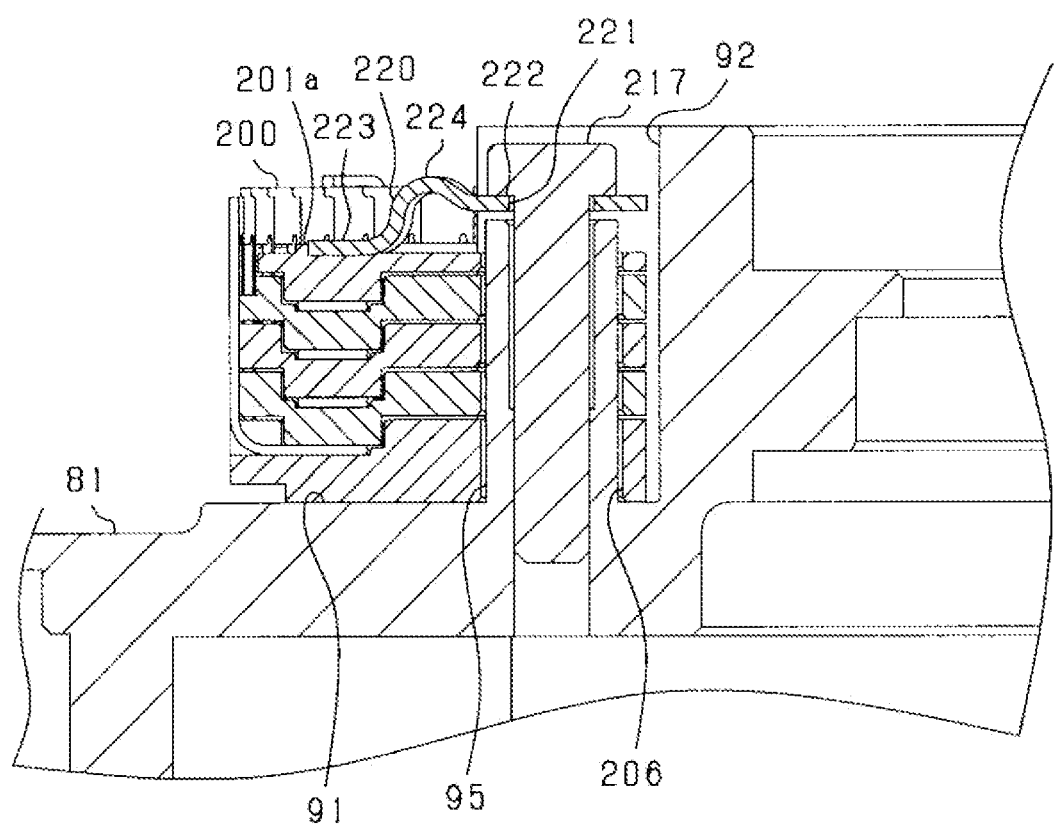
FIG. 32 is a longitudinal sectional view of a stationary portion in which the bus bar module is fixed.

FIG. 31 is a perspective view illustrating a state where the bus bar module 200 is assembled to the stator holder 70, and FIG. 32 is a longitudinal sectional view of the stationary portion in which the bus bar module 200 is fixed. For information about the configuration of the stator holder 70 before the bus bar module 200 is assembled thereto, please refer to FIG. 12.

In FIG. 31, the bus bar module 200 is provided on the end plate portion 91 so as to surround the boss 92 of the inner cylinder member 81. The bus bar module 200 is fixed to the stator holder 70 (inner cylinder member 81) by using a fastener 217 such as a bolt while the bus bar module 200 is positioned through assembling the inner cylinder member 81 to the rod 95 (see FIG. 12).

More specifically, as illustrated in FIG. 32, the end plate portion 91 of the inner cylinder member 81 includes the rod 95 extending in the axial direction. The bus bar module 200 is fixed to the rod 95 by using the fasteners 217 while the rods 95 are inserted through the through-holes 206 respectively provided in the plurality of protrusions 205. In the present embodiment, the bus bar module 200 is fixed using a retainer plate 220 made of a metal material such as iron. The retainer plate 220 includes a mating fastener portion 222, a press portion 223, and a bent portion 224. The mating fastener portion 222 has an insertion hole 221 through which the fastener 217 is inserted. The press portion 223 presses the upper surface of the annular ring 201 of the bus bar module 200. The bent portion 224 is provided between the mating fastener portion 222 and the press portion 223.

When the retainer plate 220 is mounted, the fastener 217 is screwed to the rod 95 of the inner cylinder member 81 while the fastener 217 is inserted through the insertion hole 221 of the retainer plate 220. The press portion 223 of the retainer plate 220 is in contact with the upper surface of the annular ring 201 of the bus bar module 200. In this case, as the fastener 217 is screwed into the rod 95, the retainer plate 220 is pushed downward as viewed in the drawing, and accordingly, the annular ring 201 is pressed downward by the press portion 223. The downward pressure as viewed in the drawing, generated by the screwing of the fastener 217, is transmitted to the press portion 223 through the bent portion 224. Thus, pressing by the press portion 223 is performed while accompanying the elastic pressure at the bent portion 224.

As described above, the annular protrusion 201a is provided on the upper surface of the annular ring 201, and the extending end of the retainer plate 220 on the press portion 223 side can be brought into contact with the protrusion 201a. This configuration can prevent the downward pressure of the retainer plate 220 as viewed in the drawing from being released outward in the radial direction. That is, the pressure generated by the screwing of the fastener 217 is appropriately transmitted to the press portion 223 side.

As illustrated in FIG. 31, when the bus bar module 200 is assembled with respect to the stator holder 70, the I/O terminal 203 is provided at a position 180° opposite to the inlet opening 86a and the outlet opening 87a communicating with the coolant path 85 in the circumferential direction. However, the I/O terminal 203 and the openings 86a and 87a may be collectively provided at the same position (that is, positions close to each other).

Next, a lead member 230 that electrically connects the I/O terminal 203 of the bus bar module 200 to an external device outside the rotary electric machine 10 will be described.

As illustrated in FIG. 1, in the rotary electric machine 10, the I/O terminal 203 of the bus bar module 200 is provided so as to protrude outward from the housing cover 242, and is connected to the lead member 230 on the outer side of the housing cover 242. The lead member 230 relays connection between the I/O terminal 203 for each phase extending from the bus bar module 200 and a power line for each phase extending from an external device such as an inverter.

Figure 33:
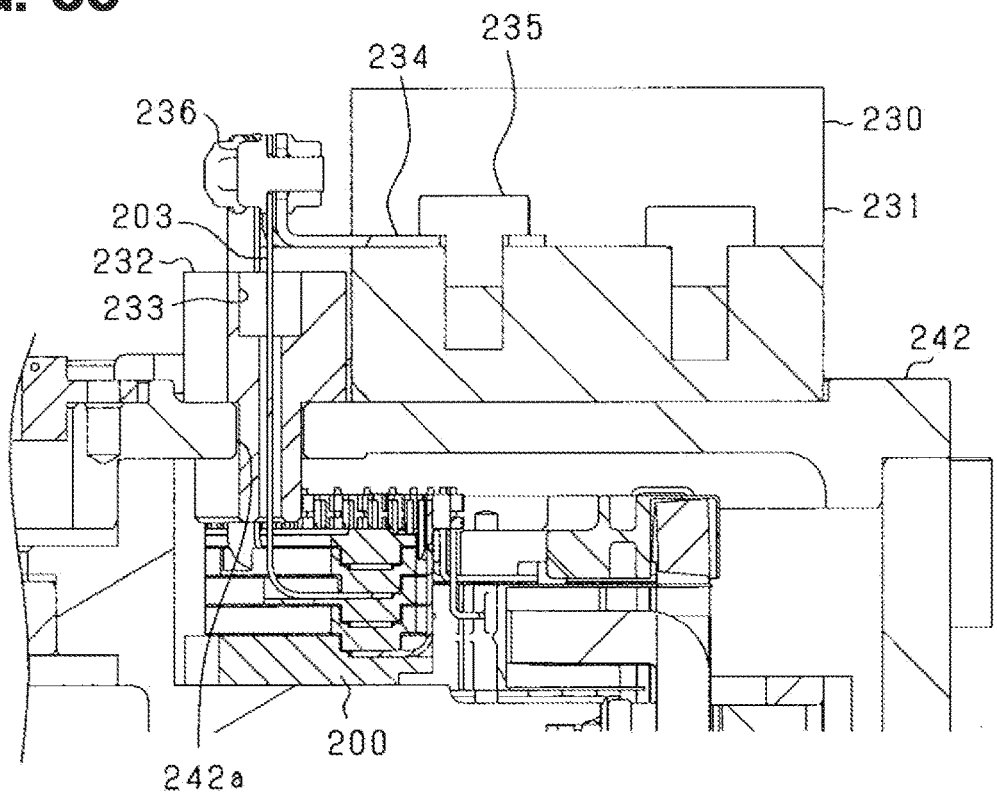
FIG. 33 is a longitudinal sectional view illustrating a state where a lead member is attached to the housing cover.
Figure 34:
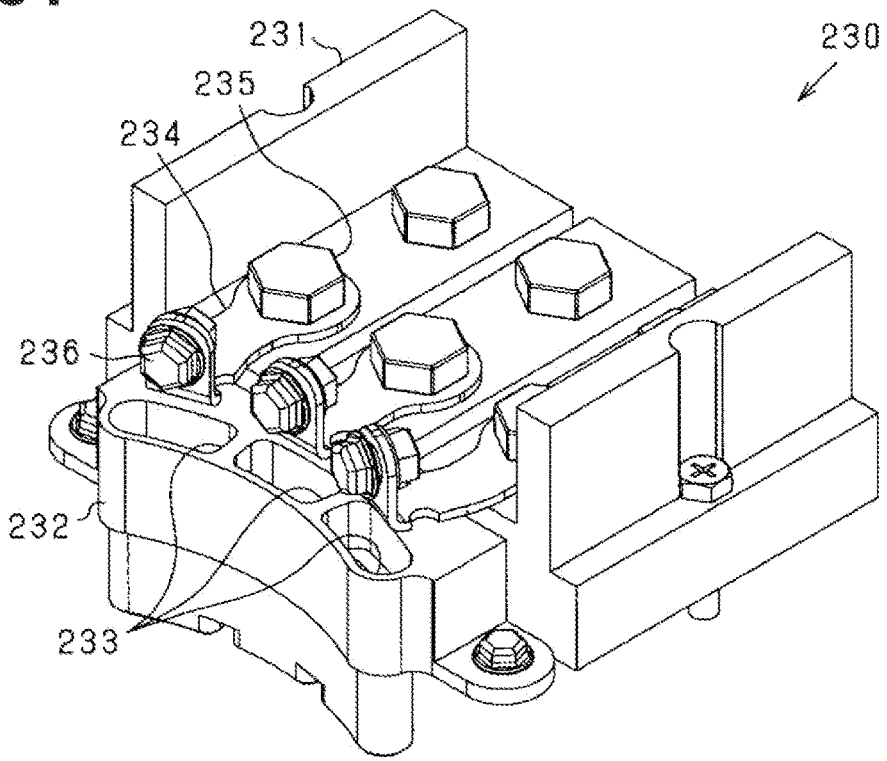
FIG. 34 is a perspective view of the lead member.

FIG. 33 is a longitudinal sectional view illustrating a state where the lead member 230 is attached to the housing cover 242. FIG. 34 is a perspective view of the lead member 230. As illustrated in FIG. 33, a through-hole 242*a* is formed at the housing cover 242, and the I/O terminal 203 can be drawn out through the through-hole 242*a*.

The lead member 230 includes a base 231 fixed to the housing cover 242 and a terminal plug 232 inserted into the through-hole 242*a* of the housing cover 242. The terminal plug 232 has three insertion holes 233. The I/O terminals 203 of the respective phases are inserted through the respective insertion hole 233 on a one-to-one basis. In each of the three insertion holes 233, the section of the opening has an elongated shape. The three insertion holes 233 are formed such that their longitudinal directions are substantially aligned with each other.

The base 231 is attached with three lead bus bars 234 provided for each phase. The lead bus bar 234 is bent and formed in a substantially L shape and is fixed to the base 231 by a fastener 235 such as a bolt. The lead bus bar 234 is further fixed to an extending end of the I/O terminal 203 inserted through the insertion hole 233 of the terminal plug 232 by using a fastener 236 such as a bolt and a nut.

Although not illustrated, a power line for each phase extending from an external device can be connected to the lead member 230. Thus, power can be input to and output from the I/O terminal 203 for each phase.

Figure 35:
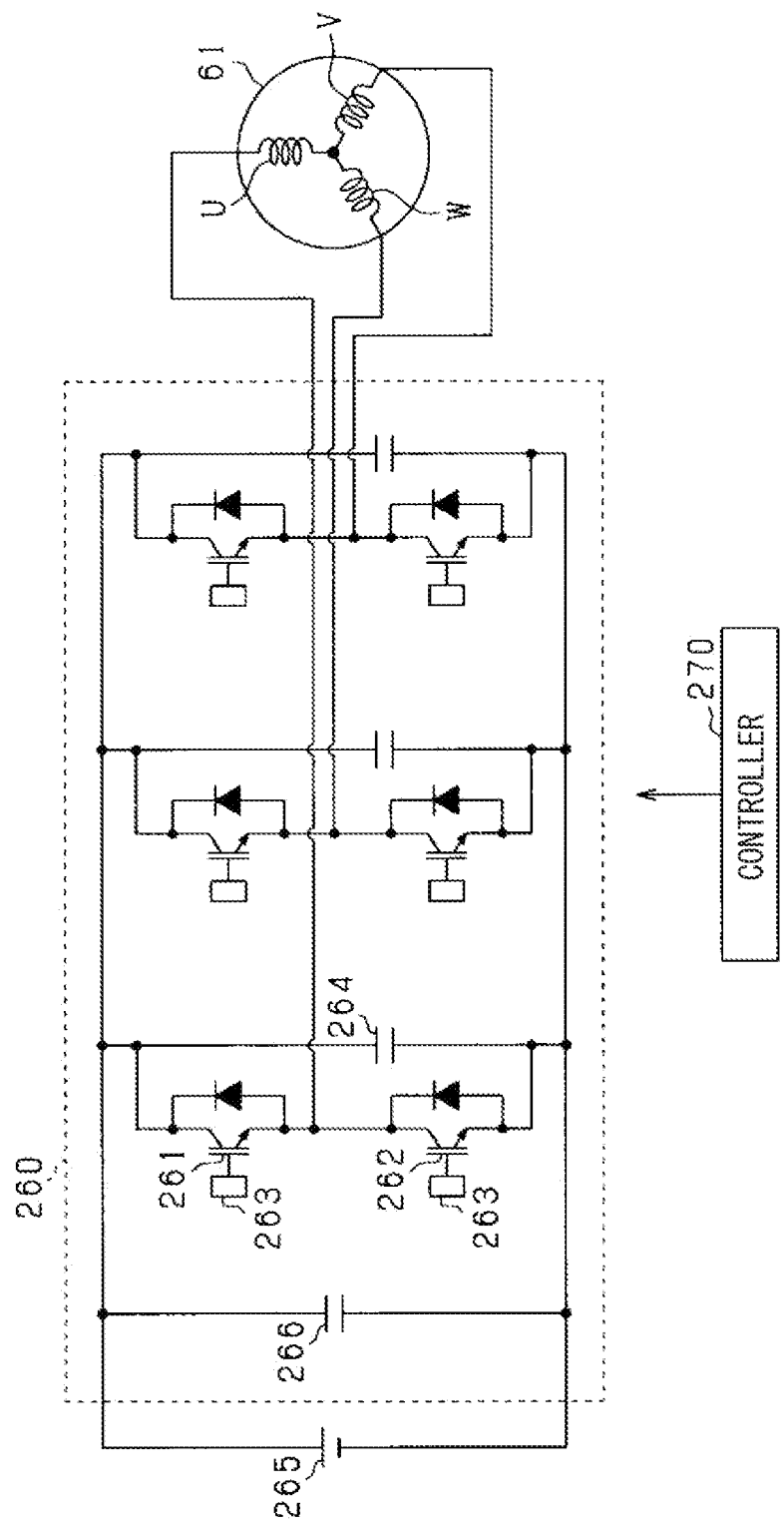
FIG. 35 is an electrical circuit diagram illustrating a control system of the rotary electric machine.
Figure 36:
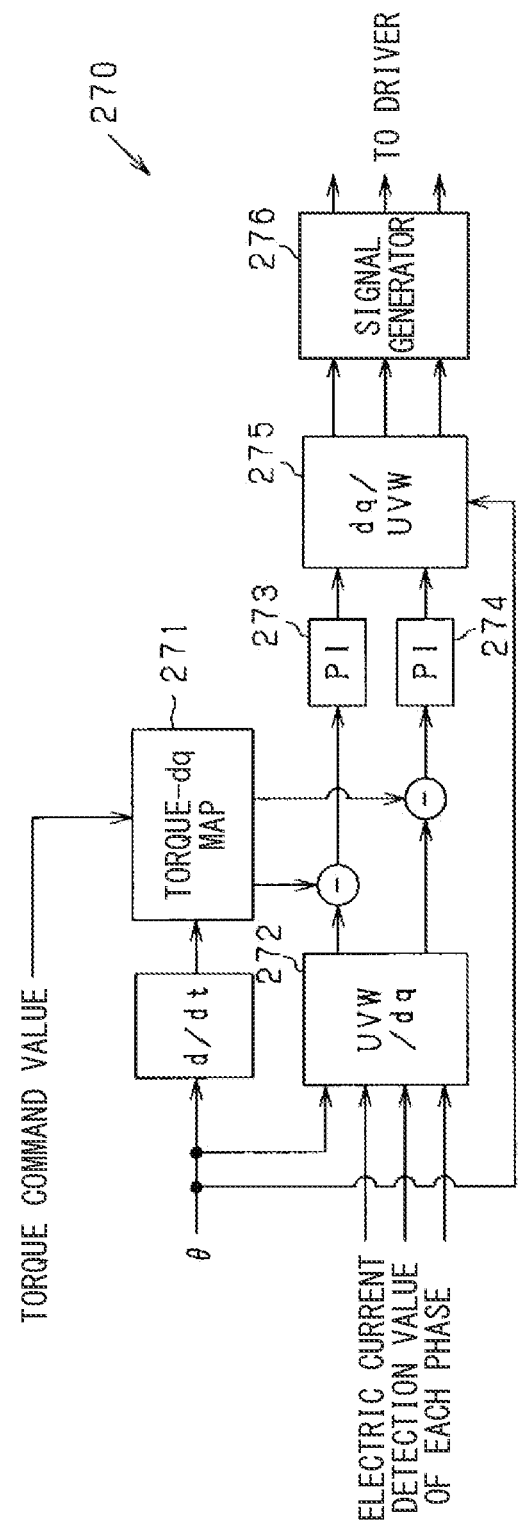
FIG. 36 is a functional block diagram illustrating a current feedback control operation by a controller.

Next, a configuration of a control system that controls the rotary electric machine 10 will be described. FIG. 35 is an electrical circuit diagram of a control system of the rotary electric machine 10, and FIG. 36 is a functional block diagram illustrating control operation by a controller 270.

As illustrated in FIG. 35, the stator winding 61 includes a U-phase winding, a V-phase winding, and a W-phase winding, and an inverter 260 corresponding to a power converter is connected to the stator winding 61. The inverter 260 is configured by a bridge circuit having upper and lower arms whose numbers are respectively identical to the number of phases. The inverter 260 includes a series-connected part including an upper arm switch 261 and a lower arm switch 262 for each phase. Each of these switches 261 and 262 is turned on and off by a driver circuit 263 to control energization of the phase windings of each phase. Each of the switches 261 and 262 includes a semiconductor switch such as a metal-oxide-semiconductor field-effect transistor (MOSFET) or an insulated-gate bipolar transistor (IGBT). A capacitor 264 for charge supply that supplies charges required at the time of switching to the switches 261 and 262 is connected to the upper and lower arms of each phase in parallel to the series-connected part of the switches 261 and 262.

One ends of the U-phase winding, the V-phase winding, and the W-phase winding are respectively connected to intermediate connection points between the switches 261 and 262 of the upper and lower arms. The phase windings are connected in a form of the star connection (Y-connection), and the other ends of the phase windings are connected to one another at the neutral point.

The controller 270 includes a microcomputer including a central processing unit (CPU) and various memories. The controller 270 performs energization control by turning on and off each of the switches 261 and 262 on the basis of various detection information and a request for a motor mode or a generator mode of the rotary electric machine 10. The detection information of the rotary electric machine 10 includes, for example, an angular position (electrical angle) of the rotor 20 detected by an angle detector such as a resolver, a power supply voltage (voltage inputted to the inverter) detected by a voltage sensor, and an exciting current for each phase winding detected by a current sensor. The controller 270 performs on/off control of each of the switches 261 and 262 by, for example, pulse width modulation (PWM) control at a predetermined switching frequency (carrier frequency) or rectangular wave control. The controller 270 may be a built-in controller incorporated into the rotary electric machine 10 or may be an external controller provided outside the rotary electric machine 10.

Since the rotary electric machine 10 according to the present embodiment has a slot-less structure (tooth-less structure), the inductance of the stator 60 is reduced and the electrical time constant is small. Under a condition where the electrical time constant is small, the switching frequency (carrier frequency) is desirably increased to increase the switching speed. In this respect, the capacitor 264 for charge supply is connected in parallel to the series-connected part of the switches 261 and 262 of each phase, thereby reducing the wiring inductance. Therefore, an appropriate countermeasure against surge can be taken even in a configuration in which the switching speed is increased.

The high-potential side terminal of the inverter 260 is connected to the positive electrode terminal of a direct current (DC) power supply 265, and the low-potential side terminal is connected to the negative electrode terminal (ground) of the DC power supply 265. The DC power supply 265 includes, for example, an assembled battery in which a plurality of unit cells are connected in series. In addition, a smoothing capacitor 266 is connected in parallel to the DC power supply 265 to the high-potential side terminal and the low-potential side terminal of the inverter 260.

FIG. 36 is a block diagram illustrating a current feedback control operation for controlling the phase currents of U-, V-, and W-phases.

In FIG. 36, a current command determiner 271 uses a torque-dq map to determine a current command value for the d-axis and a current command value for the q-axis. This command determination is based on: a motor-mode torque command value or a generator-mode torque command value for the rotary electric machine 10; and an electrical angular velocity ω obtained by differentiating an electrical angle θ with respect to time. When the rotary electric machine 10 is used as, for example, a power source for an automotive application, the generator-mode torque command value is a regenerative torque command value.

A d-q converter 272 converts a current value (three phase currents) detected by a current sensor provided for each phase into a d-axis current and a q-axis current. The d-axis current and the q-axis current are components of a two-dimensional rotating Cartesian coordinate system having a direction of an axis of a magnetic field, or field direction, as a d-axis.

The d-axis current feedback control device 273 calculates a d-axis command voltage as a manipulated variable for bringing the d-axis current into agreement with the current command value for the d-axis in a feedback mode. The q-axis current feedback control device 274 calculates a q-axis command voltage as a manipulated variable for bringing the q-axis current into agreement with the current command value for the q-axis in a feedback mode. In each of the feedback control devices 273 and 274, the command voltage is calculated using proportional integral (PI) feedback techniques on the basis of the deviation of the d-axis current and the q-axis current with respect to the current command value.

The three-phase converter 275 converts the d-axis and q-axis command voltages into U-phase, V-phase, and W-phase command voltages. Each of the units 271 to 275 described above is a feedback control device that performs feedback control of the fundamental wave current according to the d-q transformation theory. The command voltages of the U-phase, the V-phase, and the W-phase are feedback control values.

An operation signal generator 276 generates an operation signal of the inverter 260 on the basis of a three-phase command voltage by using a well-known triangle wave carrier comparison. Specifically, the operation signal generator 276 generates switch operation signals (duty signals) for the upper and lower arms in each phase by PWM control. The PWM control is based on magnitude comparison between a signal obtained by normalizing command voltages of three phases with a power supply voltage and a carrier signal such as a triangle wave signal. The switch operation signal generated by the operation signal generator 276 is output to the driver circuit 263 of the inverter 260. The driver circuit 263 turns on and off the switches 261 and 262 of the respective phases.

Next, torque feedback control operation will be described. This operation is mainly used for the purpose of increasing the output power and reducing the loss of the rotary electric machine 10 under an operating condition where the output voltage of the inverter 260 increases. Examples of a situation under such an operating condition include a high rotation operation region and a high output operation region. The controller 270 selects and executes either the torque feedback control operation or the current feedback control operation based on the operating condition of the rotary electric machine 10.

Figure 37:
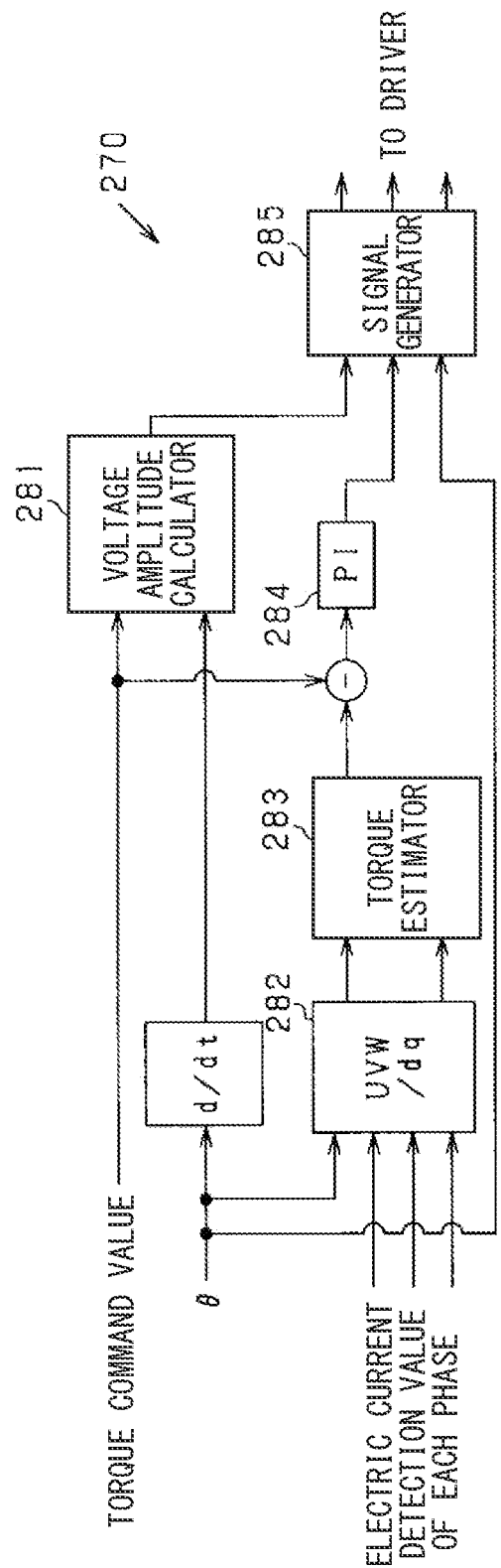
FIG. 37 is a functional block diagram illustrating a torque feedback control operation by the controller.

FIG. 37 is a block diagram illustrating a torque feedback control operation corresponding to the U-, V-, and W-phases.

A voltage amplitude calculator 281 calculates a voltage amplitude command that is a command value of the magnitude of the voltage vector. The calculation is based on the motor-mode torque command value or the generator-mode torque command value for the rotary electric machine 10 and the electrical angular velocity ω obtained by differentiating the electrical angle θ with respect to time.

Similarly to the d-q converter 272, a d-q converter 282 converts a current value detected by a current sensor provided for each phase into a d-axis current and a q-axis current. A torque estimator 283 calculates estimated torque values corresponding to the U-, V-, and W-phases based on the d-axis current and the q-axis current. The torque estimator 283 is only required to calculate the voltage amplitude command on the basis of map information in which the d-axis current, the q-axis current, and the voltage amplitude command are associated with each other.

A torque feedback control device 284 calculates a voltage phase command as a manipulated variable for bringing the estimated torque value into agreement with the motor-mode torque command value or the generator-mode torque command value in a feedback mode. The voltage phase command is a command value of a phase of a voltage vector. The torque feedback control device 284 calculates the voltage phase command using the PI feedback techniques on the basis of the deviation of the estimated torque value with respect to the motor-mode torque command value or the generator-mode torque command value.

An operation signal generator 285 generates an operation signal of the inverter 260 based on the voltage amplitude command, the voltage phase command, and the electrical angle θ. Specifically, the operation signal generator 285 calculates a three-phase command voltages on the basis of the voltage amplitude command, the voltage phase command, and the electrical angle θ. The operation signal generator 285 then generates switch operation signals for the upper and lower arms in each phase by PWM control. The PWM control is based on magnitude comparison between a signal obtained by normalizing three-phase command voltages thus calculated with a power supply voltage, and a carrier signal such as a triangle wave signal. The switch operation signal generated by the operation signal generator 285 is output to the driver circuit 263 of the inverter 260. The driver circuit 263 turns on and off the switches 261 and 262 of the respective phases.

The operation signal generator 285 may alternatively generate the switch operation signal on the basis of: the pulse pattern information that is map information associating the voltage amplitude command, the voltage phase command, the electrical angle θ, and the switch operation signal with one another; the voltage amplitude command; the voltage phase command; and the electrical angle θ.

Modification

Hereinafter, modifications of the above-described first embodiment will be described.

Figure 38:
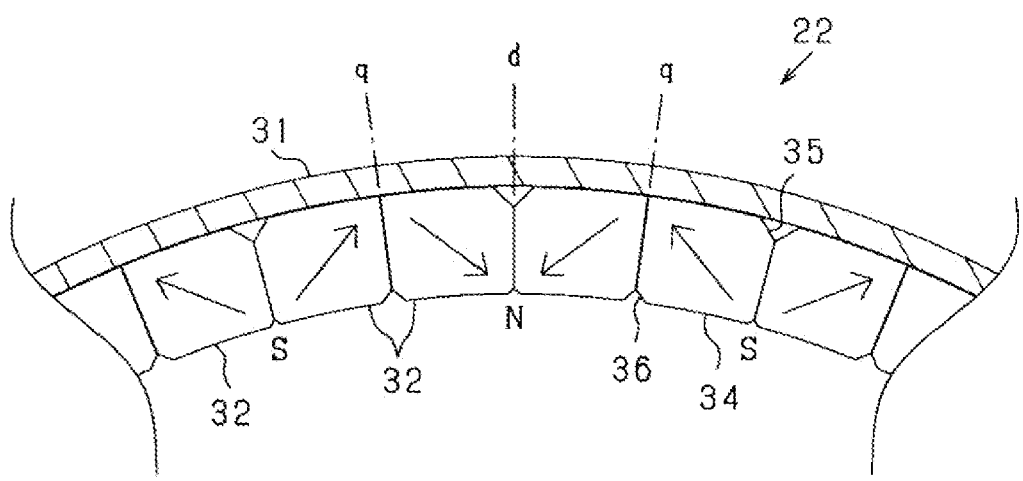
FIG. 38 is a partial transverse sectional view illustrating a sectional structure of the magnet unit in a modification.

The configuration of the magnet 32 in the magnet unit 22 may be changed as follows. In the magnet unit 22 illustrated in FIG. 38, the direction of the easy axis of magnetization is oblique to the radial direction in the magnet 32, and a linear magnetic path is formed along the direction of the easy axis of magnetization. That is, the magnet 32 is linearly oriented as follows. Between a magnetic flux acting surface 34a on the stator 60 side (inner side in the radial direction) and a magnetic flux acting surface 34b on the opposite side to the stator (outer side in the radial direction), the direction of the easy axis of magnetization is oblique to the d-axis. At the same time, the easy axis of magnetization approaches the d-axis on the stator 60 side and separates from the d-axis on the opposite side to the stator in the circumferential direction. Also in this configuration, the length of the magnetic path of the magnet 32 can be made greater than the thickness dimension in the radial direction, and thus the permeance can be improved.

A Halbach array magnet can be used in the magnet unit 22.

In each winding segment 151, the direction of bending of a link portion 153 may be either inward or outward in the radial direction. A relationship between the direction of bending and the core assembly CA may be such that the first link portion 153A is bent toward the core assembly CA, or the first link portion 153A is bent toward the opposite side of the core assembly CA. In addition, the second link portion 153B may be bent either inward or outward in the radial direction as long as the second link portion 153B crosses over part of the first link portion 153A in the circumferential direction, on the outer side of the first link portion 153A in the axial direction.

The winding segments 151 may not include the two types of winding segments 151 (the first winding segment 151A and the second winding segment 151B), but may include one type of winding segment 151. Specifically, the winding segment 151 is preferably formed to have a substantially L shape or a substantially Z shape in a side view. When the winding segment 151 is formed in a substantially L shape in a side view, the link portion 153 is bent either inward or outward in the radial direction on one end side in the axial direction, and the link portion 153 is provided without being bent in the radial direction on the other end side in the axial direction. When the winding segment 151 is formed in a substantially Z shape in a side view, the link portion 153 is bent in directions opposite to each other in the radial direction on one end side in the axial direction and the other end side in the axial direction. In any case, the coil module 150 is preferably fixed to the core assembly CA by the insulating cover covering the link portion 153 as described above.

In the configuration described above, all the winding segments 151 are connected in parallel for each phase winding in the stator winding 61, but this may be changed. For example, all the winding segments 151 for each phase winding may be divided into a plurality of parallel connection groups, and the plurality of parallel connection groups may be connected in series. Specifically, all n winding segments 151 in each phase winding may be divided into two sets of parallel connection groups each including n/2 winding segments 151, three sets of parallel connection groups each including n/3 winding segments 151, or the like, and then those divided parallel connection groups may be connected in series. Alternatively, all of the plurality of winding segments 151 may be connected in series for each phase winding in the stator winding 61.

The stator winding 61 in the rotary electric machine 10 may include two-phase windings (U-phase winding and V-phase winding). In this case, with regard to the winding segment 151 for example, the pair of intermediate conductor portions 152 are separated at one coil pitch. One intermediate conductor portion 152 for the winding segment 151 of another phase is disposed between the pair of intermediate conductor portions 152.

Figure 39:
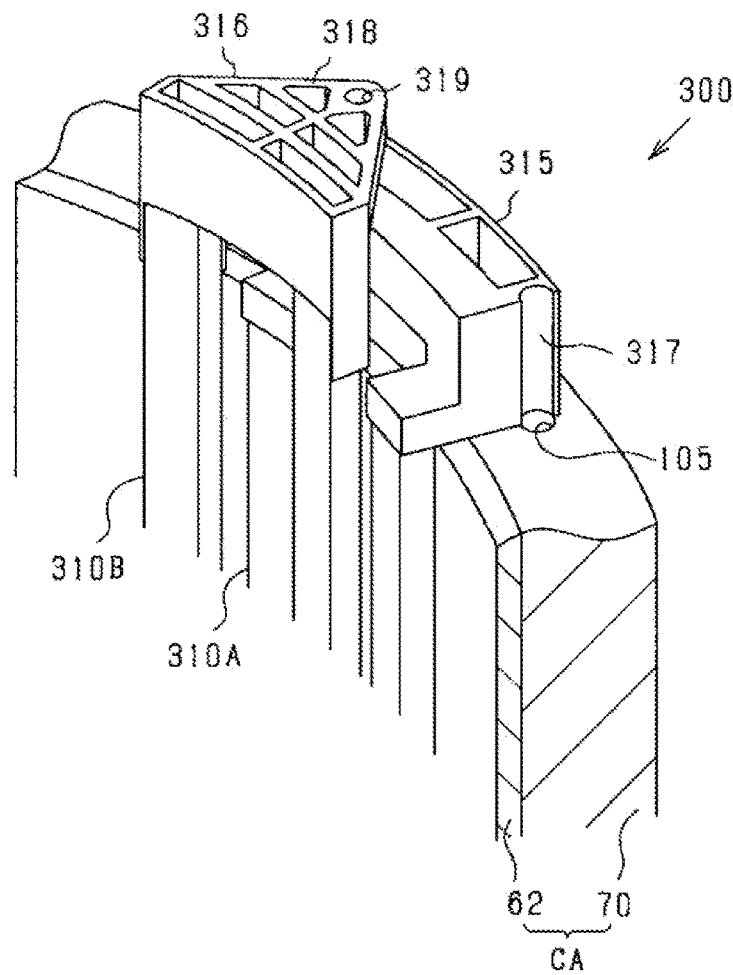
FIG. 39 is a view illustrating a configuration of the stator unit having an inner rotor structure.
Figure 39:
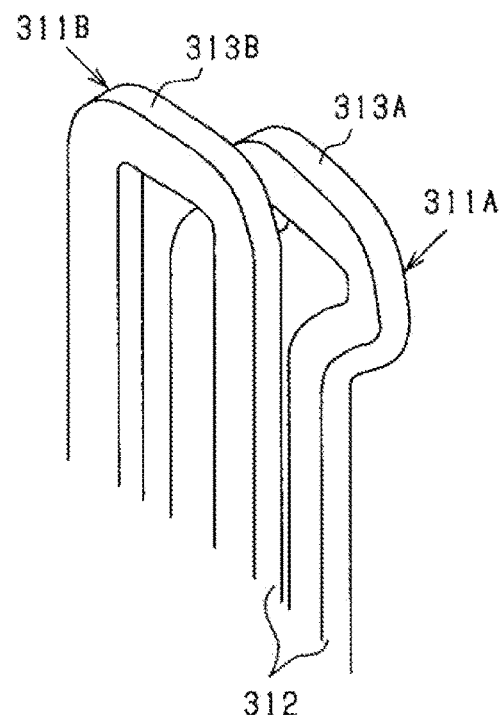

The rotary electric machine 10 can be embodied as an inner rotor type surface permanent magnetic rotary electric machine instead of the outer rotor type surface permanent magnetic rotary electric machine. (a) and (b) of FIG. 39 is a view illustrating a configuration of a stator unit 300 when employing an inner rotor structure. Of FIG. 39, FIG. 39(a) is a perspective view illustrating a state where coil modules 310A and 310B are assembled to the core assembly CA, and FIG. 39(b) is a perspective view illustrating winding segments 311A and 311B included in the coil modules 310A and 310B. In this example, the stator holder 70 is assembled to the outer side of the stator core 62 in the radial direction to form the core assembly CA. In addition, a plurality of the coil modules 310A and 310B are assembled to the inner side of the stator core 62 in the radial direction.

The winding segment 311A has a configuration substantially the same as or similar to that of the first winding segment 151A described above. The winding segment 311A includes a pair of intermediate conductor portions 312 and a link portion 313A formed to be bent to the core assembly CA side on both sides in the axial direction (outer side in the radial direction). The winding segment 311B has a configuration substantially the same as or similar to that of the second winding segment 151B described above. The winding segment 311B includes the pair of intermediate conductor portions 312 and a link portion 313B provided so as to cross over the link portion 313A in the circumferential direction on the outer side in the axial direction, on both sides in the axial direction. An insulating cover 315 is mounted to the link portion 313A of the winding segment 311A, and an insulating cover 316 is mounted to the link portion 313B of the winding segment 311B.

The insulating cover 315 includes semicircular recesses 317 extending in the axial direction at side surface portions on both sides in the circumferential direction. The insulating cover 316 includes a protrusion 318 protruding outward in the radial direction from the link portion 313B. A through-hole 319 extending in the axial direction is provided at an extending end of the protrusion 318.

Figure 40:
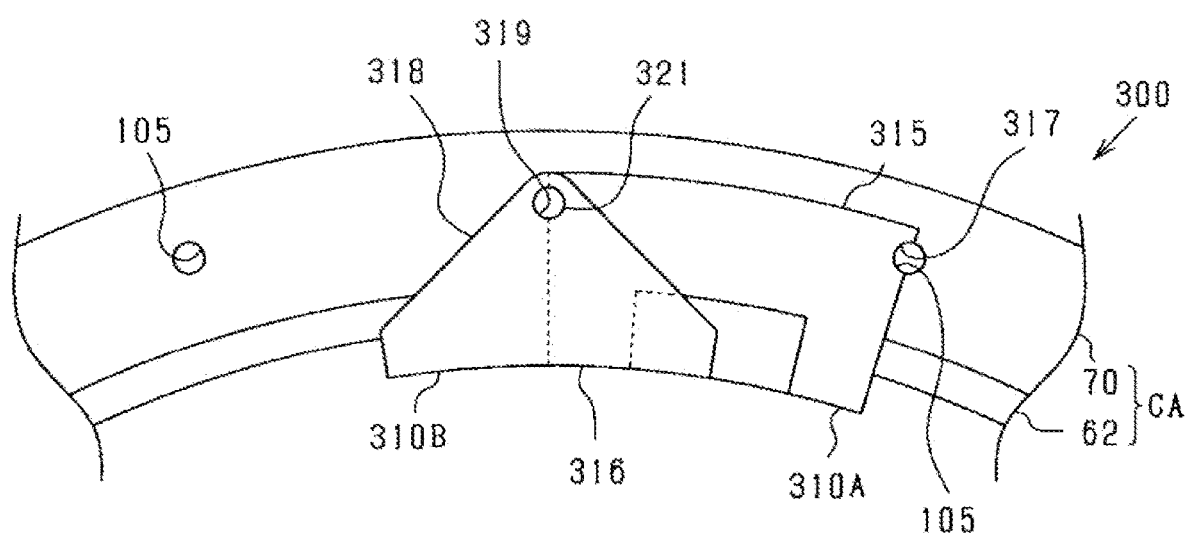
FIG. 40 is a plan view illustrating a state where the coil modules are assembled to the core assembly.

FIG. 40 is a plan view illustrating a state where the coil modules 310A and 310B are assembled to the core assembly CA. In FIG. 40, a plurality of recesses 105 are formed at equal intervals in the circumferential direction at the end surface of the stator holder 70 in the axial direction. The stator holder 70 has a cooling structure utilizing liquid coolant or air. As an air cooling structure, for example, a plurality of heat dissipation fins are preferably formed on the outer peripheral surface.

In FIG. 40, the insulating covers 315 and 316 are disposed to overlap each other in the axial direction. In addition, the recess 317 and the through-hole 319 are connected in the axial direction. The recess 317 is provided at the side surface portion of the insulating cover 315. The through-hole 319 is provided at the central position between one end and the other end in the circumferential direction of the insulating cover 316, in the protrusion 318 of the insulating cover 316. These parts are fixed with fastening pins 321.

In FIG. 40, the fixed position of each of the insulating covers 315 and 316 by the fastening pin 321 is the end surface of the stator holder 70 in the axial direction further on the outer side than the stator core 62 in the radial direction, and the stator holder 70 is fixed with the fastening pin 321. In this case, since the stator holder 70 includes the cooling structure, the heat generated in the winding segments 311A and 311B is easily transferred to the stator holder 70. With this configuration, the cooling performance of the stator winding 61 can be improved.

The stator 60 used in the rotary electric machine 10 may have a protrusion (e.g., tooth) extending from the back yoke. Also in this case, the coil module 150 and the like are only required to be assembled to the back yoke of the stator core.

The rotary electric machine is not limited to a star connection, and may be a Δ connection.

As the rotary electric machine 10, instead of a revolving-field type rotary electric machine in which a field element is a rotor and an armature is a stator, a revolving armature type rotary electric machine in which an armature is a rotor and a field element is a stator can also be adopted.

Second Embodiment

Figure 41:
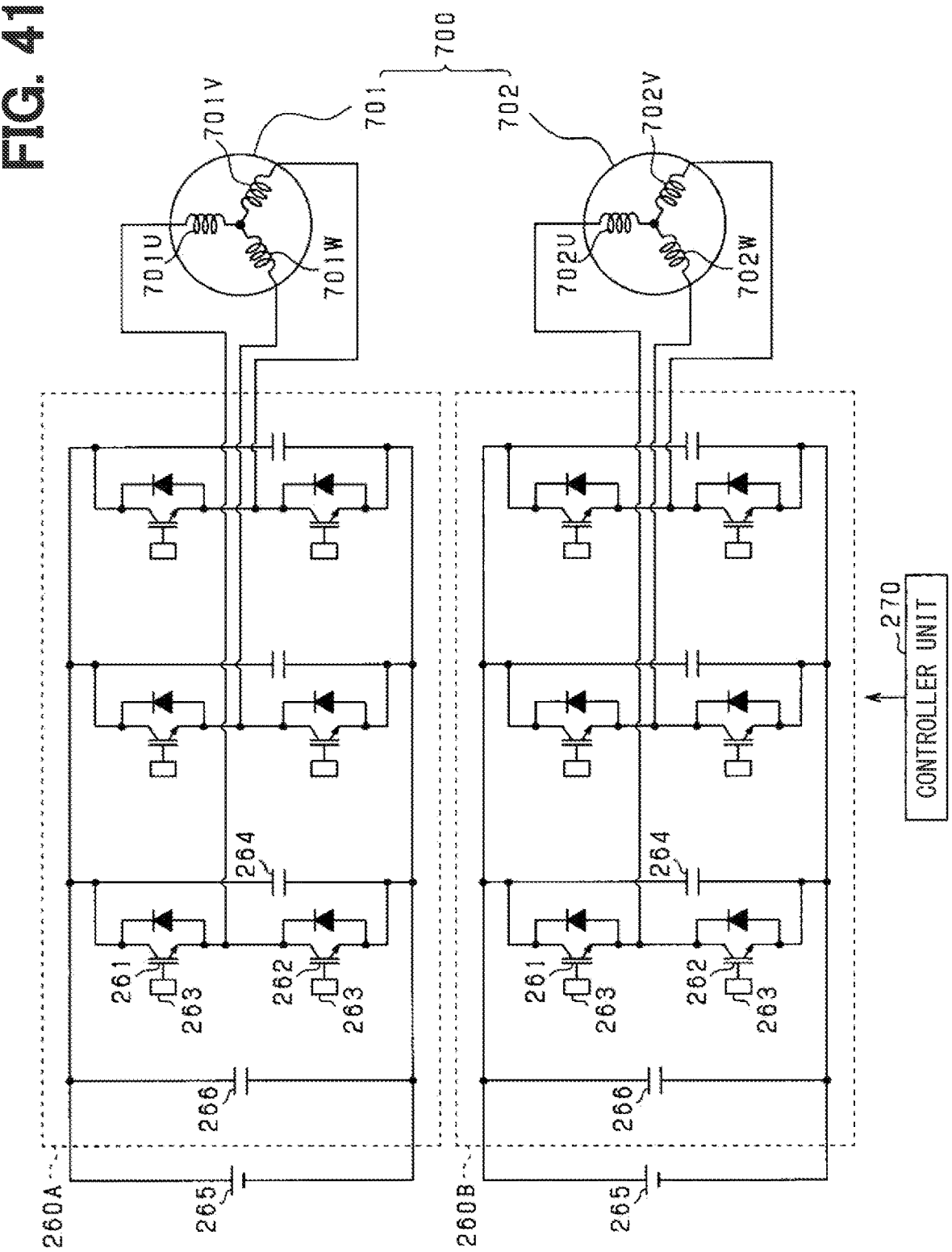
FIG. 41 is an electrical circuit diagram illustrating a control system of a rotary electric machine according to a second embodiment.

Next, a rotary electric machine according to a second embodiment will be described. The rotary electric machine in this embodiment includes a stator winding 700 as shown in FIG. 41. This stator winding 700 includes two electrically independent systems of stator windings. The stator windings of a first system are indicated as a first winding group 701, and the stator windings of a second system are indicated as a second winding group 702.

As shown in FIG. 41, the first winding group 701 includes a U-phase winding 701U, a V-phase winding 701V, and a W-phase winding 701W. The second winding group 702 includes a U-phase winding 702U, a V-phase winding 702V, and a W-phase winding 702W.

Figure 42:
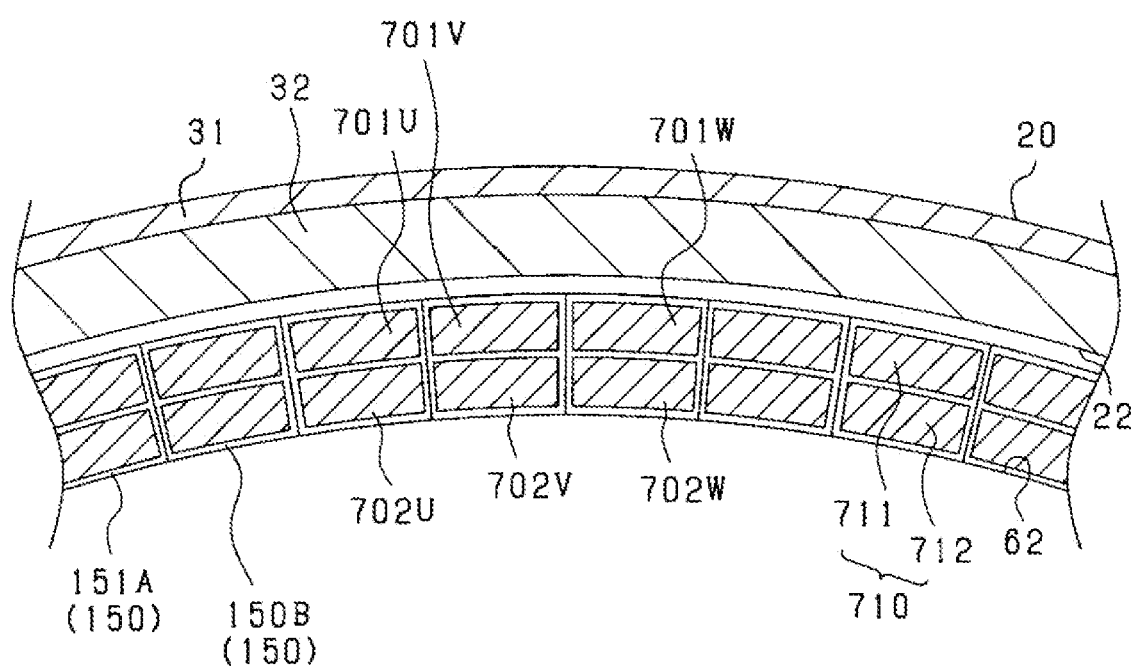
FIG. 42 is a transverse sectional view illustrating an arrangement of winding segments according to the second embodiment.

Each of phase windings 701U, 701V, 701W, 702U, 702V, 702W is configured by connecting the winding segments 710 in parallel or in series. As shown in FIG. 42, the winding segments 710 of the present embodiment are divided radially inside and outside in each coil module 150. That is, the winding segment 710 includes an outer winding segment 711 and an inner winding segment 712. The outer winding segment 711 is configured with multiple windings of a conductor CR and arranged radially outward (on the side of the rotor 20). The inner winding segment 712 is configured with multiple windings of the conductor CR arranged radially inward (toward the stator core 62 side) and configured in the same manner as the inner winding segment 712.

Figure 43:
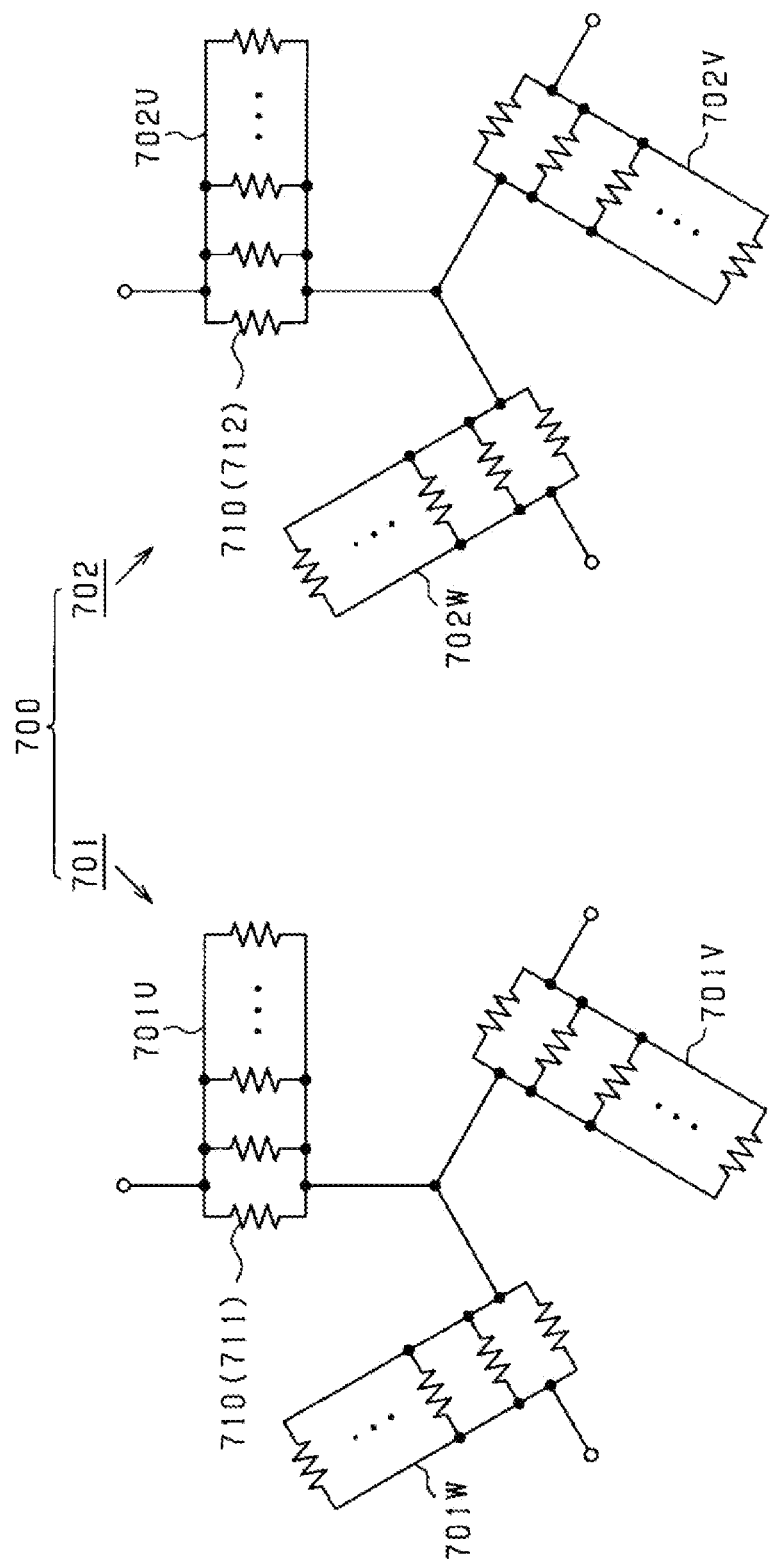
FIG. 43 is a circuit diagram illustrating a connection state of the winding segments according to the second embodiment.

The first winding group 701 is configured by connecting the outer winding segments 711. The second winding group 702 is configured by connecting the inner winding segments 712. More specifically, as shown in FIG. 43, each phase winding 701U, 701V, 701W, 702U, 702V, 702W is configured by connecting the winding segments 710 in parallel. The first winding group 701 is formed by connecting one ends of the phase windings 701U, 701V, 701W to a neutral point, that is, by a star connection (Y connection). A second winding group 702 is configured by connecting one ends of the phase windings 702U, 702V, 702W to the neutral point, that is, by a star connection. The neutral point of the first winding group 701 and the neutral point of the second winding group 702 are provided independently from each other. That is, the first winding group 701 and the second winding group 702 are connected to different neutral point bus bars. In this embodiment, the star connection is adopted, nevertheless, a delta connection may be adopted.

As shown in FIG. 42, the outer winding segment 711 forming the U-phase winding 701U in the first winding group 701 is circumferentially arranged at the same position as the inner winding segment 712 forming the U-phase winding 702U in the second winding group 702. The outer winding segment 711 forming the phase winding 701U is arranged so as to radially overlap with the inner winding segment 712 forming the phase winding 702U. The same applies to the V phase and the W phase. In other words, the first winding group 701 is arranged at the same position as the second winding group 702 in the same phase in the circumferential direction. The first winding group 701 and the second winding group 702 are arranged at the same electrical angle.

The configuration of each coil module 150 is the same as that of the first embodiment, except that it is divided radially inside and outside. For example, the shape of each coil module 150 (including the shape of the intermediate conductor portion 152 and the link portions 153A and 153B), the winding ends 154 and 155 provided on the winding segments 711 and 712, and the insulation The configurations of the covers 161 to 164 and the like are the same as each other. Therefore, the description of the first embodiment is used and the description thereof is omitted.

In the second embodiment, as shown in FIG. 41, inverters 260A and 260B corresponding to power converters are connected to the first winding group 701 and the second winding group 702, respectively. Note that the inverters 260A and 260B have the same configuration as the inverter 260 of the first embodiment, so description thereof will be omitted.

As in the first embodiment, the controller 270 of the present embodiment controls energization by turning on and off the switches 261 and 262 of the inverters 260A and 260B based on various detection information and requests for power driving and power generation. Therefore, the controller 270 serves as a current control device. Similarly to the first embodiment, the controller 270 selects and executes either the torque feedback control operation or the current feedback control operation based on the operating condition of the rotary electric machine 10.

The rotary electric machine of this embodiment has a slotless structure (toothless structure). Therefore, the magnet magnetic flux from the magnet unit 22 is not guided by the teeth and does not pass through the teeth. Thus, the magnetic flux waveform passing through the stator winding from the magnet changes depending on the distance between the magnet unit 22 and the stator winding 700. This will be described in detail.

Herein, as shown in the diagram on the left side of (b) in FIG. 44, the description will be made on the premise that the waveform of the magnet magnetic flux passing through the second winding group 702 on the radially inner has an ideal sinusoidal shape. In this case, the waveform of the magnet magnetic flux passing through the first winding group 701 closer to the magnet unit 22 than the second winding group 702 has a peak value (maximum value). This is because the magnetic resistance based on the air gap is reduced.

In this case, when the same waveform, for example, the sinusoidal current is applied to the first winding group 701 and the second winding group 702, the torque is affected by the waveform of the magnetic flux passing through the first winding group 701. Therefore, it is difficult to approximate the waveform to an ideal sinusoidal shape. As a result, torque ripple occurs, and noise and vibration may increase.

Therefore, the controller 270 of this embodiment implements the following control method. That is, in consideration of the difference in the magnetic flux waveform from the magnet unit 22 based on the difference in the distance to the rotor 20 in the radial direction, the controller 270 controls the inverters 260A and 260B such that that the current waveform of the first winding group 701 and the current waveform of the second winding group 702 are different from each other. Specifically, the controller 270 adjusts the peak value of the magnetic flux waveform of the first winding group 701 to be smaller than the magnetic flux waveform of the second winding group 702, correspondingly to the peak value of the magnetic flux waveform of the first winding group 701 that becomes larger than the magnetic flux waveform of the second winding group 702.

Accordingly, the controller 270 of this embodiment has a current control function.

The above-described embodiment produces the following effects.

As shown in FIG. 41, the stator winding 700 of the above embodiment is a two-system winding. In the radial direction, the first winding group 701 is closer to the rotor 20 than the second winding group 702. That is, in consideration of the difference in the magnetic flux waveform from the magnet unit 22 based on the difference in the distance to the rotor 20 in the radial direction (see left in FIG. 44), the controller 270 controls the inverters 260A and 260B such that that the current waveform of the first winding group 701 and the current waveform of the second winding group 702 (see middle in FIG. 44) are different from each other. In this way, as shown in the right of FIG. 44, the torque waveform is brought closer to an ideal sinusoidal shape both inside and outside in the radial direction. Therefore, the rotary electric machine 10 can be driven with low vibration and low noise.

The first winding group 701 and the second winding group 702 are respectively composed of three-phase windings 701U, 701V, 701W, 702U, 702V, and 702W. The first winding group 701 is arranged at the same position as the second winding group 702 in the same phase in the circumferential direction. That is, the U-phase winding 701U is arranged at the same position as the in-phase winding 702U in the circumferential direction. This configuration facilitates the arrangement and the wiring and facilitates manufacturing of the device. The same applies to the V phase and the W phase.

In the U-phase coil module 150, the U-phase winding 701U and the U-phase winding 702U are collectively covered with the insulating covers 161 and 162 and the insulating jacket 157. The same applies to the V phase and the W phase. Therefore, compared to a configuration in which the U-phase winding 701U and the U-phase winding 702U are made separately, manufacturing work, assembly work, and the like can be reduced.

Modification of Second Embodiment

A part of the configuration of the second embodiment may be modified as follows.

Figure 45:
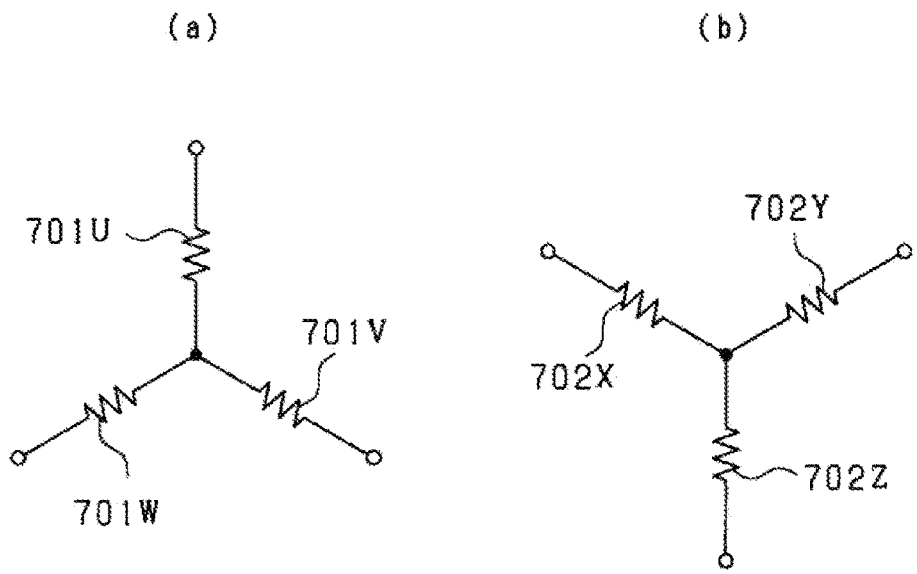
FIG. 45 is a circuit diagram illustrating a connection state of the winding segments according to a modification example.

In the second embodiment, the stator winding 700 is composed of three-phase windings 701U, 701V, 701W, 702U, 702V, and 702W, nevertheless, may be composed of six-phase windings. Details will be given below. As shown in FIG. 45, the first winding group 701 is composed of the three-phase windings 701U, 701V, and 701W, as in the second embodiment. On the other hand, the second winding group 702 is composed of the three-phase windings 702X, 702Y, and 702Z. The X-phase winding 702X is arranged at a position shifted by a predetermined electrical angle (for example, 60 degrees) from the U-phase winding 701U. Similarly, the Y-phase winding 702Y is arranged at a position shifted by a predetermined electrical angle from the V-phase winding 701V. The Z-phase winding 702Z is arranged at a position shifted by a predetermined electrical angle from the W-phase winding 701W.

The phase windings 702X, 702Y, 702Z of the second winding group 702 are made by connecting the outer winding segments 711 in parallel. Note that the phase windings 702X, 702Y, and 702Z are star-connected, nevertheless, may be delta-connected.

Figure 46:
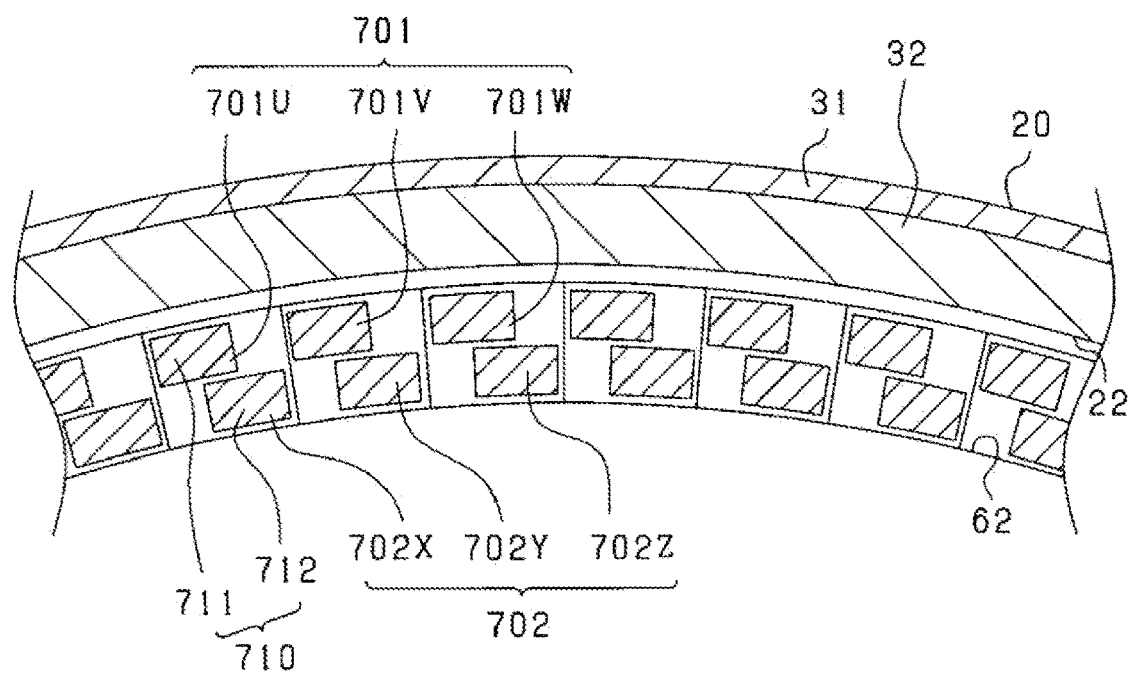
FIG. 46 is a transverse sectional view illustrating an arrangement of winding segments according to the modification example.

As shown in FIG. 46, the inner winding segment 712, which constitutes the X-phase winding 702X in the second winding group 702, is arranged at a position shifted by a predetermined angle in the circumferential direction relative to the outer winding segment 711, which constitutes the U-phase winding 701U in the first winding group 701. Note that the outer winding segment 711, which constitutes the phase winding 701U, may partially overlap with the inner winding segment 712, which constitutes the phase winding 702X, in the radial direction. The other phases are similarly constructed. Therefore, the phase windings 701U, 701V, 701W of the first winding group 701 are arranged and shifted from the respective phase windings 702X, 702Y, 702Z of the second winding group 702 by a predetermined electrical angle.

Figure 44:
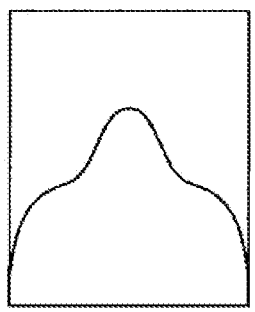
FIG. 44 includes (a) that includes a magnetic flux waveform of a first winding group, a current waveform of the first winding group, and a torque waveform of the first winding group and (b) that includes a magnetic flux waveform of a second winding group, a current waveform of the second winding group, and a torque waveform of the second winding group.
Figure 44:
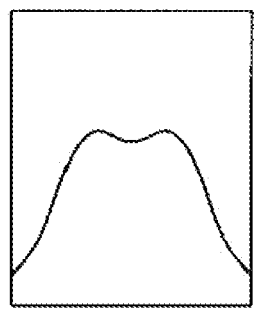
Figure 44:
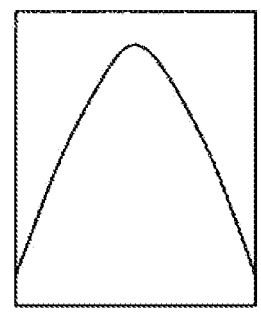
Figure 44:
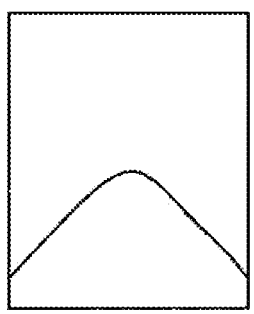
Figure 44:
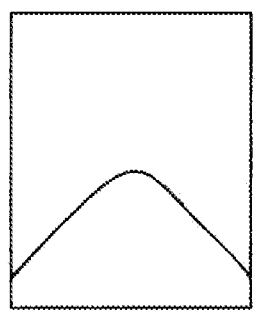
Figure 44:
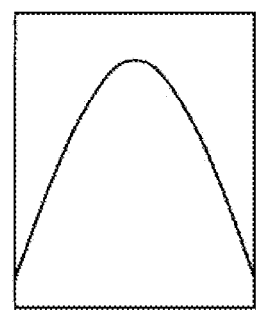

The configuration in this way, similarly to the second embodiment, as shown in the left figure in (a) of FIG. 44, the waveform of the magnet magnetic flux passing through the first winding group 701 closer to the magnet unit 22 than the second winding group 702 has a peak value (maximum value).

Therefore, also in this modification, as in the second embodiment, the controller 270 controls the inverters 260A and 260B in consideration of the difference in the magnetic flux waveform from the magnet unit 22, so as to differentiate the current waveform to the first winding group 701 from the current waveform to the second winding group 702. As a result, the torque waveform can be approximated to an ideal sinusoidal shape both inside and outside in the radial direction, and the rotary electric machine 10 can be driven with low vibration and low noise.

In addition, compared to the configuration composed of three-phase windings, the configuration composed of the six phase windings enables to reduce a fluctuation in the composite wave of the torque waveform. Therefore, the configuration enables to achieve lower vibration and lower noise.

In the second embodiment, the controller 270 may switch among the systems of the stator winding 700 through which a current flows, depending on the operating point (operating region) of the rotary electric machine 10. Specifically, the controller 270 may control a current to flow only through the second winding group 702, when the operating point of the rotary electric machine 10 is in a high rotation speed range, more specifically in a low torque and high rotation region. In this way, it is possible to reduce the number of turns, suppress an influence of an induced voltage, and cause rotation at a high speed in the high rotation speed range. Herein, a current is passed through not the first winding group 701 but only the second winding group 702, in which the magnetic flux waveform of the magnet changes gradually compared to the first winding group 701. As a result, torque ripple can be easily suppressed, and operation can be performed with lower vibration and lower noise. In the low rotation region, by switching the windings, a current is caused to flow through the first winding group 701 and the second winding group 702. As a result, the number of turns is increased, and high torque output is enabled.

Figure 47:
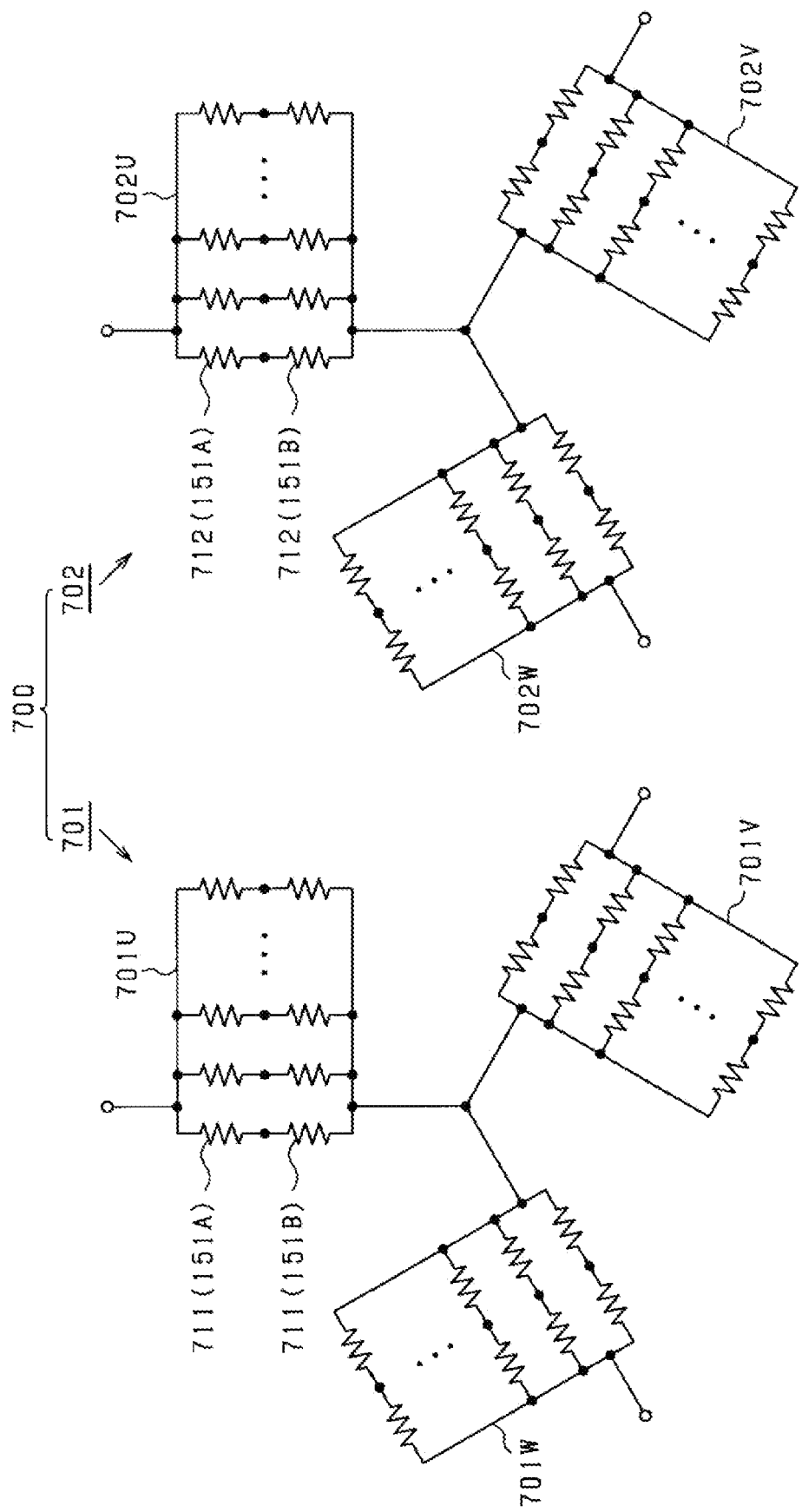
FIG. 47 is a circuit diagram illustrating a connection state of the winding segments according to the modification example.

In the second embodiment, each phase winding 701U, 701V, 701W, 702U, 702V, 702W is formed by connecting the winding segments 710 in parallel. It is noted that, the connection mode may be modified arbitrarily. For example, as shown in FIG. 47, the phase winding of each phase may be formed by connecting, in parallel, series-connected bodies in which two winding segments are connected in series. In this case, preferably, the outer winding segment 711 (or the inner winding segment 712), which constitutes the first winding segment 151A having a bent shape on both ends in the axial direction, and the outer winding segment 711 (or the inner winding segment 712), which constitutes a second winding segment 151B that does not have a bent shape on both ends in the axial direction, are connected in series to form the series connection body.

Parallel connection of winding segments, which are different in the shape, the length, and the coil resistances, may increase a circulating current. Therefore, the series connection body is formed in the above way. In this way, it is desirable to suppress the circulating current by leveling the coil resistance between the series-connected bodies, which are connected in parallel.

In the second embodiment and the modifications, the configuration of the respective winding segments 151A and 151B may be modified as follows. As described in the second embodiment, it is assumed that, in the winding segments 151A and 151B, the winding segment is divided into two on the inner and outer sides in the radial direction, and the outer winding segment 711 and the inner winding segment 712 are formed. Illustration of this is omitted.

Figure 48:
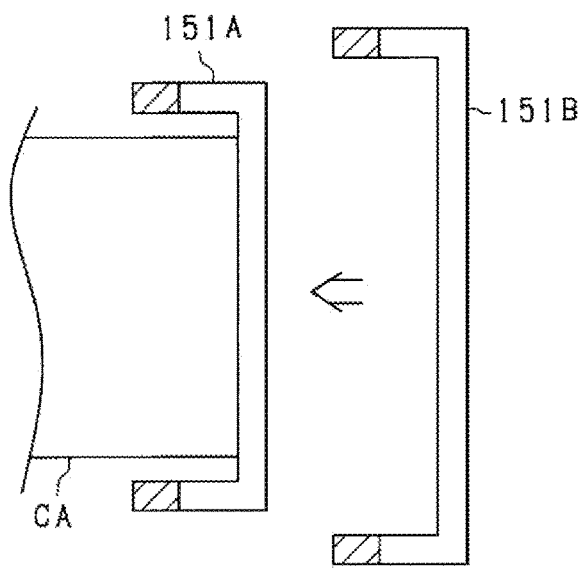
FIG. 48 is a side view schematically showing a first winding segment and a second winding segment according to a modification example.
Figure 48:
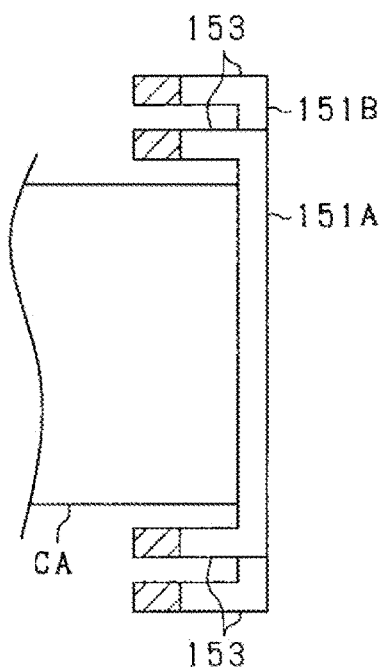

In the configuration shown in (a) and (b) in FIGS. 48, both the first winding segment 151A and the second winding segment 151B are substantially C-shaped in the side view, and have different lengths (axial lengths) in the axial direction. Specifically, each of the winding segments 151A and 151B is formed such that the link portions 153 on both sides in the axial direction are bent radially toward the core assembly CA, i.e., toward the opposite side of the magnet unit 22 of the rotor 20. Further, the axial length of the second winding segment 151B is longer than the axial length of the first winding segment 151A. Therefore, on the one end side and the other end side in the axial direction, the link portion 153 of the first winding segment 151A is on the axially inside, and the link portion 153 of the second winding segment 151B is on the axially outside. Further, the second winding segment 151B is assembled from the radially outer side while the first winding segment 151A is pre-attached to the core assembly CA.

Figure 49:
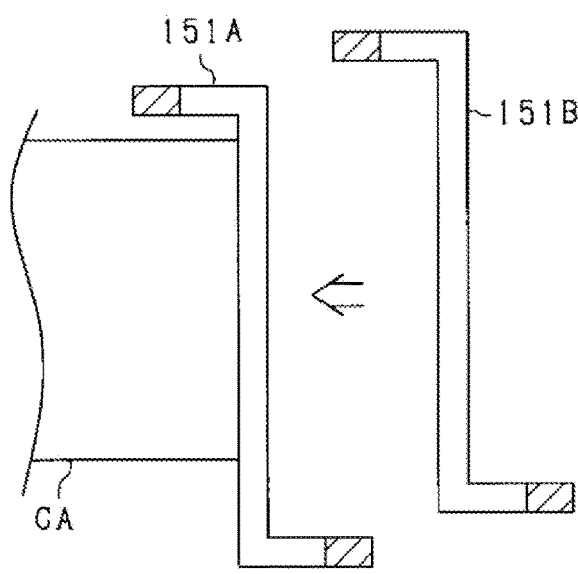
FIG. 49 is a side view schematically showing a first winding segment and a second winding segment according to a modification example.
Figure 49:
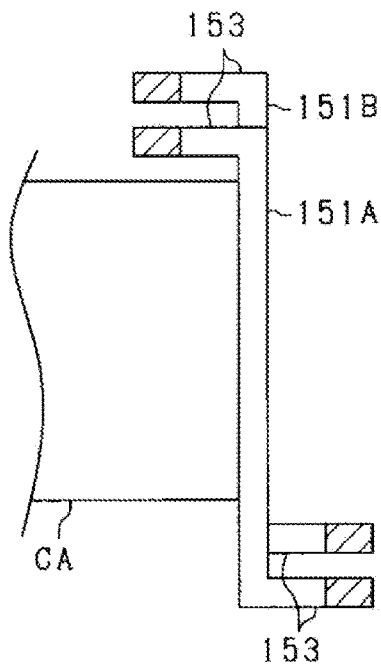

In the configuration shown in (a) and (b) of FIG. 49, both the first winding segment 151A and the second winding segment 151B are substantially Z-shaped when viewed from the lateral side. In other words, each of the winding segments 151A and 151B is formed such that the link portions 153 on both sides in the axial direction are bent in opposite directions in the radial direction. The winding segments 151A and 151B have the same shape when viewed from the lateral side, and are assembled to the core assembly CA at axial assembly positions shifted from each other. The second winding segment 151B is assembled from the radially outer side while the first winding segment 151A is pre-attached to the core assembly CA.

Figure 50:
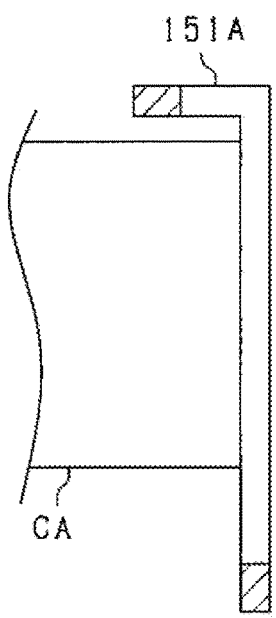
FIG. 50 is a side view schematically showing a first winding segment and a second winding segment according to a modification example.
Figure 50:
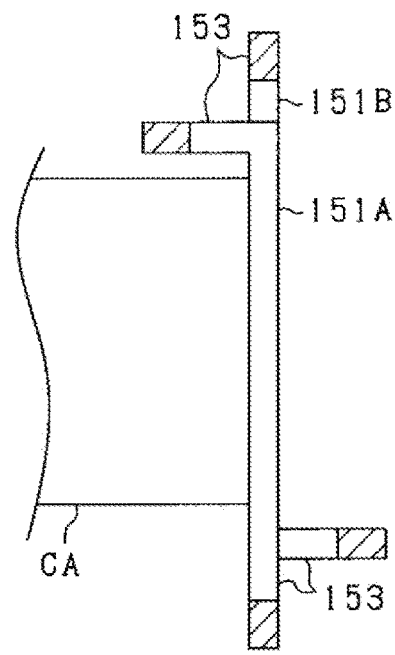

In the configuration shown in (a) and (b) of FIG. 50, both the first winding segment 151A and the second winding segment 151B are substantially L-shaped when viewed from the lateral side. That is, each of the winding segments 151A and 151B is radially bent only at one end in the axial direction. In the first winding segment 151A, the link portion 153 on one side in the axial direction is bent toward the core assembly CA. In the second winding segment 151B, the link portion 153 on the other side in the axial direction is bent to the opposite side of the core assembly CA. Further, the second winding segment 151B is assembled from the radially outer side while the first winding segment 151A is pre-attached to the core assembly CA.

Figure 51:
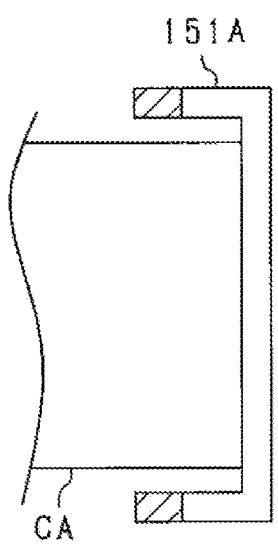
FIG. 51 is a side view schematically showing a first winding segment and a second winding segment according to a modification example.
Figure 51:
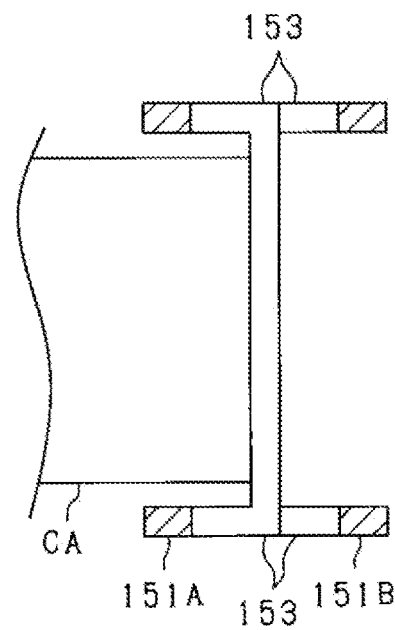

In the configuration shown in (a) and (b) of FIG. 51, both the first winding segment 151A and the second winding segment 151B are substantially C-shaped when viewed from the lateral side, and are assembled in opposite directions in the radial direction. In other words, in the first winding segment 151A, the link portions 153 on both sides in the axial direction are bent toward the core assembly CA. In the second winding segment 151B, the link portions 153 on both sides in the axial direction are bent to the opposite side of the core assembly CA. Further, the second winding segment 151B is assembled from the radially outer side while the first winding segment 151A is pre-attached to the core assembly CA. In the configuration of FIG. 51, the link portion 153 of the first winding segment 151A and the link portion 153 of the second winding segment 151B overlap each other in the radial direction.

The configurations of FIGS. 49 to 51 enables, in addition to assembling of the second winding segment 151B in the radial direction, assembling of the second winding segment 151B in the axial direction.

In the second embodiment, the first winding group 701 and the second winding group 702 are arranged at different positions in the radial direction, nevertheless, may be arranged at different positions in the circumferential direction (rotational direction). In this case, the controller 270 may suppress the circulating current by differentiating the current waveform to the first winding group 701 from the current waveform to the second winding group 702. The controller 270 may supply a current to one and suppress the back electromotive force to expand the output range.

The disclosure in the present specification is not limited to the illustrated embodiments. The disclosure encompasses the illustrated embodiments and modifications based on the embodiments by those skilled in the art. For example, the disclosure is not limited to the combinations of components and/or elements shown in the embodiments. The disclosure may be implemented in various combinations. The disclosure may have additional portions that may be added to the embodiments. The disclosure encompasses omission of components and/or elements of the embodiments. The disclosure encompasses the replacement or combination of components and/or elements between one embodiment and another. The disclosed technical scope is not limited to the description of the embodiments. The several technical ranges disclosed are indicated by the description of the claims, and should be construed to include all modifications within the meaning and range equivalent to the description of the claims.

While the present disclosure has been described with reference to embodiments thereof, it is to be understood that the disclosure is not limited to the embodiments and constructions. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A rotary electric machine comprising:
   a field element having a plurality of magnetic poles;
   an armature having a toothless configuration and including
      an armature winding including a plurality of winding segments and
      a support member provided on a radially inner side or on a radially outer side of the armature winding and provided on an opposite side of the armature winding from the field element, the support member supporting the plurality of winding segments, wherein
   either the field element or the armature is a rotor, and
   the armature winding includes windings of two systems, which are electrically independent, and in which an armature winding of a first system is closer to the field element in a radial direction than an armature winding of a second system,
   the rotary electric machine further comprising:
   a current control device configured to control a current of the armature winding of the first system and the armature winding of the second system, wherein
   the current control device is configured to differentiate a current waveform of the armature winding of the first system and a current waveform of the armature winding of the second system from each other in consideration of a difference in a magnetic flux waveform of the field element caused by a difference in a distance from the field element in the radial direction.

2. The rotary electric machine according to claim 1, wherein
   the current control device is configured to reduce a peak value of the current waveform of the armature winding of the first system correspondingly to a magnetic flux waveform of the armature winding of the first system that becomes larger in a peak value compared to the magnetic flux waveform of the armature winding of the second system.

3. The rotary electric machine according to claim 1, wherein
the armature winding includes phase windings of three phases, and
the phase windings of the armature winding of the first system and the phase windings of the armature winding of the second system, which are same in a phase, are at a same position in a circumferential direction.

4. The rotary electric machine according to claim 1, wherein
the armature winding includes phase windings of six phases, and
the phase windings of the armature winding of the first system are shifted relative to the phase windings of the armature winding of the second system in a circumferential direction, such that respective electric angles are different from each other by a predetermined angle.

5. The rotary electric machine according to claim 1, wherein
the current control device is configured to cause a current to flow through only the armature winding of the second system, when an operating point of the rotary electric machine is in a high rotation speed range.

6. A control method for a rotary electric machine, in which either a field element or an armature is a rotor, the control method to be implemented by a control device, the rotary electric machine including
the field element having a plurality of magnetic poles and
the armature having a toothless configuration and including
an armature winding including a plurality of winding segments and
a support member provided on a radially inner side or a radially outer side of the armature winding and provided on an opposite side of the armature winding from the field element, the support member supporting the winding segments,
the armature winding including windings of two systems, which are electrically independent, in which an armature winding of a first system is closer to the field element in a radial direction than an armature winding of a second system, and
the control device having a current control function to control a current of the armature winding of the first system and the armature winding of the second system,
the method comprising:
causing the control device to differentiate a current waveform of the armature winding of the first system and a current waveform of the armature winding of the second system from each other in consideration of a difference in a magnetic flux waveform of the field element caused by a difference in a distance from the field element in the radial direction.

* * * * *